(12) United States Patent
Goertz et al.

(10) Patent No.: US 9,213,443 B2
(45) Date of Patent: Dec. 15, 2015

(54) OPTICAL TOUCH SCREEN SYSTEMS USING REFLECTED LIGHT

(75) Inventors: Magnus Goertz, Lidingo (SE); Thomas Eriksson, Stocksund (SE); Joseph Shain, Rehovot (IL)

(73) Assignee: Neonode Inc., San Jose, CA (US)

( * ) Notice: Subject to any disclaimer, the term of this patent is extended or adjusted under 35 U.S.C. 154(b) by 804 days.

(21) Appl. No.: 12/760,567

(22) Filed: Apr. 15, 2010

(65) Prior Publication Data

US 2010/0238138 A1 Sep. 23, 2010

Related U.S. Application Data

(63) Continuation-in-part of application No. 12/371,609, filed on Feb. 15, 2009, now Pat. No. 8,339,379.

(60) Provisional application No. 61/169,779, filed on Apr. 16, 2009, provisional application No. 61/171,464, filed on Apr. 22, 2009, provisional application No. 61/317,255, filed on Mar. 24, 2010.

(51) Int. Cl.
 *G06F 3/042* (2006.01)

(52) U.S. Cl.
 CPC ............ *G06F 3/0421* (2013.01); *G06F 3/042* (2013.01); *G06F 3/0425* (2013.01); *G06F 3/0428* (2013.01)

(58) Field of Classification Search
 CPC ..... G06F 3/0421; G06F 3/042; G06F 3/0428; G06F 3/0425; G06F 3/04883; G06F 2203/4808; G06F 1/169; G06F 2203/04104; G06F 2203/04806; G06F 1/1616; G06F 1/1643; G06F 3/041; G06F 3/033; G06F 3/0485; G02B 6/0001; B60K 2350/1012; B60K 2350/1036; B60K 2350/928; B60K 35/00; B60K 37/06; B60R 16/037; B62D 1/046; H04M 2250/22; H04N 21/42201; Y10T 29/49144
 USPC .............. 345/173–183, 39, 55, 82; 178/18.09
 See application file for complete search history.

(56) References Cited

U.S. PATENT DOCUMENTS

| 4,243,879 A | 1/1981 | Carroll et al. |
| 4,301,447 A | 11/1981 | Funk et al. |

(Continued)

FOREIGN PATENT DOCUMENTS

| EP | 03030767 A1 | 10/1993 |
| EP | 0601651 A1 | 6/1994 |

(Continued)

OTHER PUBLICATIONS

Hodges, S., Izadi, S., Butler, A., Rrustemi, A., and Buxton, B., ThinSight: Versatile Multi-Touch Sensing for Thin Form-Factor Displays, UIST'07, Oct. 7-10, 2007.

(Continued)

*Primary Examiner* — Kumar Patel
*Assistant Examiner* — Insa Sadio
(74) *Attorney, Agent, or Firm* — Soquel Group LLC

(57) ABSTRACT

A touch screen system, including a near-infrared transparent screen including a plurality of reflective elements embedded therein, a circuit board including circuitry for controlled selective activation of electronic components connected thereto, at least one light source connected to the circuit board, for emitting light, and at least one light detector connected to the circuit board, for detecting light emitted by the at least one light source and reflected by the reflective elements.

3 Claims, 99 Drawing Sheets
(76 of 99 Drawing Sheet(s) Filed in Color)

(56) References Cited

U.S. PATENT DOCUMENTS

| | | |
|---|---|---|
| 4,518,249 A | 5/1985 | Murata et al. |
| 4,550,250 A | 10/1985 | Mueller et al. |
| 4,588,258 A | 5/1986 | Hoopman |
| 4,672,558 A | 6/1987 | Beckes et al. |
| 4,703,316 A | 10/1987 | Sherbeck |
| 4,710,760 A | 12/1987 | Kasday |
| 4,782,328 A | 11/1988 | Denlinger |
| 4,847,606 A | 7/1989 | Beiswenger |
| 4,880,969 A | 11/1989 | Lawrie |
| 4,928,094 A | 5/1990 | Smith |
| 5,036,187 A | 7/1991 | Yoshida et al. |
| 5,179,369 A | 1/1993 | Person et al. |
| 5,194,863 A | 3/1993 | Barker et al. |
| 5,220,409 A | 6/1993 | Bures |
| 5,414,413 A | 5/1995 | Tamaru et al. |
| 5,559,727 A | 9/1996 | Deley et al. |
| 5,577,733 A | 11/1996 | Downing |
| 5,579,035 A | 11/1996 | Beiswenger |
| 5,603,053 A | 2/1997 | Gough et al. |
| 5,729,250 A | 3/1998 | Bishop et al. |
| 5,785,439 A | 7/1998 | Bowen |
| 5,825,352 A | 10/1998 | Bisset et al. |
| 5,914,709 A | 6/1999 | Graham et al. |
| 5,936,615 A | 8/1999 | Waters |
| 5,946,134 A | 8/1999 | Benson et al. |
| 5,988,645 A | 11/1999 | Downing |
| 6,010,061 A | 1/2000 | Howell |
| 6,091,405 A | 7/2000 | Lowe et al. |
| 6,323,846 B1 | 11/2001 | Westerman et al. |
| 6,340,979 B1 | 1/2002 | Beaton et al. |
| 6,362,468 B1 | 3/2002 | Murakami et al. |
| 6,421,042 B1 | 7/2002 | Omura et al. |
| 6,429,857 B1* | 8/2002 | Masters et al. ............... 345/175 |
| 6,570,557 B1 | 5/2003 | Westerman et al. |
| 6,677,932 B1 | 1/2004 | Westerman |
| 6,690,365 B2 | 2/2004 | Hinckley et al. |
| 6,707,449 B2 | 3/2004 | Hinckley et al. |
| 6,757,002 B1 | 6/2004 | Oross et al. |
| 6,788,292 B1 | 9/2004 | Nako et al. |
| 6,803,906 B1 | 10/2004 | Morrison et al. |
| 6,836,367 B2 | 12/2004 | Seino et al. |
| 6,857,746 B2 | 2/2005 | Dyner |
| 6,864,882 B2 | 3/2005 | Newton |
| 6,888,536 B2 | 5/2005 | Westerman et al. |
| 6,947,032 B2 | 9/2005 | Morrison et al. |
| 6,954,197 B2 | 10/2005 | Morrison et al. |
| 6,972,401 B2 | 12/2005 | Akitt et al. |
| 7,007,239 B1 | 2/2006 | Hawkins et al. |
| 7,030,861 B1 | 4/2006 | Westerman et al. |
| 7,133,032 B2 | 11/2006 | Cok |
| 7,176,905 B2 | 2/2007 | Baharav et al. |
| 7,184,030 B2 | 2/2007 | McCharles et al. |
| 7,232,986 B2 | 6/2007 | Worthington et al. |
| 7,242,388 B2 | 7/2007 | Lieberman et al. |
| RE40,153 E | 3/2008 | Westerman et al. |
| 7,339,580 B2 | 3/2008 | Westerman et al. |
| 7,352,940 B2 | 4/2008 | Charters et al. |
| 7,355,594 B2 | 4/2008 | Barkan |
| 7,369,724 B2 | 5/2008 | Deane |
| 7,372,456 B2 | 5/2008 | McLintock |
| 7,429,706 B2* | 9/2008 | Ho ............... 178/18.01 |
| 7,435,940 B2 | 10/2008 | Eliasson et al. |
| 7,442,914 B2 | 10/2008 | Eliasson et al. |
| 7,464,110 B2 | 12/2008 | Pyhälammi et al. |
| 7,465,914 B2 | 12/2008 | Eliasson et al. |
| 7,479,949 B2 | 1/2009 | Jobs et al. |
| 7,705,835 B2 | 4/2010 | Eikman |
| 7,855,716 B2 | 12/2010 | McCreary et al. |
| 7,880,732 B2* | 2/2011 | Goertz ............ 345/175 |
| 8,022,941 B2 | 9/2011 | Smoot |
| 8,031,273 B2 | 10/2011 | Yabuta et al. |
| 8,120,625 B2 | 2/2012 | Hinckley |
| 8,243,048 B2* | 8/2012 | Kent et al. ............... 345/177 |
| 8,451,235 B2 | 5/2013 | Xuan et al. |
| 8,581,884 B2 | 11/2013 | Fåhraeus et al. |
| 2001/0030641 A1 | 10/2001 | Suzuki |
| 2001/0043189 A1 | 11/2001 | Brisebois et al. |
| 2002/0022508 A1* | 2/2002 | Ikariko ............ 463/5 |
| 2002/0109843 A1 | 8/2002 | Ehsani et al. |
| 2002/0175900 A1 | 11/2002 | Armstrong |
| 2003/0002809 A1 | 1/2003 | Jian |
| 2003/0043207 A1 | 3/2003 | Duarte |
| 2003/0156100 A1 | 8/2003 | Gettemy |
| 2003/0234346 A1 | 12/2003 | Kao |
| 2004/0046960 A1 | 3/2004 | Wagner et al. |
| 2005/0104860 A1 | 5/2005 | McCreary et al. |
| 2005/0122308 A1 | 6/2005 | Bell et al. |
| 2005/0174473 A1 | 8/2005 | Morgan et al. |
| 2005/0271319 A1 | 12/2005 | Graham |
| 2006/0001654 A1 | 1/2006 | Smits |
| 2006/0161870 A1 | 7/2006 | Hotelling et al. |
| 2006/0161871 A1 | 7/2006 | Hotelling et al. |
| 2006/0227120 A1* | 10/2006 | Eikman ............ 345/175 |
| 2006/0229509 A1 | 10/2006 | Al-Ali et al. |
| 2006/0238517 A1 | 10/2006 | King et al. |
| 2007/0024598 A1 | 2/2007 | Miller et al. |
| 2007/0084989 A1 | 4/2007 | Lange et al. |
| 2007/0146318 A1 | 6/2007 | Juh et al. |
| 2007/0152984 A1 | 7/2007 | Ording et al. |
| 2007/0152985 A1 | 7/2007 | Ostergaard et al. |
| 2007/0165008 A1 | 7/2007 | Crockett |
| 2008/0007541 A1* | 1/2008 | Eliasson et al. ............ 345/176 |
| 2008/0008472 A1 | 1/2008 | Dress et al. |
| 2008/0012850 A1 | 1/2008 | Keating, III |
| 2008/0013913 A1 | 1/2008 | Lieberman et al. |
| 2008/0055273 A1 | 3/2008 | Forstall |
| 2008/0068353 A1 | 3/2008 | Lieberman et al. |
| 2008/0074401 A1 | 3/2008 | Chung et al. |
| 2008/0089587 A1 | 4/2008 | Kim et al. |
| 2008/0093542 A1 | 4/2008 | Lieberman et al. |
| 2008/0100593 A1 | 5/2008 | Skillman et al. |
| 2008/0111797 A1* | 5/2008 | Lee ............... 345/175 |
| 2008/0117183 A1 | 5/2008 | Yu et al. |
| 2008/0121442 A1 | 5/2008 | Boer et al. |
| 2008/0122792 A1 | 5/2008 | Izadi et al. |
| 2008/0122796 A1 | 5/2008 | Jobs et al. |
| 2008/0122803 A1 | 5/2008 | Izadi et al. |
| 2008/0158174 A1 | 7/2008 | Land et al. |
| 2008/0192017 A1* | 8/2008 | Hildebrandt et al. ......... 345/173 |
| 2008/0192025 A1 | 8/2008 | Jaeger et al. |
| 2008/0211779 A1 | 9/2008 | Pryor |
| 2008/0212849 A1* | 9/2008 | Gao ............... 382/118 |
| 2008/0221711 A1 | 9/2008 | Trainer |
| 2008/0259053 A1 | 10/2008 | Newton |
| 2008/0273019 A1 | 11/2008 | Deane |
| 2008/0278460 A1 | 11/2008 | Arnett et al. |
| 2008/0297409 A1 | 12/2008 | Klassen et al. |
| 2008/0297487 A1 | 12/2008 | Hotelling et al. |
| 2009/0006418 A1 | 1/2009 | O'Malley |
| 2009/0009944 A1* | 1/2009 | Yukawa et al. ............ 361/681 |
| 2009/0027357 A1 | 1/2009 | Morrison |
| 2009/0031208 A1 | 1/2009 | Robinson |
| 2009/0046140 A1 | 2/2009 | Lashmet et al. |
| 2009/0058833 A1 | 3/2009 | Newton |
| 2009/0064055 A1 | 3/2009 | Chaudhri et al. |
| 2009/0066673 A1 | 3/2009 | Molne et al. |
| 2009/0096994 A1 | 4/2009 | Smits |
| 2009/0102815 A1 | 4/2009 | Juni |
| 2009/0135162 A1 | 5/2009 | Van De Wijdeven et al. |
| 2009/0143052 A1 | 6/2009 | Bates et al. |
| 2009/0166098 A1 | 7/2009 | Sunder |
| 2009/0167724 A1 | 7/2009 | Xuan et al. |
| 2009/0187840 A1 | 7/2009 | Moosavi |
| 2009/0189878 A1 | 7/2009 | Goertz et al. |
| 2009/0192849 A1 | 7/2009 | Hughes et al. |
| 2009/0256811 A1 | 10/2009 | Pasquariello |
| 2010/0002291 A1 | 1/2010 | Fukuyama |
| 2010/0013763 A1 | 1/2010 | Futter et al. |
| 2010/0079407 A1 | 4/2010 | Suggs |
| 2010/0079409 A1 | 4/2010 | Sirotich et al. |
| 2010/0112833 A1 | 5/2010 | Jeon |
| 2010/0149073 A1 | 6/2010 | Chaum et al. |
| 2010/0193259 A1 | 8/2010 | Wassvik |
| 2010/0238138 A1 | 9/2010 | Goertz |

(56) References Cited

U.S. PATENT DOCUMENTS

| | | |
|---|---|---|
| 2010/0259507 A1 | 10/2010 | Yen et al. |
| 2010/0295821 A1 | 11/2010 | Chang et al. |
| 2010/0302185 A1 | 12/2010 | Han et al. |
| 2010/0321289 A1 | 12/2010 | Kim et al. |
| 2011/0044579 A1 | 2/2011 | Travis et al. |
| 2011/0050650 A1 | 3/2011 | McGibney et al. |
| 2011/0057906 A1 | 3/2011 | Raynor et al. |
| 2011/0063214 A1 | 3/2011 | Knapp |
| 2011/0075418 A1 | 3/2011 | Mallory et al. |
| 2011/0115748 A1 | 5/2011 | Xu |
| 2011/0128234 A1 | 6/2011 | Lipman et al. |
| 2011/0163996 A1 | 7/2011 | Wassvik et al. |
| 2011/0163998 A1 | 7/2011 | Goertz et al. |
| 2011/0167628 A1 | 7/2011 | Goertz et al. |
| 2011/0169780 A1 | 7/2011 | Goertz et al. |
| 2011/0169781 A1 | 7/2011 | Goertz et al. |
| 2011/0169782 A1 | 7/2011 | Goertz et al. |
| 2011/0175533 A1 | 7/2011 | Holman et al. |
| 2011/0175852 A1 | 7/2011 | Goertz et al. |
| 2011/0179368 A1 | 7/2011 | King et al. |
| 2011/0181552 A1 | 7/2011 | Goertz et al. |
| 2011/0210946 A1 | 9/2011 | Goertz et al. |
| 2011/0221706 A1 | 9/2011 | McGibney et al. |
| 2011/0248151 A1 | 10/2011 | Holcombe et al. |
| 2011/0310005 A1 | 12/2011 | Chen et al. |
| 2012/0007835 A1 | 1/2012 | Chang et al. |

FOREIGN PATENT DOCUMENTS

| | | |
|---|---|---|
| JP | 03-216719 | 9/1991 |
| WO | 8600446 A1 | 1/1986 |
| WO | 8600447 A1 | 1/1986 |
| WO | 0102949 A1 | 1/2001 |
| WO | 02095668 A1 | 11/2002 |
| WO | 03038592 A1 | 5/2003 |
| WO | 2005026938 A2 | 3/2005 |
| WO | 2007003196 A2 | 1/2007 |
| WO | 2008004103 A2 | 1/2008 |
| WO | 2008121906 A1 | 10/2008 |
| WO | 2008133941 A2 | 11/2008 |
| WO | 2009008786 A1 | 1/2009 |

OTHER PUBLICATIONS

Moeller, J. and Kerne, A., Scanning FTIR: Unobtrusive Optoelectronic Multi-Touch Sensing through Waveguide Transmissivity Imaging, TEI '10 Proceedings of the Fourth International Conference on Tangible, Embedded, and Embodied Interaction, Jan. 25-27, 2010, pp. 73-76. ACM, New York, NY.

* cited by examiner 20 mm

OPTICAL TOUCH SCREEN SYSTEMS USING REFLECTED LIGHT

CROSS REFERENCES TO RELATED APPLICATIONS

This application claims benefit of U.S. Provisional Application No. 61/169,779, entitled OPTICAL TOUCH SCREEN, filed on Apr. 16, 2009 by inventors Magnus Goertz, Thomas Eriksson and Joseph Shain, the contents of which are hereby incorporated by reference.

This application also claims benefit of U.S. Provisional Application No. 61/171,464, entitled TOUCH SCREEN USER INTERFACE, filed on Apr. 22, 2009 by inventor Magnus Goertz, the contents of which are hereby incorporated by reference.

This application also claims benefit of U.S. Provisional Application No. 61/317,255, entitled OPTICAL TOUCH SCREEN WITH WIDE BEAM TRANSMITTERS AND RECEIVERS, filed on Mar. 24, 2010 by inventor Magnus Goertz, the contents of which are hereby incorporated by reference.

This application is also a continuation-in-part of pending U.S. application Ser. No. 12/371,609 entitled LIGHT-BASED TOUCH SCREEN, filed on Feb. 15, 2009 by inventors Magnus Goertz, Thomas Eriksson and Joseph Shain.

FIELD OF THE INVENTION

The field of the present invention is light-based touch screens.

BACKGROUND OF THE INVENTION

Many consumer electronic devices are now being built with touch sensitive screens, for use with finger or stylus touch user inputs. These devices range from small screen devices such as mobile phones and car entertainment systems, to mid-size screen devices such as notebook computers, to large screen devices such as check-in stations at airports.

Most conventional touch screen systems are based on resistive or capacitive layers. Such systems are not versatile enough to offer an all encompassing solution, as they are not easily scalable.

Reference is made to FIG. 1, which is a prior art illustration of a conventional touch screen system. Such systems include an LCD display surface, a resistive or capacitive overlay that is placed over the LCD surface, and a controller integrated circuit (IC) that connects to the overlay and converts inputs from the overlay to meaningful signals. A host device (not shown), such as a computer, receives the signals from the controller IC, and a device driver or such other program interprets the signals to detect a touch-based input such as a key press or scroll movement.

Reference is made to FIG. 2, which is a prior art illustration of a conventional resistive touch screen. Shown in FIG. 2 are conductive and resistive layers 1 separated by thin spaces. When a pointer 2, such as a finger or a stylus, touches the screen, a contact is created between resistive layers, closing a switch. A controller 3 determines the current between layers to derive the position of the touch point.

Advantages of resistive touch screens are their low cost, low power consumption and stylus support.

A disadvantage of resistive touch screens is that as a result of the overlay, the screens are not fully transparent. Another disadvantage is that the screens require periodic re-calibration. Another disadvantage is that pressure is required for touch detection; i.e., a pointer that touches the screen without sufficient pressure goes undetected. As a consequence, resistive touch screens do not work well with fingers. Another disadvantage is that resistive touch screens are generally unreadable in direct sunlight. Another disadvantage is that resistive touch screens are sensitive to scratches. Yet another disadvantage is that resistive touch screens are unable to discern that two or more pointers are touching the screen simultaneously, referred to as "multi-touch".

Reference is made to FIG. 3, which is a prior art illustration of a conventional surface capacitive touch screen. As shown in FIG. 3, two sides of a glass substrate 1 are coated with a uniform conductive indium in oxide (ITO) coating. In addition, a silicon dioxide hard coating is coated on the front side of one of the ITO coating layers. Electrodes 2 are attached at the four corners of the glass, for generating an electric current. A pointer 3, such as a finger or a stylus, touches the screen, and draws a small amount of current to the point of contact. A controller 4 then determines the location of the touch point based on the proportions of current passing through the four electrodes.

Advantages of surface capacitive touch screens are finger touch support and a durable surface.

A disadvantage of surface capacitive touch screens is that as a result of the overlay, the screens are not fully transparent. Another disadvantage is a limited temperature range for operation. Another disadvantage is a limited capture speed of pointer movements, due to the capacitive nature of the touch screens. Another disadvantage is that surface capacitive touch screens are susceptible to radio frequency (RF) interference and electromagnetic (EM) interference. Another disadvantage is that the accuracy of touch location determination depends on the capacitance. Another disadvantage is that surface capacitive touch screens cannot be used with gloves. Another disadvantage is that surface capacitive touch screens require periodic re-calibration. Another disadvantage is that surface capacitive touch screens require a large screen border. As a consequence, surface capacitive touch screens cannot be used with small screen devices. Yet another disadvantage is that surface capacitive touch screens are unable to discern a mufti-touch.

Reference is made to FIG. 4, which is a prior art illustration of a conventional projective capacitive touch screen. Shown in FIG. 4 are etched ITO layers 1 that form multiple horizontal (X-axis) and vertical (Y-axis) electrodes. AC signals 2 drive one axis and the response through the screen loops back via the other electrodes. Location of a pointer touching the screen is determined based on the signal level changes 3 between the horizontal and vertical electrodes.

Advantages of projective capacitive touch screens are finger mufti-touch detection and a durable surface.

A disadvantage of projective capacitive touch screens is that as a result of the overlay, the screens are not fully transparent. Another disadvantage is their high cost. Another disadvantage is a limited temperature range for operation. Another disadvantage is a limited capture speed, due to the capacitive nature of the touch screens. Another disadvantage is a limited screen size, typically less than 5". Another disadvantage is that surface capacitive touch screens are susceptible to RF interference and EM interference. Yet another disadvantage is that the accuracy of touch location determination depends on the capacitance.

It will thus be appreciated that conventional touch screens are impractical for general use with small mobile devices and devices with large screens.

SUMMARY OF THE DESCRIPTION

The present invention provides touch screens that overcome the drawbacks of conventional resistive and capacitive touch screens.

Aspects of the present invention relate to various embodiments of touch screens, including inter alia (i) touch screens that are responsive to both blocked and reflected light, (ii) touch screens with selective area touch, (iii) touch screens with embedded reflective elements, (iv) touch screens with multi-layer screens, (v) touch screens with wide light beams, and (vi) touch screens with image sensors and image processing logic.

Touch Screens Responsive to Blocked and Reflected Light

In these embodiments of the present invention, light beams are emitted by one or more light sources. A pointer, such as a finger or stylus, touching the screen blocks some of the emitted light and also reflects some of the emitted light. By measuring the blocked and reflected light, the location of the pointer on the screen is determined.

Touch Screens with Selective Area Touch

In these embodiments of the present invention, a sub-area of the screen is touch-sensitive, and the remainder of the screen is not touch-sensitive. Generally, selective area touch is used with mid-size and large-size screens, for which it is unnecessary that the entire screen surface area be touch sensitive.

For example, a user interface may include a touch-sensitive keyboard for text input. The location of the keyboard within the screen is designated, and then light sources and light detectors are positioned so as to be able to detect touches on the keyboard keys. I.e., the light sources and light detectors are aligned to match the user interface.

The present invention is of particular advantage in providing low cost touch screens with selective area touch. Conventional capacitive and resistive touch screens are costly, since the required screen overlay generally cannot be used to cover only a sub-area of the screen surface. Furthermore, the wiring used in conventional capacitive and resistive touch screens generally traverses the entire screen. As such, for large screens the wires must be long and thick.

In distinction, the present invention is scalable, and the cost of the touch screen is generally proportional to the perimeter of the touch sensitive sub-area.

Touch Screens with Embedded Reflective Elements

In these embodiments of the present invention elements that reflect light are embedded within the touch screen. A light sensor or camera is used to capture an image of the screen when one or more pointers are touching the screen, or approaching the screen. The image is analyzed to determine the locations of the one or more pointers; in particular, the locations of a multi-touch.

Touch Screens with Multi-Layer Screens

In these embodiments of the present invention the screen includes multiple layers. Light emitted by one or more light sources is guided through some of the layers, and light received by one or more photo detectors is guided through others of the layers.

Touch Screens with Wide Light Beams

In these embodiments of the present invention light from a narrow source, such as a near infrared LED, is widened, using lenses or reflective elements, to project over a wide swath of screen area. In order to widen a narrow cone of light, the light source is placed at a relatively long distance from the screen edge. In one embodiment, the light source is placed underneath the screen, at an appropriate distance from the screen edge to allow for a gradual widening of the beam. The widened beam is reflected above the screen surface by reflectors placed near the screen edge.

In another embodiment of the present invention the light source is placed along a screen edge. Reflectors that reflect light over the screen surface are also placed along the same screen edge, at an appropriate distance away from the light source, to allow for a gradual widening of the light beam before it is reflected over the screen surface. The light source emits a narrow cone of light at a distance substantially along the screen edge, and the light is reflected as a wide beam over the screen surface. A pointer, such as a finger or stylus, touching the screen blocks some of the emitted light. By measuring the blocked light, the location of the pointer on the screen is determined.

In an embodiment of the present invention the wide beam is concentrated onto a narrow light detector after traversing the screen, via reflectors placed an appropriate distance away from respective light detectors. The light detectors are placed either underneath the screen, or along a screen edge.

Touch Screens with Image Sensors and Image Processing Logic

In these embodiments of the present invention images of light projected over a screen are captured by at least one image sensor. Due to the focal distance of an image sensor and its lenses, the image captured when a pointer touches the screen depends on the distance between the pointer and the sensor. Specifically, the pointer generates a sequence of sub-patterns on the sensor, where the number of sub-patterns varies according to the distance of the pointer from the sensor. Thus the location of the pointer may be calculated in part based on the number of sub-patterns in the image.

For ease of exposition, throughout the present specification the term "glass screen" is used as a generic term to refer to a transparent screen surface. The screen may be constructed from glass, or instead from a non-glass material including inter alia crystal, acrylic and plastic. In some embodiments of the present invention, the screen allows near-infrared light to pass though, but is otherwise non-transparent.

For ease of exposition, throughout the present specification the term "touch screen" is used as a generic term to include touch sensitive surfaces that may or may not include an electronic display. As such, the term "touch screen" includes inter alia a mouse touchpad as included in many laptop computers, and the back cover of a handheld electronic device.

There is thus provided in accordance with an embodiment of the present invention a touch screen system, including a near-infrared transparent screen including a plurality of reflective elements embedded therein, a circuit board including circuitry for controlled selective activation of electronic components connected thereto, at least one light source connected to the circuit board, for emitting light, and at least one light detector connected to the circuit board, for detecting light emitted by the at least one light source and reflected by the reflective elements.

There is additionally provided in accordance with an embodiment of the present invention a touch screen system including a display screen, a circuit board including circuitry for controlled selective activation of electronic components connected thereto, a plurality of near-infrared LEDs connected to the circuit board, for emitting light, a first plurality of photo diodes connected to the circuit board, for detecting received light along a first edge of the display screen, and a second plurality of photo diodes connected to the circuit board, for detecting received light along a second edge of the display screen, wherein the circuitry generates signals responsive to blocked light from the near-infrared LEDs detected at the first plurality of photo diodes and signals responsive to reflected light from the near-infrared LEDs detected at the second plurality of photo diodes.

There is further provided in accordance with an embodiment of the present invention a touch screen system, including a display screen for displaying a plurality of buttons at designated horizontal and vertical screen coordinates thereon, a plurality of photo diodes coupled with the display screen, for detecting received light, and a plurality of lenses coupled with the display screen, wherein the designated horizontal and vertical screen coordinates span a touch sensitive sub-area of the display screen, wherein the photo diodes and lenses are positioned so as to detect a touch of the display screen at the touch sensitive sub-area, and wherein the remainder of the display screen is non-functional for detecting screen coordinates of a touch thereof.

There is yet further provided in accordance with an embodiment of the present invention a touch screen system, including a display screen including a touch sensitive sub-area, a plurality of photo diodes coupled with the display screen, for detecting received light, and a plurality of lenses coupled with the display screen, wherein the photo diodes and the lenses are positioned so as to detect the position of a touch of the display screen within the touch sensitive sub-area, and wherein the remainder of the display screen is non-functional for detecting the location of a touch thereof.

There is moreover provided in accordance with an embodiment of the present invention a touch screen system including a display screen including a plurality of layers substantially parallel to one another, a circuit board including circuitry for controlled selective activation of electronic components connected thereto, a plurality of near-infrared LEDs connected to the circuit board, for emitting light that is guided through a first layer of the display screen, and a plurality of photo diodes connected to the circuit board, for receiving light that is guided through a second layer of said display screen, wherein said circuitry generates signals responsive to light detected at the plurality of photo diodes.

There is additionally provided in accordance with an embodiment of the present invention a touch screen system, including a screen, a plurality of light sources coupled with the screen, for emitting light, a plurality of photo diodes coupled with the screen, for detecting the light emitted by the light sources, and for identifying the location of a touch on the screen when an absence of the emitted light is detected, and a plurality of lenses coupled respectively with the plurality of light sources to generate wide beams of light over a portion of the screen wherein substantially connected areas of the screen are covered by neighboring wide beams.

There is further provided in accordance with an embodiment of the present invention a touch screen system, including a glass screen including a plurality of reflective elements embedded therein, a display screen backlight for projecting light through the glass screen, a circuit board including circuitry for controlled selective activation of electronic components connected thereto, and a plurality of light detectors connected to the circuit board and arranged along a portion of the periphery of the glass screen, for detecting received light. When a pointer approaches near or touches the screen, the backlight is reflected by the pointer onto at least one of the reflective elements, which reflect the light onto at least one of the light detectors. An approaching pointer is thus recognized by an increase in detected light by at least one of the light detectors.

There is yet further provided in accordance with an embodiment of the present invention a touch screen system, including a glass screen including a plurality of reflective elements embedded therein, a front light display screen for reflecting light through the glass screen, a circuit board including circuitry for controlled selective activation of electronic components connected thereto, and a plurality of light detectors connected to the circuit board and arranged along a portion of the periphery of the glass screen, for detecting received light. When a pointer approaches near or touches the screen, the front light is reflected by the pointer onto at least one of the reflective elements, which reflect the light onto at least one of the light detectors. An approaching pointer is thus recognized by an increase in detected light by at least one of the light detectors.

There is moreover provided in accordance with an embodiment of the present invention a touch screen system, including a glass screen including first and second pluralities of reflective elements embedded therein, a circuit board including circuitry for controlled selective activation of electronic components connected thereto, and a plurality of light detectors connected to the circuit board and arranged along a portion of the periphery of the glass screen, for detecting received light. A portion of ambient light that enters the glass screen is reflected back above the screen by at least one of the first reflective elements. When a pointer approaches or touches the screen, the light reflected back above the screen is reflected by the pointer onto at least one of the second reflective elements, which reflect the light onto at least one of the light detectors. An approaching pointer is thus recognized by an increase in detected light by at least one of the light detectors.

Additionally, in accordance with an embodiment of the present invention, the light detectors are placed underneath the screen, and light is reflected below the screen via lenses placed around the periphery of the screen. Alternatively, in accordance with an embodiment of the present invention, the light penetrates below the screen by passing directly through the screen glass.

Alternatively, in accordance with an embodiment of the present invention, the light detectors are placed inside the screen glass, yet the circuit board circuitry controls selective activation of the light detectors.

Further, in accordance with an embodiment of the present invention, a plurality of LEDs are placed underneath the screen, and light is reflected above the screen surface via lenses placed around the periphery of the screen. Alternatively, in accordance with an embodiment of the present invention, the light penetrates above the screen by passing directly through the screen.

Alternatively, in accordance with an embodiment of the present invention, the LEDs are placed inside the screen glass, yet the circuit board circuitry controls selective activation of the LEDs.

BRIEF DESCRIPTION OF THE DRAWINGS

The patent or application file contains at least one drawing executed in color. Copies of this patent or patent application publication with color drawings will be provided by the Office upon request and payment of the necessary fee.

The present invention will be more fully understood and appreciated from the following detailed description, taken in conjunction with the drawings in which.

DETAILED DESCRIPTION

Aspects of the present invention relate to light-based touch screens and light-based touch surfaces. According to embodiments of the present invention, a light-based touch screen includes one or more infra-red or near infra-red light-emitting diodes (LEDs) and a plurality of photodiodes (PDs) arranged along the perimeter surrounding the touch screen or touch surface. The LEDs project light substantially parallel to the screen surface, and this light is detected by the PDs. A pointer, such as a finger or a stylus, placed over a portion of the screen blocks some of the light beams, and correspondingly some of the PDs detect less light intensity. The geometry of the locations of the PDs, and the light intensities they detect, suffice to determine screen coordinates of the pointer. The LEDs and PDs are controlled for selective activation and deactivation by a controller. Generally, each LED and PD has I/O connectors, and signals are transmitted to specify which LEDs and which PDs are activated.

In an embodiment of the present invention, plural LEDs are arranged along two adjacent sides of a rectangular screen, and plural PDs are arranged along the other two adjacent sides. In this regard, reference is now made to FIG. 5, which is a diagram of a touch screen 100 having 16 LEDs 130 and 16 PDs 140, in accordance with an embodiment of the present invention. The LEDs 130 emit infra-red or near infra-red light beams across the top of the touch screen, which are detected by corresponding PD receivers that are directly opposite the LEDs. When a pointer touches touch screen 100, it blocks light from reaching some of PD receivers 140. By identifying, from the PD receiver outputs, which light beams have been blocked by the pointer, the pointer's location can be determined.

Figure 6:
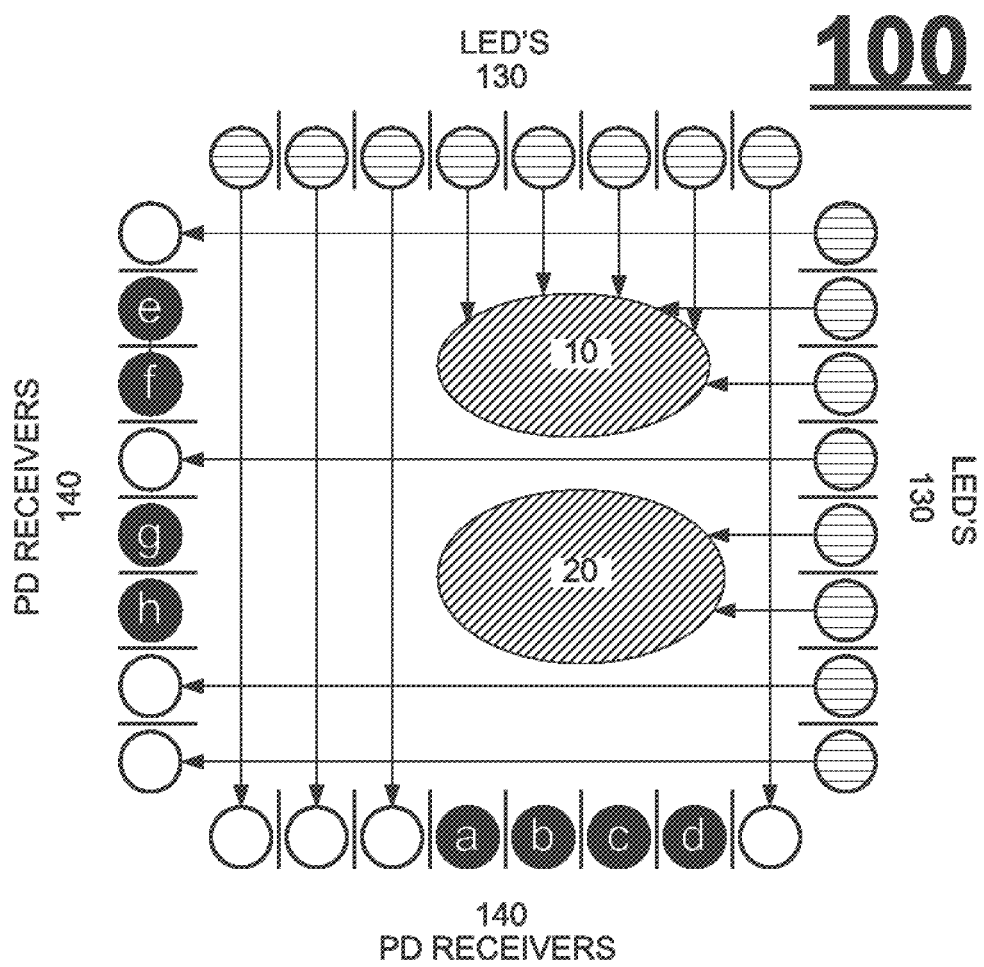
FIGS. 6-8 are diagrams of a touch screen that detects two pointers that touch the screen simultaneously, in accordance with an embodiment of the present invention.
Figure 7:
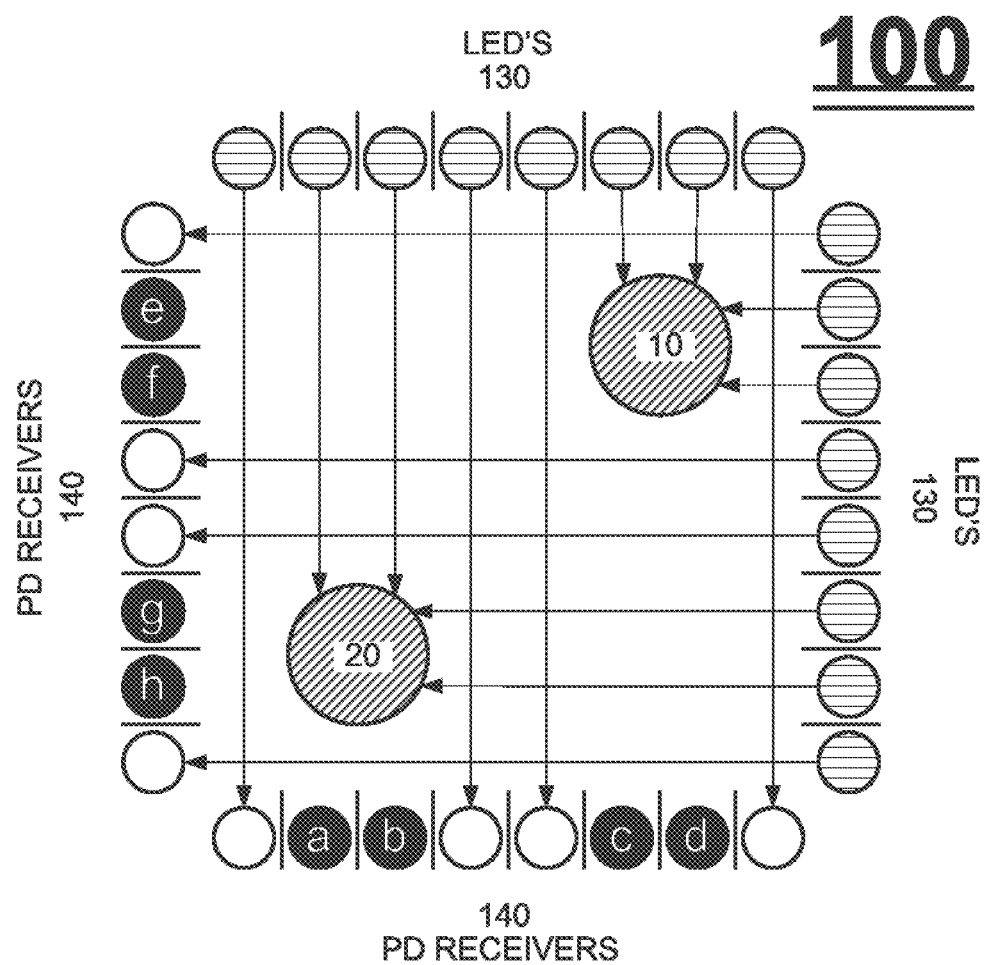
Figure 8:
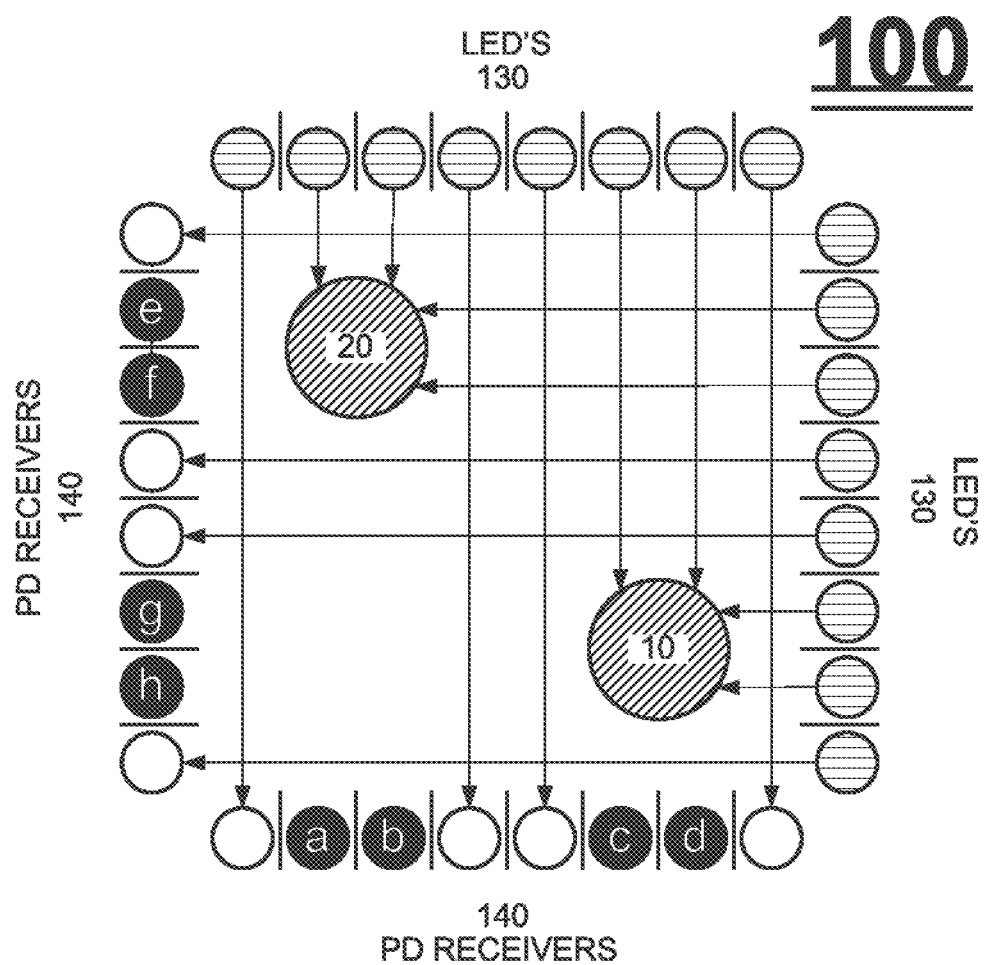

Reference is now made to FIGS. 6-8, which are diagrams of a touch screen that detects two pointers, 10 and 20, that touch the screen simultaneously, in accordance with an embodiment of the present invention. When two or more pointers touch the screen simultaneously, this is referred to as a "multi-touch." Pointers 10 and 20, which are touching the screen, block light from reaching some of PD receivers 140. In accordance with an embodiment of the present invention, the locations of pointers 10 and 20 are determined from the crossed lines of the infra-red beams that the pointers block. In distinction, prior art resistance-based and capacitance-based touch screens are generally unable to detect a multi-touch.

When two or more pointers touch screen 100 simultaneously along a common horizontal or vertical axis, the positions of the pointers are determined by the PD receivers 140 that are blocked. Pointers 10 and 20 in FIG. 6 are aligned along a common vertical axis and block substantially the same PD receivers 140 along the bottom edge of touch screen 100; namely the PD receivers marked a, b, c and d. Along the left edge of touch screen, two different sets of PD receivers 140 are blocked. Pointer 10 blocks the PD receivers marked e and f, and pointer 20 blocks the PD receivers marked g and h. The two pointers are thus determined to be situated at two locations. Pointer 10 has screen coordinates located at the intersection of the light beams blocked from PD receivers a-d and PD receivers e and f; and pointer 20 has screen coordinates located at the intersection of the light beams blocked from PD receivers a-d and PD receivers g and h.

Pointers 10 and 20 shown in FIGS. 7 and 8 are not aligned along a common horizontal or vertical axis, and they have different horizontal locations and different vertical locations. From the blocked PD receivers a-h, it is determined that pointers 10 and 20 are diagonally opposite one another. They are either respectively touching the top right and bottom left of touch screen 100, as illustrated in FIG. 7; or else respectively touching the bottom right and top left of touch screen 100, as illustrated in FIG. 8.

Discriminating between FIG. 7 and FIG. 8 is resolved by either (i) associating the same meaning to both touch patterns, or (ii) by associating meaning to only one of the two touch patterns, or (iii) by measuring the amount of light detected at the blocked PDs. In case (i), the UI arranges its icons, or is otherwise configured, such that the effects of both touch patterns FIG. 7 and FIG. 8 are the same. For example, touching any two diagonally opposite corners of touch screen 100 operates to unlock the screen.

In case (ii), the UI arranges its icons, or is otherwise configured, such that only one of the touch patterns FIG. 7 and FIG. 8 has a meaning associated therewith. For example, touching the upper right and lower left corners of touch screen 100 operates to unlock the screen, and touch the lower right and upper left of touch screen 100 has no meaning associated therewith. In this case, the UI discriminates that FIG. 7 is the correct touch pattern.

In case (iii), a finger closer to a PD blocks more light from reaching the PD than does a finger that is farther from the PD. In part, this is due to the closer finger blocking more ambient light from reaching the PD that does the farther finger. The light intensities at PDs e and f are compared with the light intensities detected at PDs g and h. Similarly, the light intensities detected at PDs a and b are compared with the light intensities detected at PDs c and d. If the light detected at PDs e, f and at PDs c and d is greater than the light detected at PDs g and h and at PDs a and b, then it is inferred that the fingers are positioned as shown in FIG. 7. Similarly, if the light detected at PDs e and f and at PDs c and d is less than the light detected at PDs g and h and at PDs a and b, then it is inferred that the fingers are positioned as shown in FIG. 8. The comparison may be based on summing or averaging the respective blocked PDs along each edge separately, e+f vs. g+h, and a+b vs. c+d. Alternatively, the comparison may be based on summing or averaging blocked PDs along two edges; i.e., based on the maximum and minimum of the values a+b+e+f, a+b+g+h, c+d+e+f, and c+d+g+h. The maximum and minimum values determine the locations of the fingers. E.g., if c+d+e+f is the maximum value and if a+b+g+h is the minimum value, then it is inferred that the fingers are positioned as shown in FIG. 7.

Figure 9:
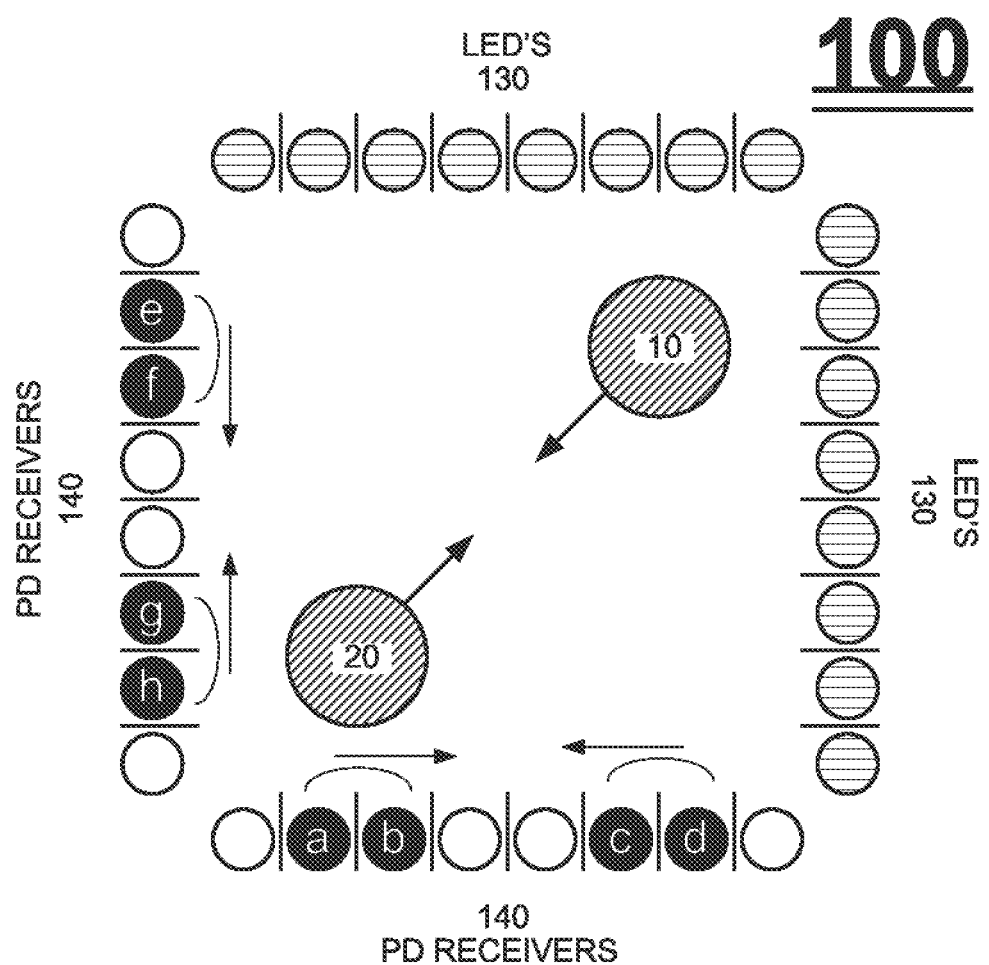
FIGS. 9 and 10 are diagrams of a touch screen that detects a two finger glide movement, in accordance with an embodiment of the present invention.
Figure 10:
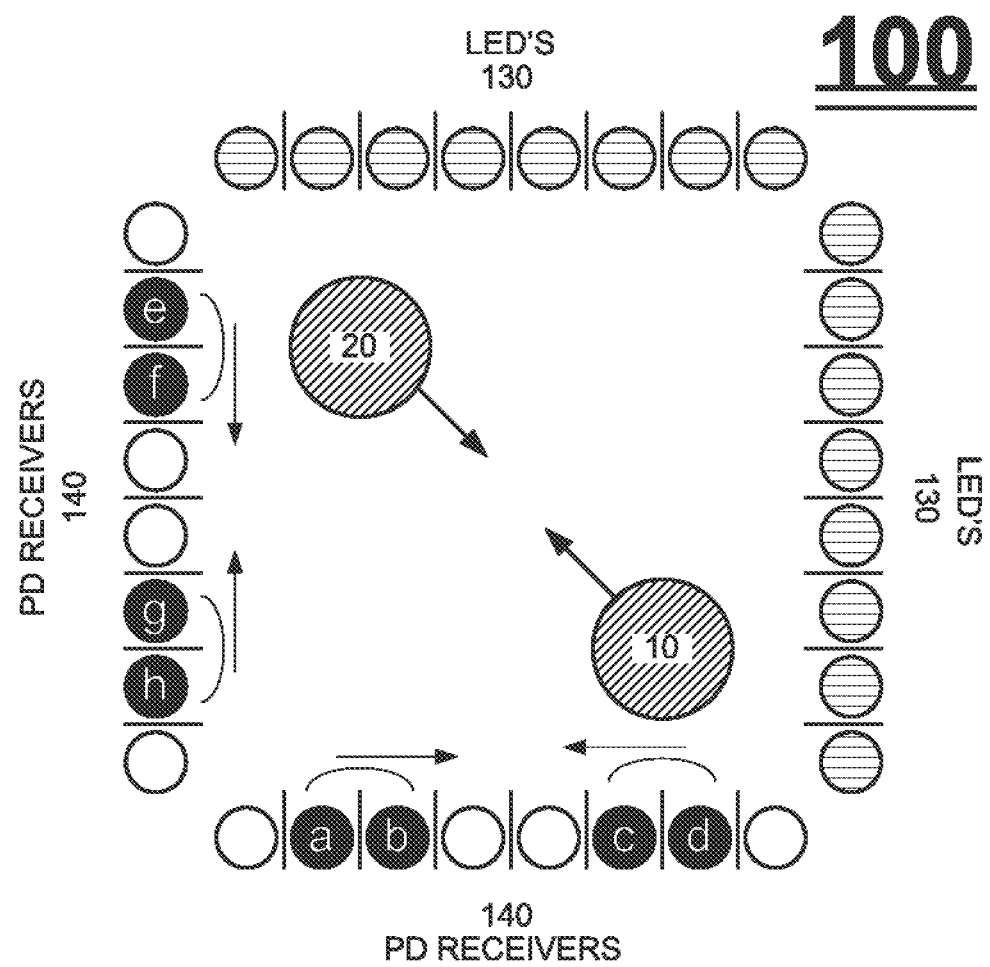

Reference is now made to FIGS. 9 and 10, which are diagrams of a touch screen that detects a two finger glide movement, in accordance with an embodiment of the present invention. The glide movement illustrated in FIGS. 9 and 10 is a diagonal glide that brings pointers 10 and 20 closer together. The direction of the glide is determined from changes in which PD receivers 140 are blocked. As shown in FIGS. 9 and 10, blocked PD receivers are changing from a and b to PD receivers 140 more to the right, and from c and d to PD receivers 140 more to the left. Similarly, blocked PD receivers are changing from e and f to PD receivers 140 more to the bottom, and from g and h to PD receivers 140 more to the top. For a glide in the opposite direction, that moves pointers 10 and 20 farther apart, the blocked PD receivers change in the opposite directions.

When pointers 10 and 20 are aligned in a common vertical or horizontal axis, there is no ambiguity in identifying glide patterns. When pointers 10 and 20 are not aligned in a common vertical or horizontal axis, there may be ambiguity in identifying glide patterns, as illustrated in FIGS. 9 and 10. In case of such ambiguity, and as described hereinabove with reference to FIGS. 7 and 8, discriminating between FIG. 9 and FIG. 10 is resolved by either (i) by associating the same meaning to both glide patterns, or (ii) by associating meaning to only one of the two glide patterns, or (iii) by measuring and comparing the amounts of light detected at the blocked PDs.

Figure 1:
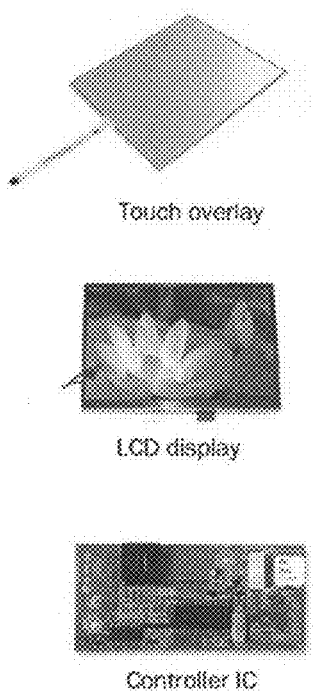
FIG. 1 is a prior art illustration of a conventional touch screen system.
Figure 2:
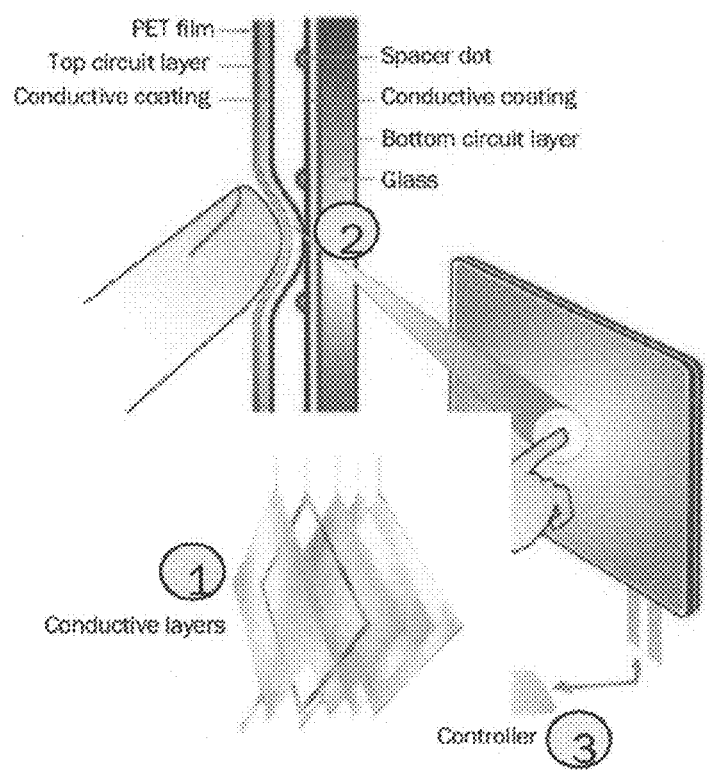
FIG. 2 is a prior art illustration of a conventional resistive touch screen.
Figure 3:
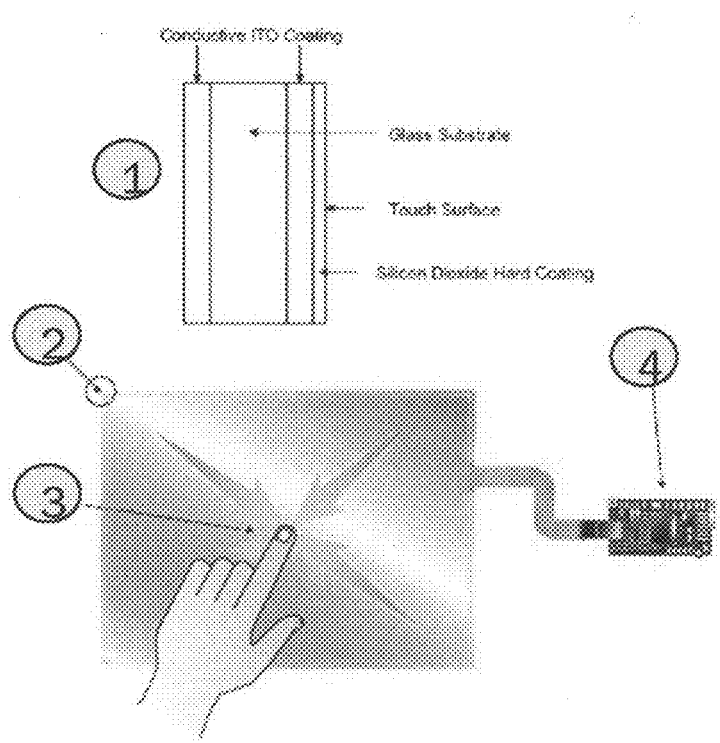
FIG. 3 is a prior art illustration of a conventional surface capacitive touch screen.
Figure 4:
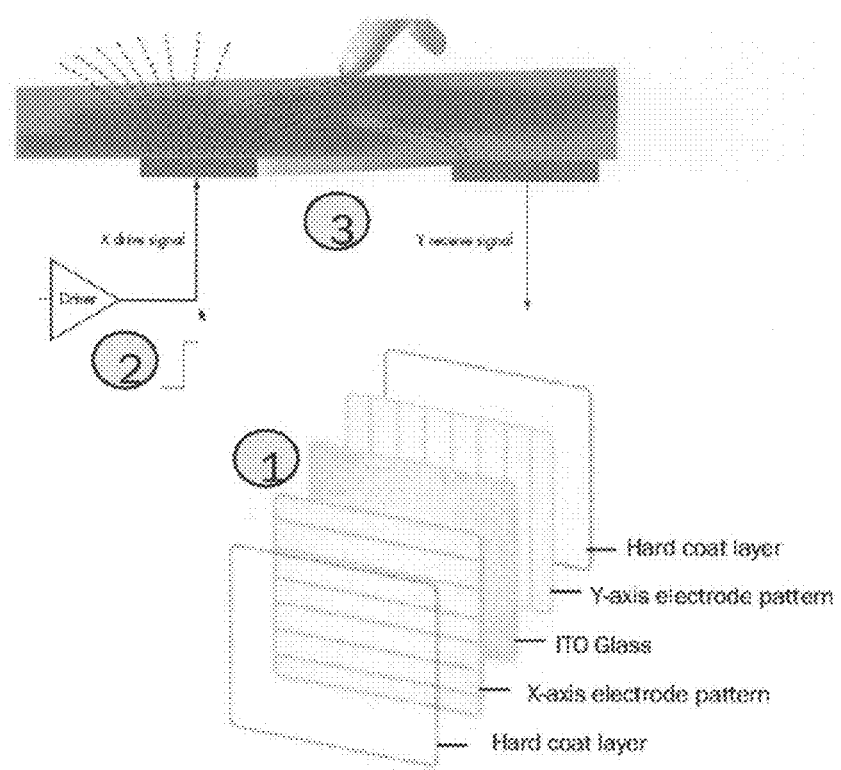
FIG. 4 is a prior art illustration of a conventional projective capacitive touch screen.
Figure 5:
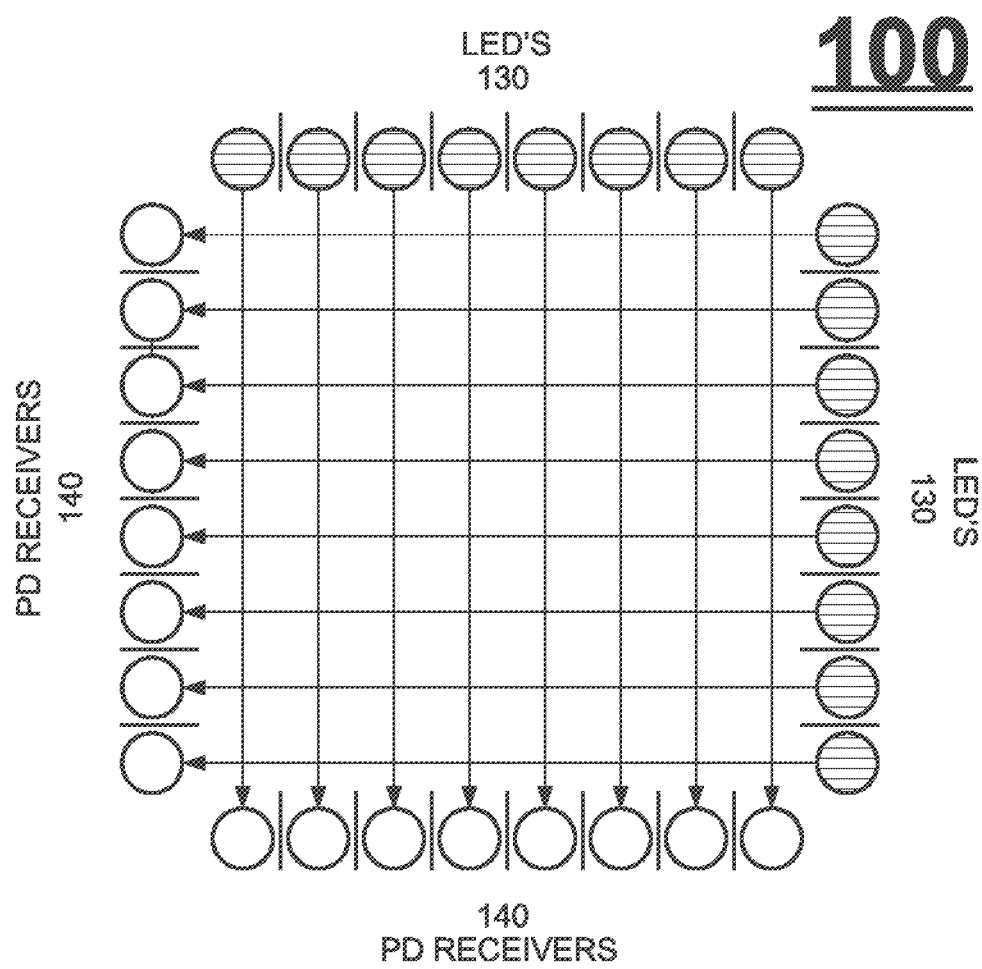
FIG. 5 is a diagram of a touch screen having 16 LEDs and 16 PDs, in accordance with an embodiment of the present invention.
Figure 11:
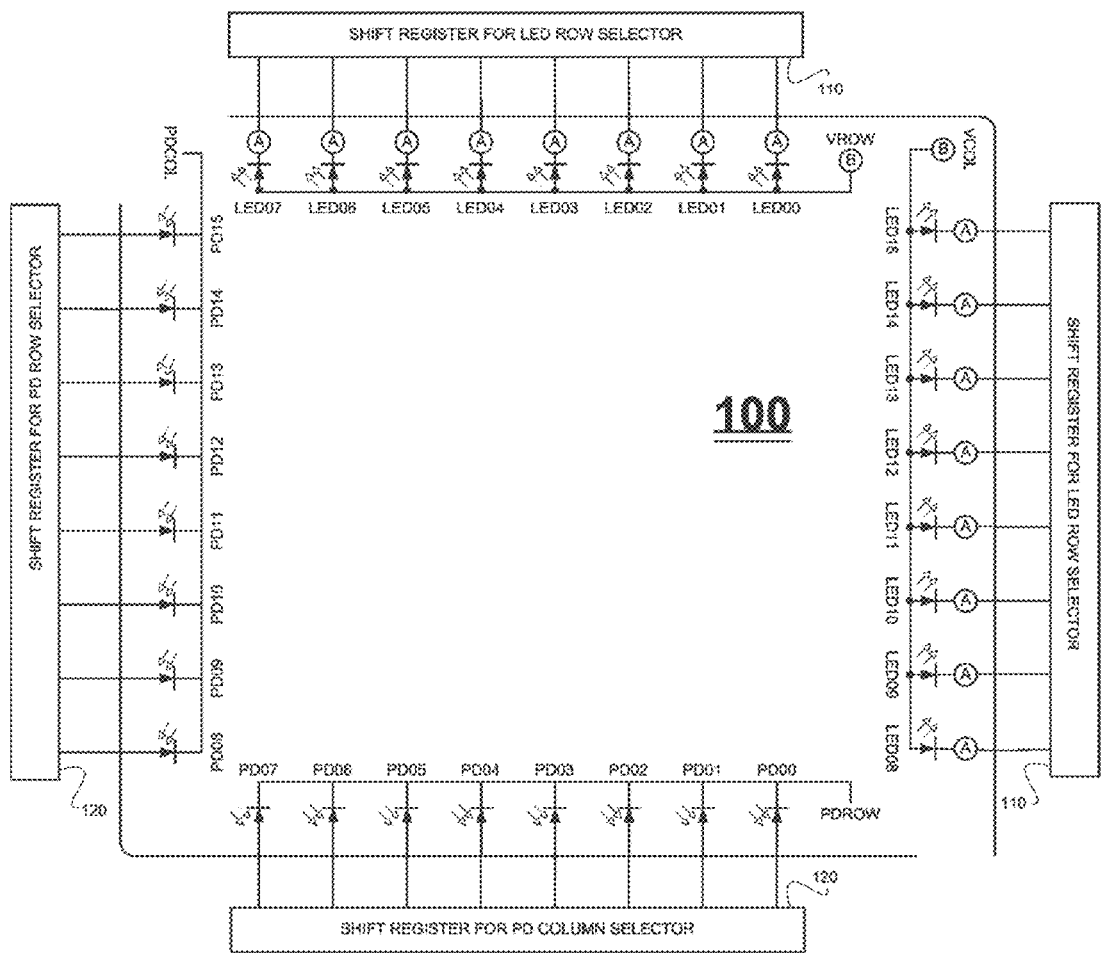
FIG. 11 is a circuit diagram of the touch screen from FIG. 5, in accordance with an embodiment of the present invention.

Reference is now made to FIG. 11, which is a circuit diagram of touch screen 100 from FIG. 5, in accordance with an embodiment of the present invention. The LEDs 130 and PDs 140 are controlled by a controller (not shown). The LEDs receive respective signals LED00-LED15 from LED switches A, and receive current from VROW and VCOL through current limiters B. The PDs receive respective signals PD00-PD15 from shift register 120. PD output is sent to the controller via signals PDROW and PDCOL. Operation of the controller, of LED switches A and of current limiters B is described in applicant's co-pending application, U.S. application Ser. No. 12/371,609 entitled LIGHT-BASED TOUCH SCREEN, the contents of which are hereby incorporated by reference.

According to an embodiment of the present invention, the LEDs are controlled via a first serial interface, which transmits a binary string to a shift register 110. Each bit of the binary string corresponds to one of the LEDs, and indicates whether to activate or deactivate the corresponding LED, where a bit value "1" indicates activation and a bit value "0" indicates deactivation. Successive LEDs are activated and deactivated by shifting the bit string within shift register 110.

Similarly, the PDs are controlled by a second serial interface, which transmits a binary string to a shift register 120. Successive PDs are activated and deactivated by shifting the bit string in shift register 120. Operation of shift registers 110 and 120 is described in applicant's co-pending application, U.S. application Ser. No. 12/371,609 entitled LIGHT-BASED TOUCH SCREEN, the contents of which are hereby incorporated by reference.

Figure 12:
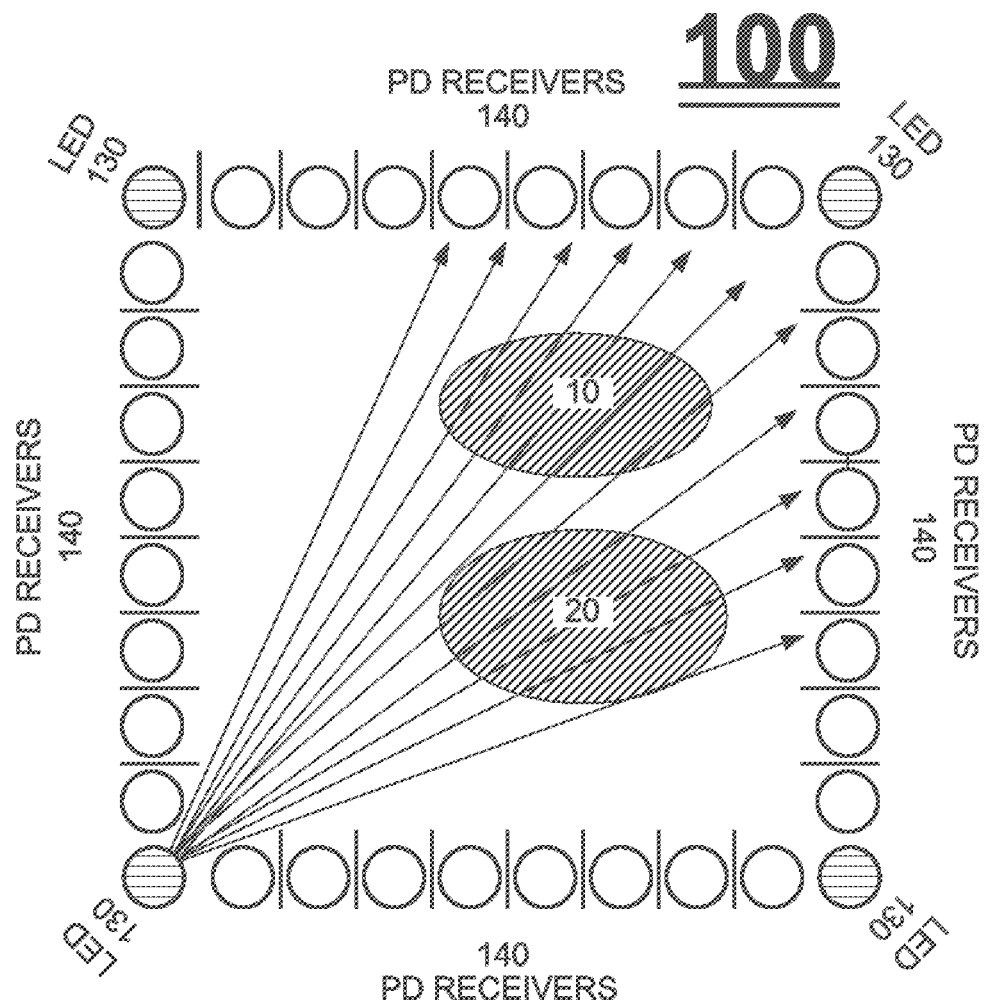
FIG. 12 is a diagram of a touch screen with four LEDs placed in the four corners of the screen, and plural PDs are arranged along the four sides of the screen, in accordance with an embodiment of the present invention.

In distinction to the embodiment shown in FIG. 5, in accordance with another embodiment of the present invention, four LEDs 130 are placed in the four corners of a touch screen, and plural PDs 140 are arranged along the four sides of the screen, as shown in FIG. 12. When an LED 130 is lit, it projects an arc of light substantially parallel to the surface of the screen. The PDs 140 detect respective portions of this light, according to the positions of the LED 130 and the PDs 140. The four LEDs 130 suffice to determine the screen coordinates of a pointer, such as a finger, placed over a portion of the screen, based on the light intensities detected by the PDs 140.

The present invention may be implemented in several types of touch screens, including inter alia (i) touch screens that are responsive to both blocked and reflected light, (ii) touch screens with selective area touch, (iii) touch screens with embedded reflective elements, and (iv) touch screens with mufti-layer screens. Several implementation of the present invention are described hereinbelow, organized as configurations 1-31.

Figure 13:
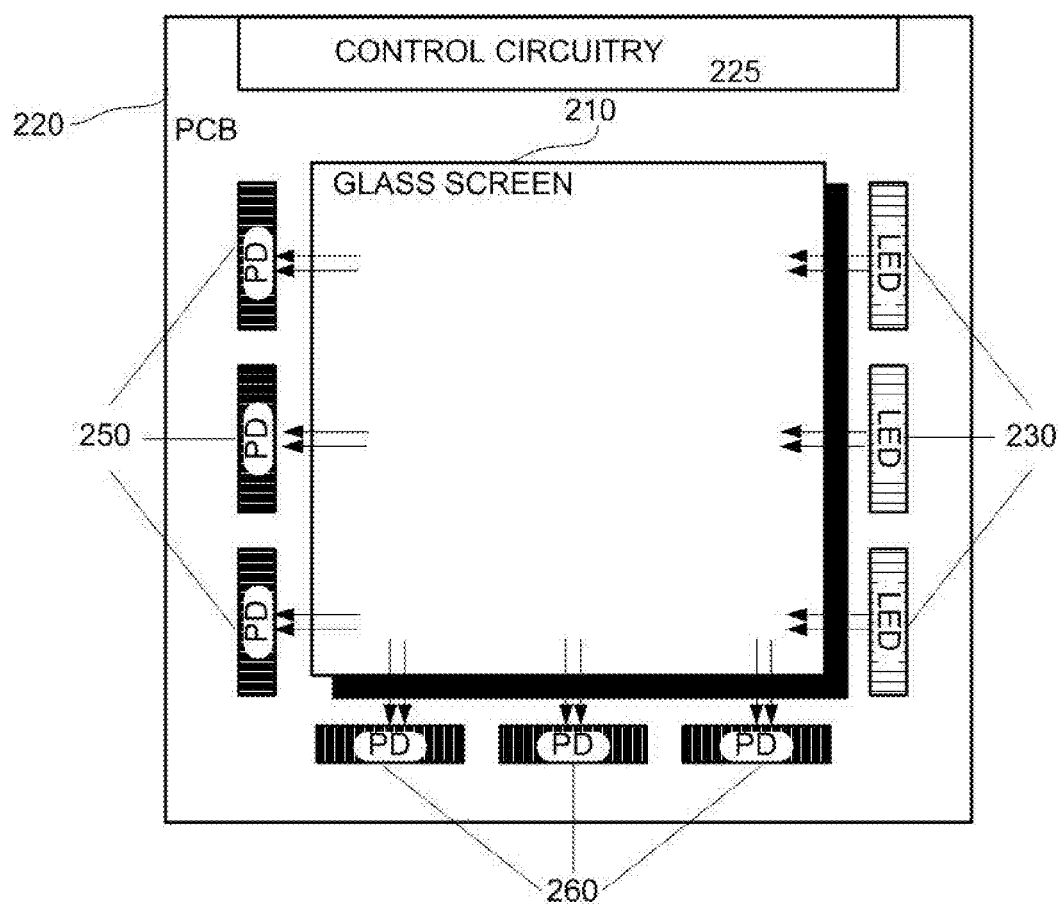
FIG. 13 is a simplified diagram of a touch screen system responsive to blocked light and reflected light, in accordance with an embodiment of the present invention.

Reference is made to FIG. 13, which is a simplified diagram of a touch screen system responsive to blocked light and reflected light, in accordance with an embodiment of the present invention. Shown in FIG. 13 is a touch screen system with a glass screen 210, and a printed circuit board 220 with circuitry 225 for controlling the components mounted on it; namely, a plurality of near infra-red LEDs 230, a first plurality of PDs 250, and a second plurality of PDs 260. Circuitry 225 is operative to generate signals in response to light emitted by LEDs 230 that is blocked from PDs 250 by a pointer touching screen 210, and in response to light that is reflected by the pointer to PDs 260.

Details of the touch screen system of FIG. 13 are described hereinbelow with reference to configurations nos. 1-3 and FIGS. 21-30.

Figure 14:
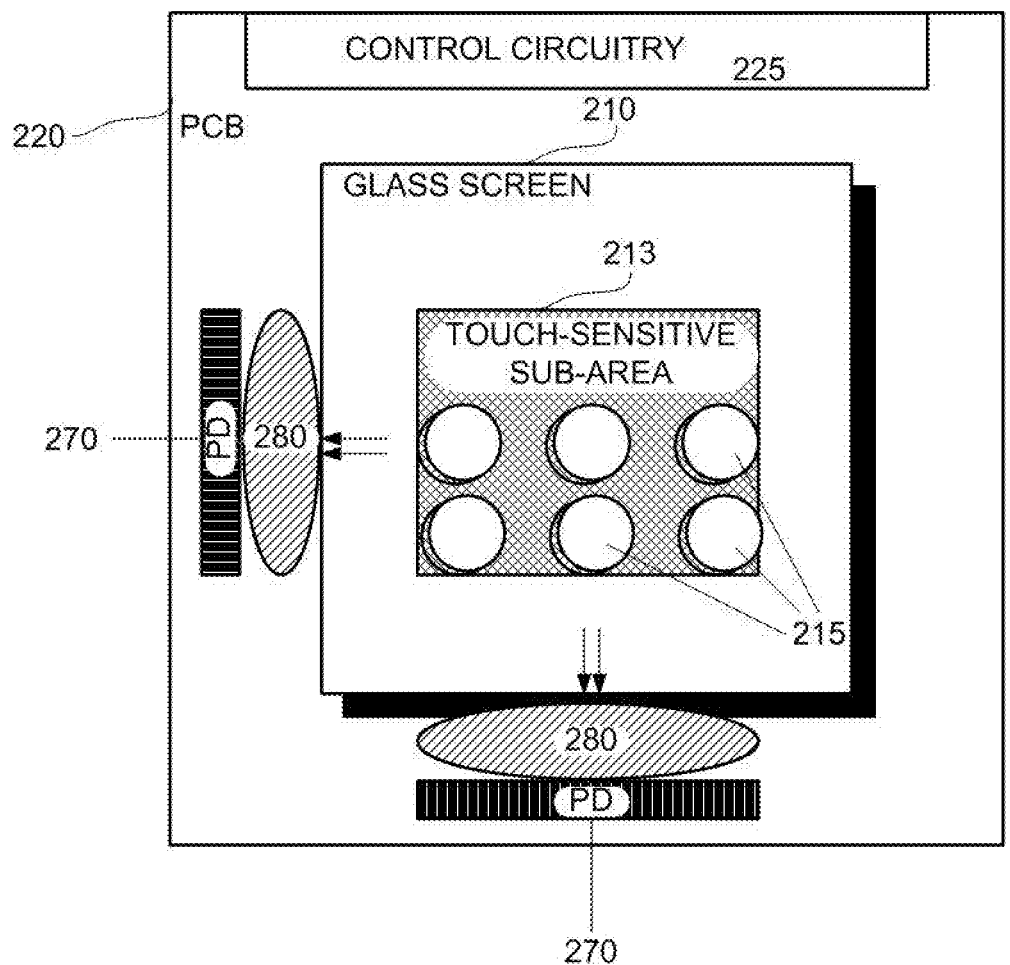
FIG. 14 is a simplified diagram of a touch screen system with selective area touch aligned with user interface buttons, in accordance with an embodiment of the present invention.

Reference is made to FIG. 14, which is a simplified diagram of a touch screen system with selective area touch aligned with user interface buttons, in accordance with an embodiment of the present invention. Selective area touch refers to a touch screen for which a sub-area of the screen is touch-sensitive, and the remainder of the screen is not touch-sensitive. Generally, selective area touch is used with mid-size and large-size screens, for which it is unnecessary that the entire screen surface area be touch sensitive. The touch screen of FIG. 14 provides a low cost solution by employing a small number of LEDs and PDs, which are strategically positioned so as to optimize touch detection in the touch sensitive sub-area.

For example, a user interface may include a touch-sensitive keyboard for text input. The location of the keyboard within the screen is designated, and then the LEDs and PDs are positioned so as to be able to detect touches on the keyboard keys. I.e., the LEDs and PDs are aligned to match the user interface. For another example, a user interface may include stylus support for handwriting on a corner of the screen.

The present invention is of particular advantage in providing low cost touch screens with selective area touch. Conventional capacitive and resistive touch screens are costly, since the required screen overlay generally cannot be used to cover only a sub-area of the screen surface. Furthermore, the wiring used in conventional capacitive and resistive touch screens generally traverses the entire screen. As such, for large screens the wires must be large and thick.

In distinction, the present invention is scalable, and the cost of the touch screen is generally proportional to the perimeter of the touch sensitive sub-area. The touch screen shown in FIG. 32, for example, uses only a single LED in a corner of the screen, and PDs along the edges that meet at the corner, for a keypad user interface. The PDs detect light reflected by a pointer touching the screen at one of the keypad buttons, which suffices to determine which button is being touched.

Shown in FIG. 14 is a touch system with a glass screen 210 including a touch-sensitive sub-area 213 containing an array of buttons 215, and a printed circuit board 220 with circuitry 225 for controlling a plurality of PDs 270 that are mounted thereon. Also shown in FIG. 14 are lenses 280 which direct light to PDs 270.

Figure 15:
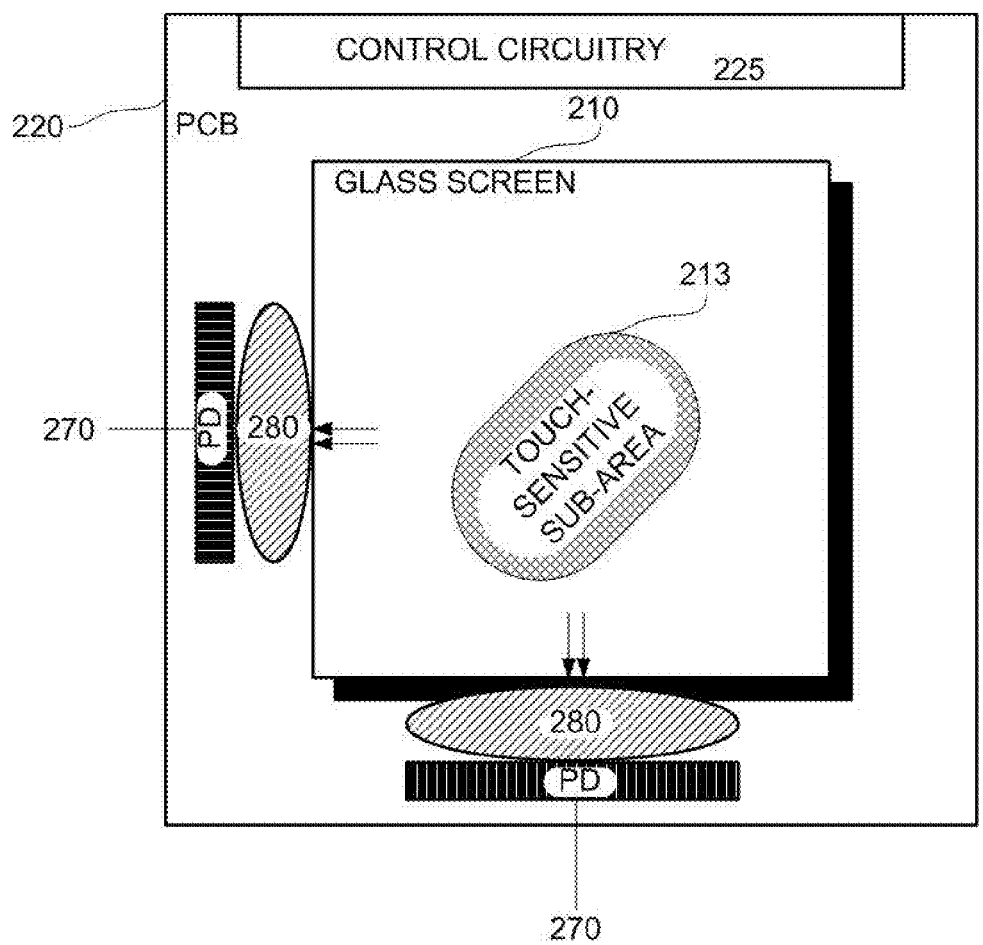
FIG. 15 is a simplified diagram of another touch screen system with selective area touch, in accordance with an embodiment of the present invention.

Reference is made to FIG. 15, which is a simplified diagram of another touch screen system with selective area touch, in accordance with an embodiment of the present invention. The touch-sensitive sub-area 213 shown in FIG. 15 is non-rectangular shaped, and may be designated at will by a user interface designer. PDs 270 are positioned and oriented according to sub-area 213, such that the touch screen is functional for detecting touches within sub-area 213 but not for detecting touches outside of sub-area 213.

Details of the touch screen systems of FIGS. 14 and 15 are described hereinbelow with reference to configurations nos. 4-14 and FIGS. 31-44.

Figure 16:
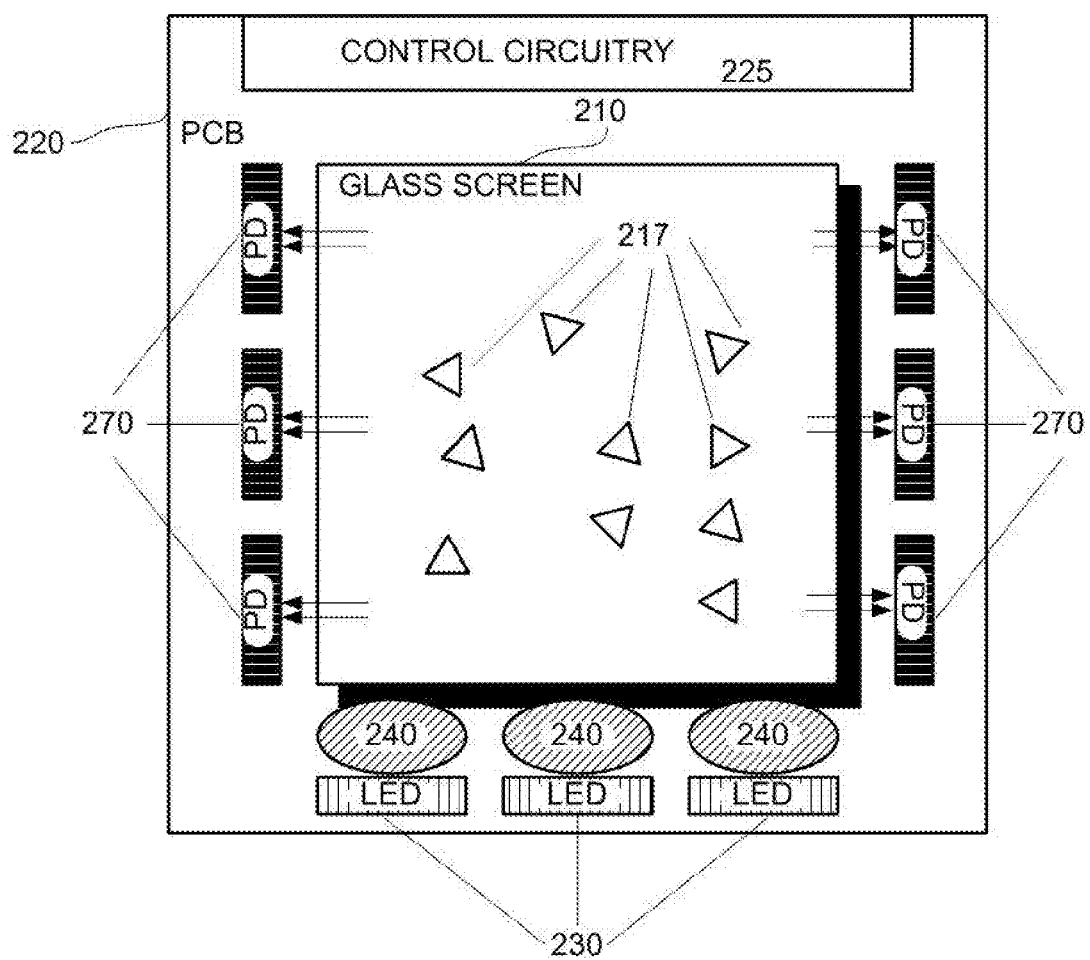
FIG. 16 is a simplified diagram of a touch screen system with reflective elements embedded in the screen, in accordance with an embodiment of the present invention.

Reference is made to FIG. 16, which is a simplified diagram of a touch screen system with reflective elements embedded in the screen, in accordance with an embodiment of the present invention. Shown in FIG. 16 is a touch screen with a glass 210 that has reflective elements 217 embedded within the glass, and a printed circuit board 220 with circuitry 225 for controlling components mounted thereon; namely, a plurality of LEDs 230 and a plurality of PDs 270. Also shown in FIG. 16 are lenses 240 that direct light emitted by LEDs 230 to reflective elements 217. When a pointer touches screen 210, the light reflected by the pointer is detected at PDs 270, and used to determine the location of the pointer.

Figure 93:
FIGS. 93-95 are images of test results captured by a camera for the touch screen of FIG. 88, in accordance with an embodiment of the present invention.
Figure 94:
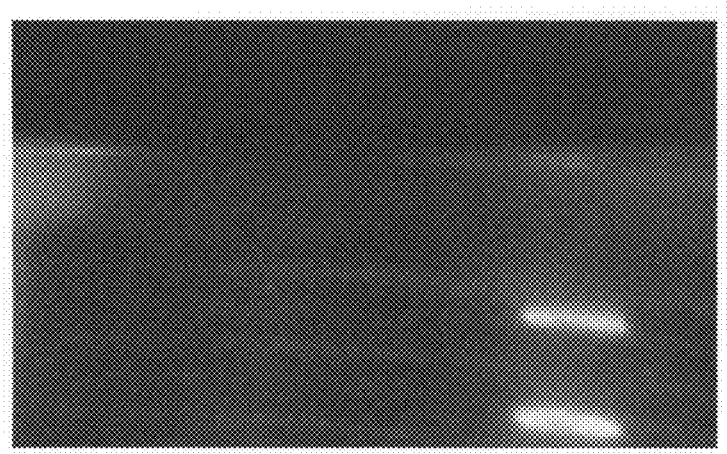
Figure 95:

Details of the touch screen system of FIG. 16 are described hereinbelow with reference to configurations nos. 15-29 and FIGS. 45-92. FIGS. 93-95 show test results of simulations of the touch screen system of FIG. 16.

Figure 17:
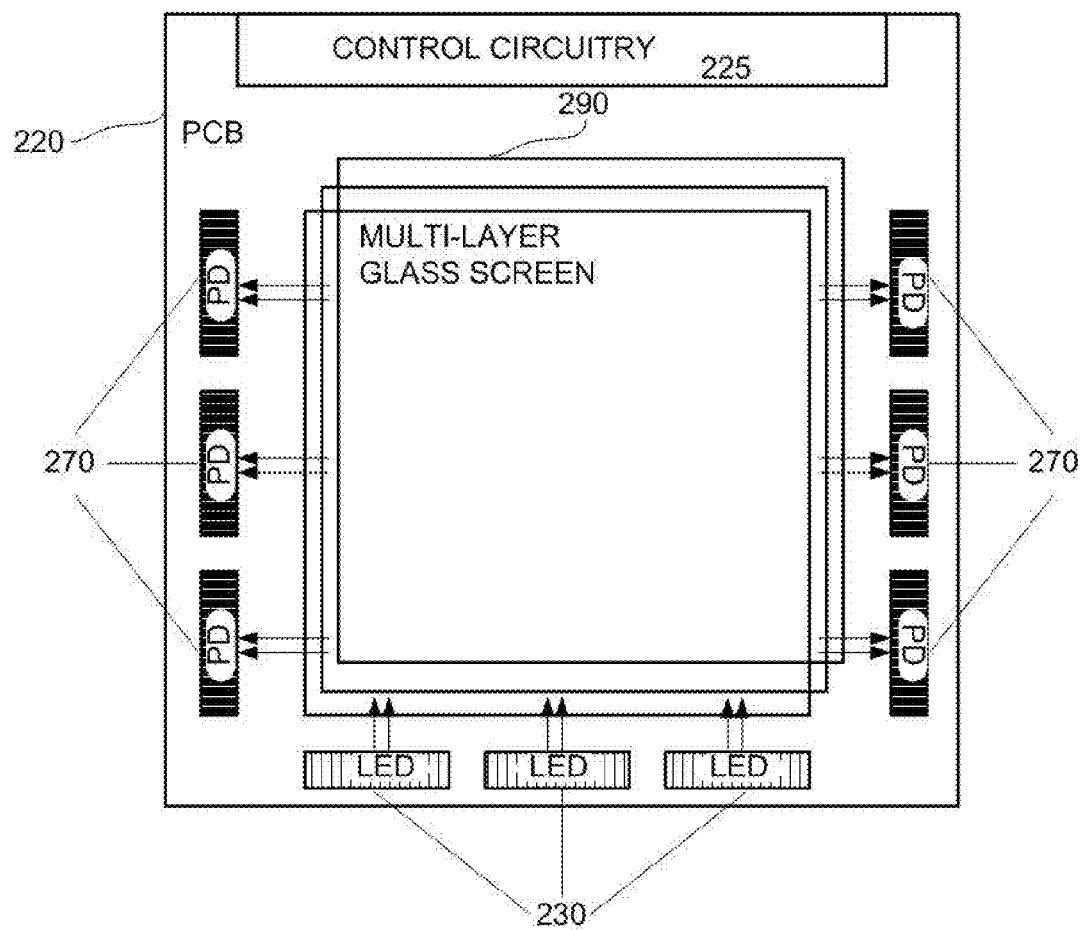
FIG. 17 is a simplified diagram of a touch screen system with a mufti-layer screen, in accordance with an embodiment of the present invention.

Reference is made to FIG. 17, which is a simplified diagram of a touch screen system with a mufti-layer screen, in accordance with an embodiment of the present invention. Shown in FIG. 17 is a touch screen with a multi-layer glass 290, and a printed circuit board 220 with circuitry 225 for controlling components mounted thereon; namely, LEDs 230 and PDs 270. Light emitted from LEDs 230 is guided through some of the layers of glass 290, and light received by PDs 270 is transmitted through others of the layers of glass 290.

Details of the touch screen system of FIG. 17 are described hereinbelow with reference to configurations nos. 30 and 31 and FIGS. 96-99.

Figure 18:
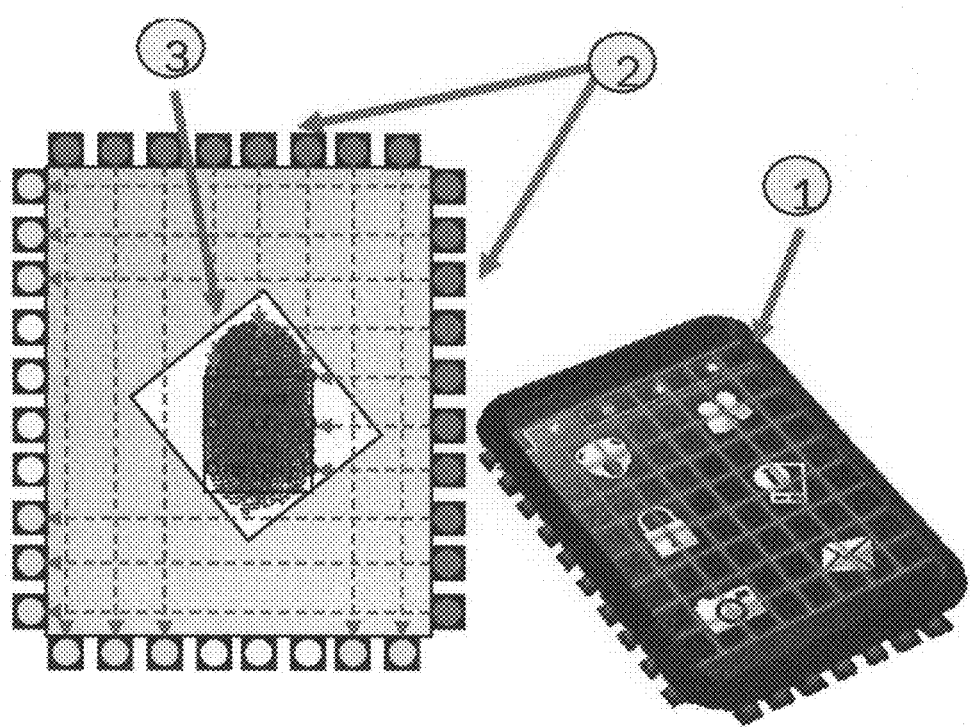
FIG. 18 is a simplified diagram of a light-based touch screen system, in accordance with an embodiment of the present invention.

Reference is made to FIG. 18, which is a simplified diagram of a light-based touch screen system, in accordance with an embodiment of the present invention. The touch screen system of FIG. 18 does not require an overlay. Instead, a small frame 1 surrounds the display with infra-red or near LEDs 2 and photo receptors positioned on opposite sides of the screen, and hidden behind an infra-red transparent bezel. When a pointer, such as a finger or a stylus, touches the screen in a specific area 3, one or more light beams generated by the LEDs are obstructed. The obstructed light beams are detected by corresponding decreases in light received by one or more photo receptors, and are used to determine the location of the pointer.

The touch screen system of FIG. 18 overcomes the disadvantages of conventional resistive and capacitive touch screen systems, described hereinabove. In particular, the touch screen system of FIG. 5 is able to detect a multi-touch. The system is a low cost system, with low power requirements. The screen surface is 100% transparent, since there is no overlay. The system is able to capture fast pointer movements. The system is operable in an extended temperature range. The system supports both small and large screens. The system does not require calibration. The system has a durable glass surface.

A disadvantage of the touch screen system of FIG. 18 is the bezel height, approximately 4 mm, surrounding the display.

Figure 19:
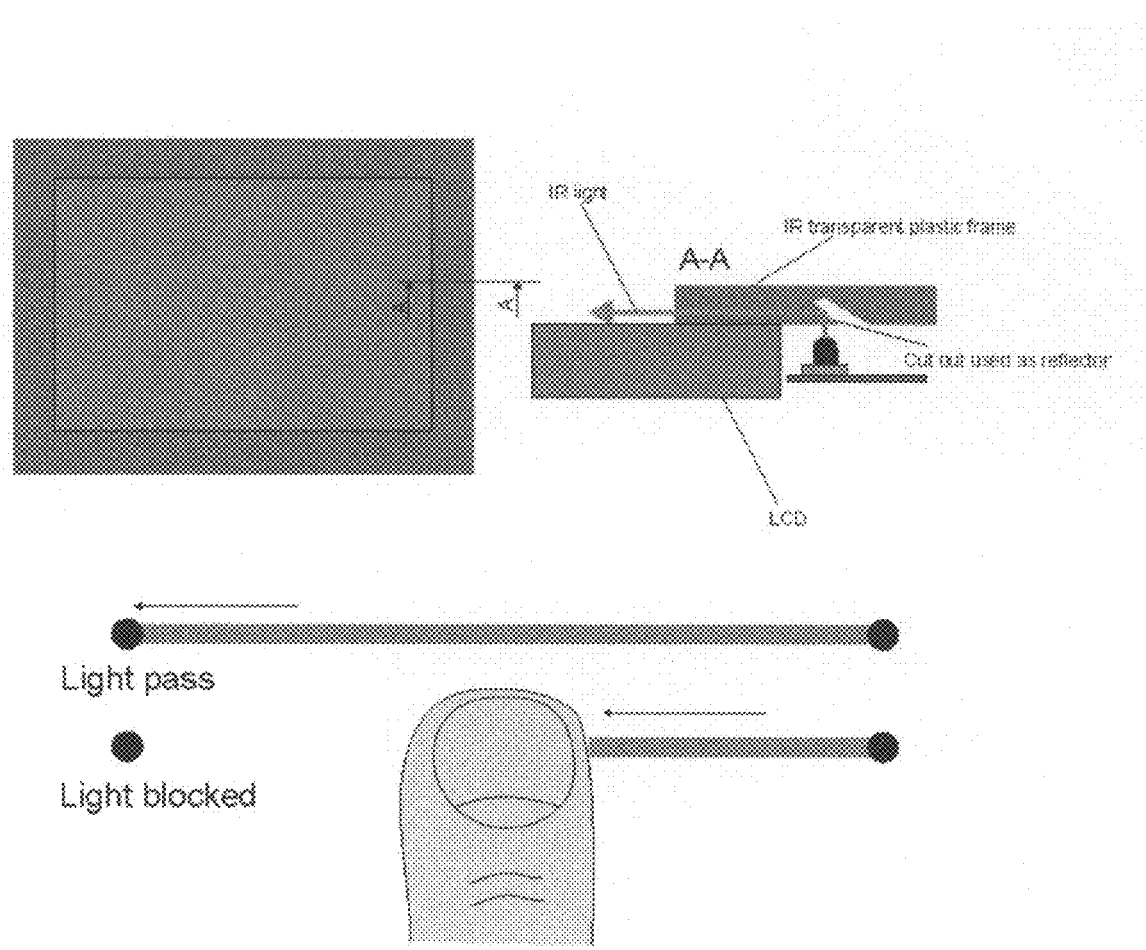
FIG. 19 is a simplified cross-sectional diagram of the touch screen system of FIG. 18, in accordance with an embodiment of the present invention.

Reference is made to FIG. 19, which is a simplified cross-sectional diagram of the touch screen system of FIG. 18, in accordance with an embodiment of the present invention. Shown in FIG. 19 is a cross-sectional view of a section A-A of an LCD display and its surrounding infra-red transparent frame. The cross-sectional view shows an LED emitting light that is reflected by a cut-out in the frame, and directed substantially parallel over the display surface, as described in detail hereinbelow with reference to FIGS. 24-29. As a finger approaches near the display surface, some of the light emitted by the LEDs and directed over the location of the near touch is blocked by the finger, and some of the light passes between the fingertip and the screen glass. When the finger touches the display surface, all of the light emitted by the LEDs and directed over the touch location is blocked by the finger.

Figure 20:
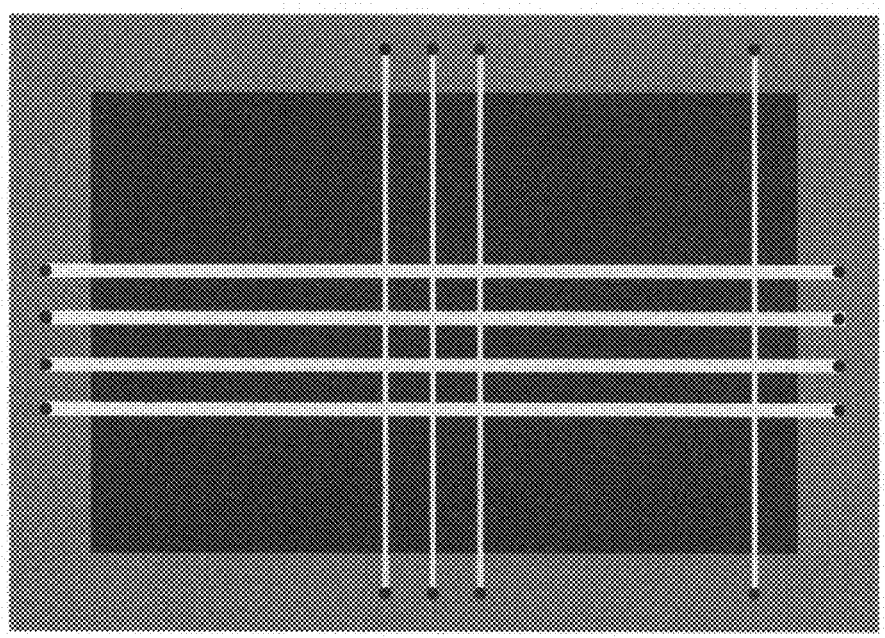
FIG. 20 is a simplified diagram of a light-based touch screen system with 4 LEDs and 4 photo detectors, in accordance with an embodiment of the present invention.

Reference is now made to FIG. 20, which is a simplified diagram of a light-based touch screen system with 8 LEDs and 8 photo detectors, in accordance with an embodiment of the present invention. The system shown in FIG. 20 is advantageous for a wide variety of screen sizes, including inter alia LCD panels, which typically range from 7" to 8", screens for e-book readers and netbooks, which typically range from 9" to 13", and HDTV panels and electronic billboards, which typically range from 42" to over 100".

As shown in FIG. 20, there are sixteen locations at which a pointer touch can be determined; namely, the intersections of the four horizontal and the four vertical lines. The system is thus able to identify touch inputs for sixteen icons, such as numbers and characters, that are displayed at these locations, as described in detail hereinbelow with reference to FIGS. 41-44.

It will thus be appreciated by those skilled in the art that the present invention enables selective area touch, to localize touch sensitive functionality to a designated sub-area of the display, such as inter alia the top right of the display, the bottom right of the display, the middle of the display, or the entire display. The sub-area with touch sensitive functionality may be selected by a designer, and the LEDs and photo detectors are then positioned and orientated accordingly.

Touch Screen System Configuration No. 1

Touch screen system configurations nos. 1-3 relate to using light reflected off of a pointer to determine the location of the pointer. In distinction, conventional light-based touch screens use only light blocked by a pointer to determine the location of the pointer.

Figure 21:
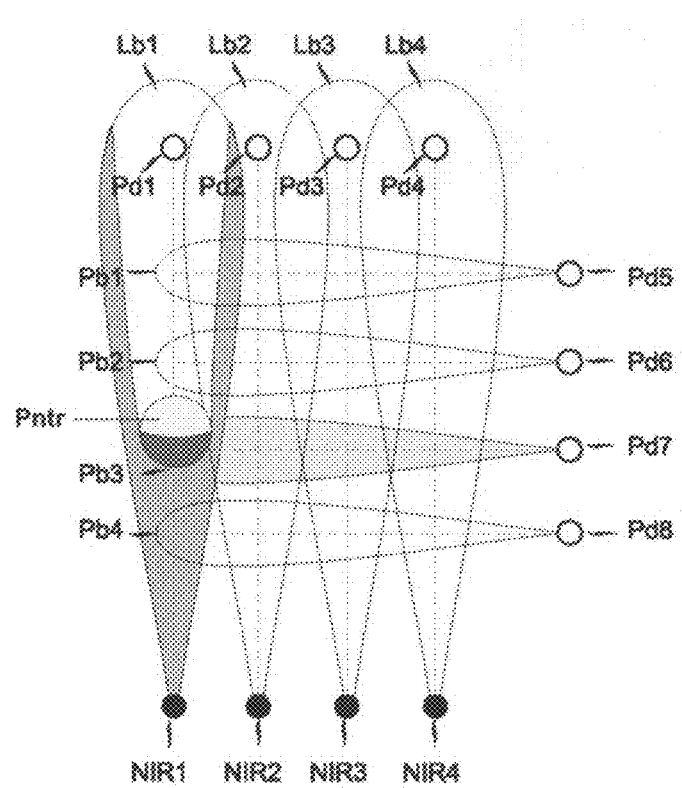
FIG. 21 is a simplified illustration of a touch screen system that measures blocked light and reflected light to determine a location of touch, in accordance with an embodiment of the present invention.

Reference is made to FIG. 21, which is a simplified illustration of a touch screen system that measures blocked light and reflected light to determine a location of touch, in accordance with an embodiment of the present invention. Shown in FIG. 21 is a top view with four near-infrared LEDs, NIR1, NIR2, NIR3 and NIR4 arranged along the bottom edge of a screen, four PDs Pd1, Pd2, Pd3 and Pd4 arranged along the top edge of the screen, and four more PDs Pd5, Pd6, Pd7 and Pd8 arranged along the right edge of the screen. It is noted that PDs Pd1, Pd2, Pd3 and Pd4 are positioned directly across from respective LEDs NIR1, NIR2, NIR3 and NIR4. The screen itself is positioned within the borders delineated by the LEDs and PDs, but is not shown.

A pointer Pntr, inter alia a finger or a stylus, touching the screen blocks light emitted by one or more of the LEDs, and also reflects light emitted by one of more of the LEDs. The blocked light is identified by one or more of Pd1, Pd2, Pd3 and Pd4, as a decrease of expected light. The reflected light is identified by one or more of Pd5, Pd6, Pd7 and Pd8 as an increase in expected light. Together, the location of the blocked light and the reflected light determine the location of pointer Pntr.

In FIG. 21, for example, light beams Lb1, Lb2, Lb3 and Lb4 from respective LEDs NIR1, NIR2, NIR3 and NIR4 are shown directed towards respective PDs Pd1, Pd2, Pd3 and Pd4. Similarly, reflected light beams Pb1, Pb2, Pb3 and Pb4 are shown directed towards respective PDs Pd5, Pd6, Pd7 and Pd8. A reflected light beam Pb1, Pb2, Pb3 or Pb4 is generated when a pointer is placed in the path of one of light beams Lb1, Lb2, Lb3 or Lb4 at an appropriate position. As shown in FIG. 21, Pntr is placed in the path of Lb1 opposite Pd7. Blocked light is detected at Pd1 and reflected light is detected at Pd7, thus determining the location of pointer Pntr at the intersection of the vertical line from Pd1 and the horizontal line from Pd7. In this case, reflected light beams Pb1, Pb2 and Pb4 are not generated.

A controller operating the touch screen system of FIG. 21, pulses the LEDs separately. When a single LED is activated, the PD located directly across therefrom is read, and each of the PDs Pd5, Pd6, Pd7 and Pd8 are also read. When pointer Pntr touches the screen, light blocked by Pntr is identified at one or more of PDs Pd1, Pd2, Pd3 and Pd4, and light reflected by Pntr is identified at one or more of PDs Pd5, Pd6, Pd7 and Pd8. Referring to FIG. 21, the signal detected at Pd1 when NIR1 is activated, is lower than the signals detected at Pd2, Pd3 and Pd4 when respective LEDs NIR2, NIR3 and NIR4 are activated, as a result of blocked beam Lb1; and the signal at Pd7 is higher than the signals at Pd5, Pd6 and Pd8 as a result of reflected beam Pb3. Thus the location of Pntr is determined to be at the coordinates (Pd1, Pd7).

It will be appreciated by those skilled in the art that analysis of intensity of light reflected by a pointer and read by a PD leads to determination of both a horizontal and a vertical position of a pointer. Specifically, referring to FIG. 21, if PD Pd7 detects reflected light, then it may be inferred that a pointer is located somewhere on the horizontal line from Pd7. Furthermore, the intensity of reflected light read by Pd7 is a function of the distance of the pointer from Pd7. The closer the pointer is to Pd7, the higher the intensity of the reflected light read by Pd7. As such, the intensity of the reflected light may be used to infer at which vertical line the pointer is located. Use of intensity to infer distance is a feature of reflected light, but not of blocked light. As such, reflected light generally provides more information than blocked light.

Figure 22:
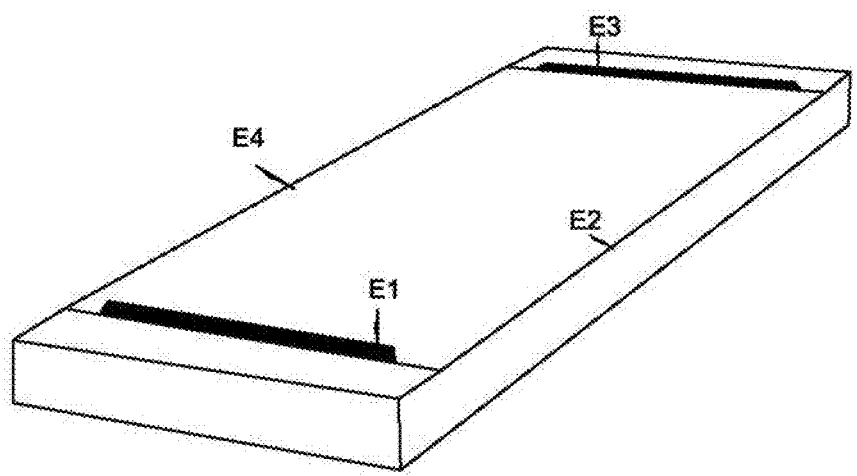
FIG. 22 is a simplified illustration of reflector lenses used with the touch screen system of FIG. 21, in accordance with an embodiment of the present invention.

Reference is made to FIG. 22, which is a simplified illustration of reflector lenses used with the touch screen system of FIG. 21, in accordance with an embodiment of the present invention. The four edges E1, E2, E3 and E4 of the touch screen are shown. As shown in FIG. 22, reflector lenses are only provided at two of the four edges. A first reflector lens is provided at edge E1 along which LEDs NIR1, NIR2, NIR3 and NIR4 are positioned, in order to direct light beams Lb1, Lb2, Lb3 and Lb4 emitted from respective LEDs NIR1, NIR2, NIR3 and NIR4 across the surface of the screen to respective PDs Pd1, Pd2, Pd3 and Pd4. A second reflector lens is provided at edge E3 in order to direct the light beams transmitted across the surface of the screen to respective PDs Pd1, Pd2, Pd3 and Pd4.

As described below with reference to FIG. 29, PDs Pd5, Pd6, Pd7 and Pd8, which detect reflected light, are positioned below the screen surface and do not require a reflector lens above the screen. As such, edge E2 does not have a reflector lens.

Touch Screen System Configuration No. 2

Figure 23:
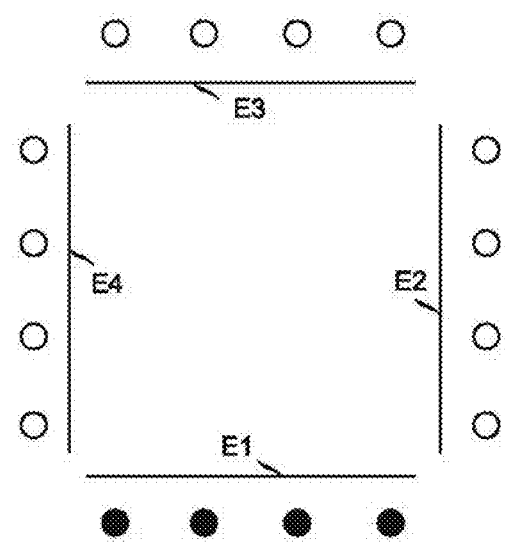
FIG. 23 is a simplified illustration of a touch screen system with PDs positioned along three edges of a touch screen, in accordance with an embodiment of the present invention.

Reference is made to FIG. 23, which is a simplified illustration of a touch screen system with PDs positioned along three edges of a touch screen, in accordance with an embodiment of the present invention. By adding PDs along edge E4, the touch screen system is able to achieve higher precision in determining the location of Pntr. Moreover, the touch screen system is able to determine a multi-touch; i.e., the locations of multiple pointers touching the screen simultaneously.

As with the system of FIG. 21, the NIRs are pulsed separately. When an NIR is activated, the PD across from the NIR along edge E3, and the PDs along edges E2 and E4, are read. Blocked light is detected by the PD along edge E3. Reflected light is detected by the PDs along edges E2 and E4.

In the case of a single pointer touch, the sets of PDs along edges E2 and E4 achieve better resolution than a single set of PDs along edge E2, as in the system of FIG. 21. Specifically, the relative intensities of reflected light detected at a PD along edge E2 and a PD along edge E4 determine the distance of the pointer from each respective edge.

In the case of multiple pointer touches, consider for example two pointers touching two diagonal corners of the screen. A first pointer is closer to edge E2 than to edge E4, and a second pointer is closer to edge E4 than to edge E2. For each pointer, the light reflected to its closer edge is brighter than the light reflected to its farther edge. The relative intensities of light reflected onto the closer and farther edge determine the position of each pointer between the edges. In addition, if blocked light is detected at non-adjacent PDs along edge E3, then this indicates that two pointers are touching the screen. Similarly, if reflected light is detected at non-adjacent PDs along edges E2 and E4, then this also indicates that two pointers are touching the screen. E.g., if reflected light is detected at a PD along E2 near E3, and also at a PD along E4 near E1, then this indicates that two pointers are touching the screen. If reflected light is detected at a PD along E2 near E3 and at non-adjacent PD along E2 near E1, with an intermediate PD that does not detect reflected light, then this indicates that two pointers are touching the screen.

Figure 24:
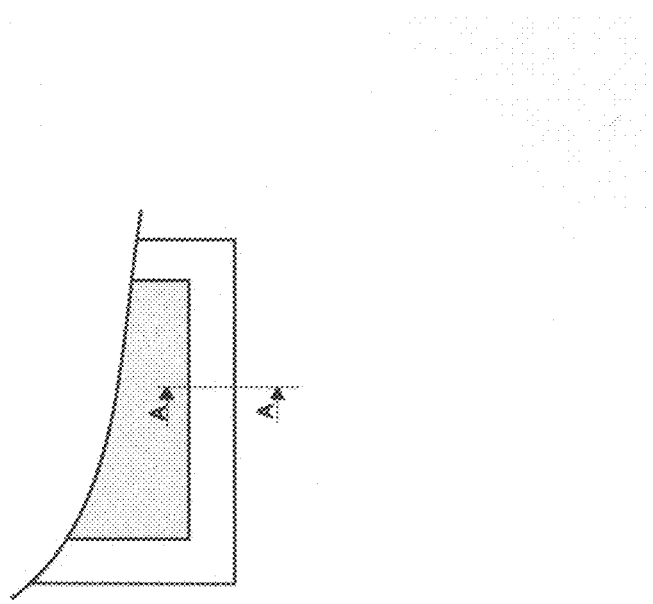
FIG. 24 is a simplified illustration of a portion of a touch screen display and surrounding frame, in accordance with an embodiment of the present invention.

Reference is made to FIG. 24, which is a simplified illustration of a portion of a touch screen display and surrounding frame, in accordance with an embodiment of the present invention.

Figure 25:
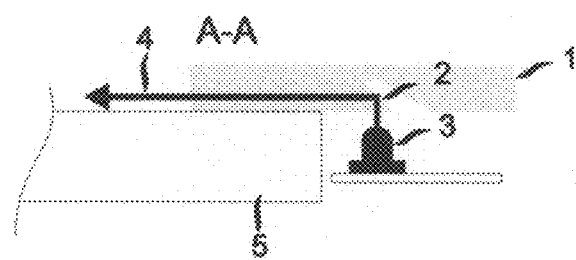
FIG. 25 is a projection view of the section of FIG. 24 designated A-A, in accordance with an embodiment of the present invention.

Reference is also made to FIG. 25, which is a projection view of the section of FIG. 24 designated A-A, in accordance with an embodiment of the present invention. Shown in FIG. 25 is an infra-red transparent frame 1, an infra-red LED 3, and a display 5. Frame 1 may be inter alia a photo frame, a monitor, a TV or an e-book. Also shown in FIG. 25 is a cut-out 2 in frame 1. The air gap from cut out 2 generates a mirror with a 45° surface, which directs reflected light 4 above the surface of display 5.

Figure 26:
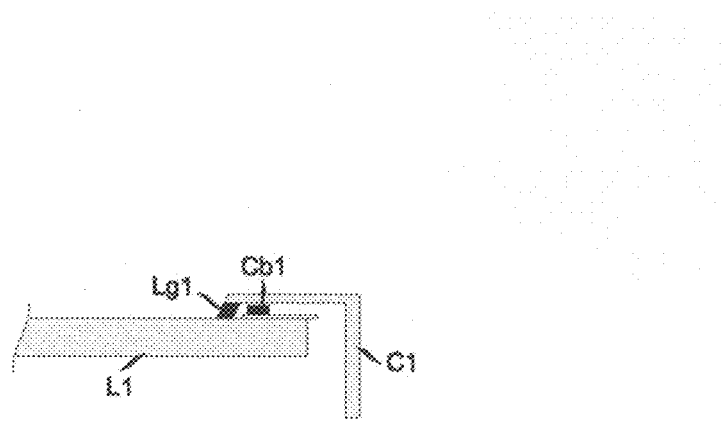
FIG. 26 is a simplified diagram of an LED for a touch screen system, with a diode that emits light from the side, in accordance with an embodiment of the present invention.

Reference is made to FIG. 26, which is a simplified diagram of an LED for a touch screen system, with a diode that emits light from the side, in accordance with an embodiment of the present invention. Shown in FIG. 26 is a liquid crystal display (LCD) L1, a product casing C1, a lens and dust protector Lg1, and an LED Cb1 with a side-emitting diode.

Figure 27:
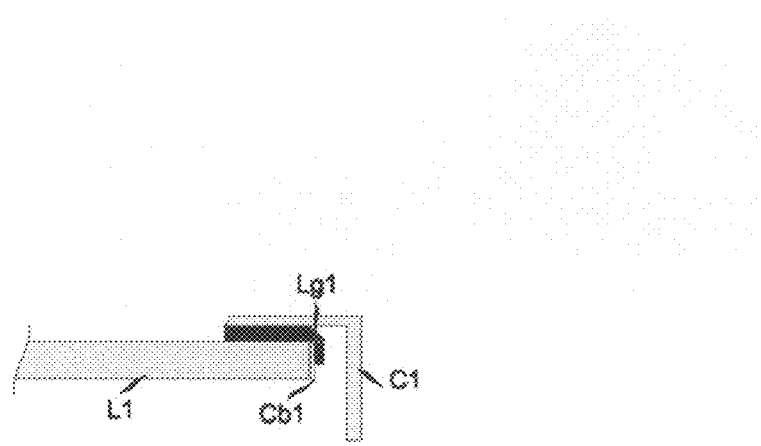
FIG. 27 is a simplified diagram of an LED for a touch screen system, with a diode that emits lights from the top, in accordance with an embodiment of the present invention.

Reference is made to FIG. 27, which is a simplified diagram of an LED for a touch screen system, with a diode that emits light from the top, in accordance with an embodiment of the present invention. Shown in FIG. 27 is an LCD L1, a product casing C1, an LED Cb1 with a top-emitting diode, and a light guide Lg1 that receives light from LED Cb1 and re-directs the light over the surface of L1.

Figure 28:
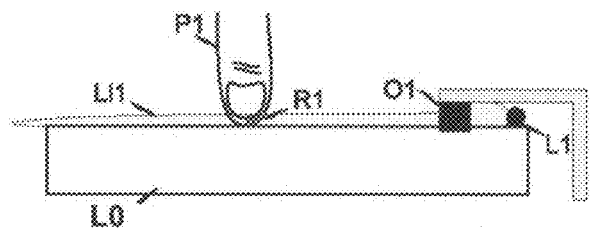
FIG. 28 is a simplified diagram of an optical element that focuses light emitted by an LED into a narrow beam, in accordance with an embodiment of the present invention.

Reference is made to FIG. 28, which is a simplified diagram of an optical element that focuses light emitted by an LED into a narrow beam, in accordance with an embodiment of the present invention. Shown in FIG. 28 is an LCD L0, a PD L1, a light beam Li1 emitted by an LED (not shown) near L1 and focused by an optical element O1, such that light is reflected into a reflected beam R1 only when a pointer P1 is sufficiently close to LCD L0. The focus of optical element O1 ensures the only the focused beam R1 passes through O1 to PD L1.

Figure 29:
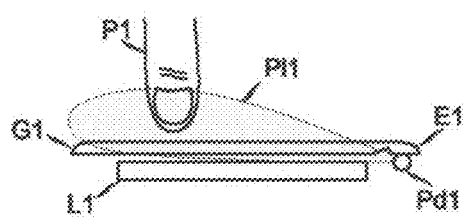
FIG. 29 is a simplified diagram of a PD that is placed underneath the plane of a touch screen for detecting reflected light above the touch screen, in accordance with an embodiment of the present invention.

Reference is made to FIG. 29, which is a simplified diagram of a PD that is placed underneath the plane of a touch screen for detecting reflected light above the touch screen, in accordance with an embodiment of the present invention. Shown in FIG. 29 is a display L1, a protection glass G1 overlaying L1, and a PD Pd1 situated underneath G1. A pointer P1 generates a reflected light beam Pl1, which is directed by a cutout in G1 to Pd1. As such, reflected light beam Ph1 is detected by Pd1 beneath G1.

Touch Screen System Configuration No. 3

Figure 30:
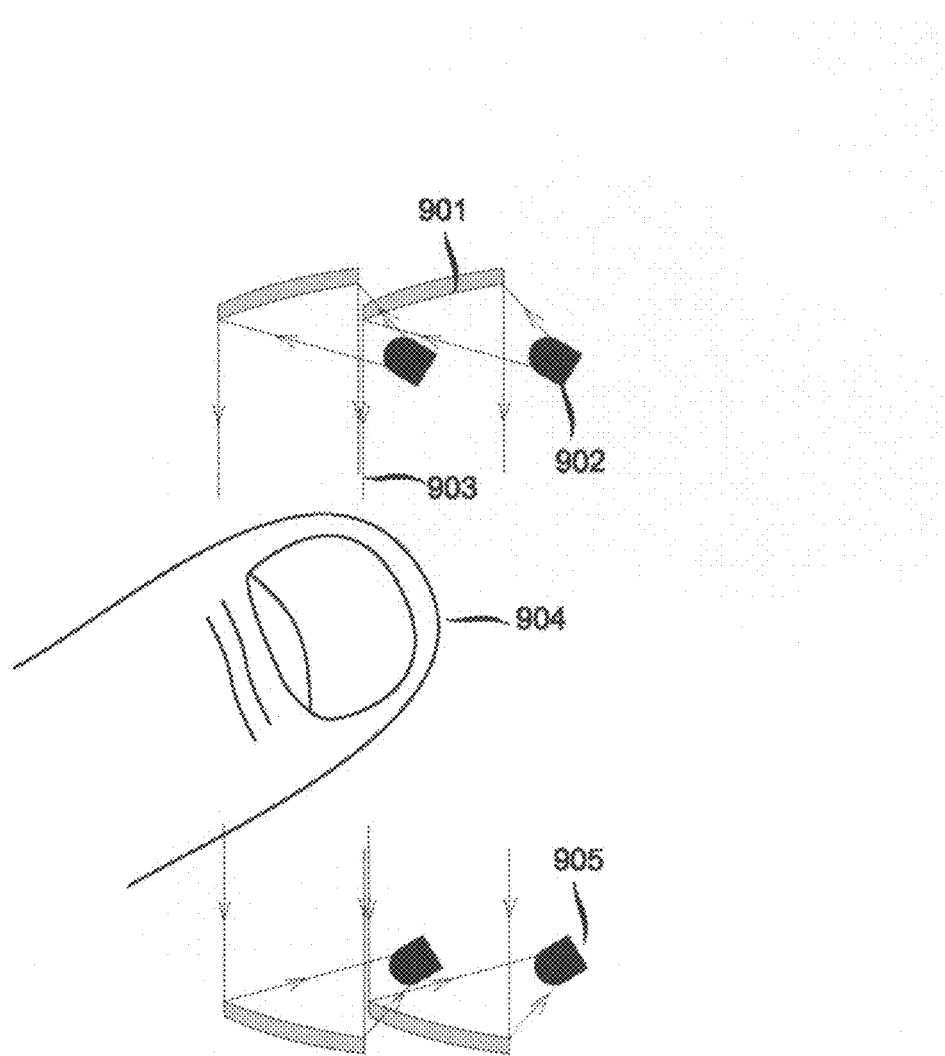
FIG. 30 is a simplified illustration of an arrangement of photo diodes, photo transistors and optical elements that enable a touch screen system to read pointers that are smaller than the sensor elements, in accordance with an embodiment of the present invention.

Reference is made to FIG. 30, which is a simplified illustration of an arrangement of photo diodes, photo transistors and optical elements that enable a touch screen system to read pointers that are smaller than the sensor elements, in accordance with an embodiment of the present invention. Shown in FIG. 30 are a mirror or optical lens 901, an infrared LED 902, a reflected light beam 903, a pointer 904 and a PD 905. Mirror or optical lens 901 generates a wide light beam that is focused onto PD 905 by a second mirror or optical lens. The wide beam makes it possible to sense an analog change in the amount of light detected at PD 905 when a pointer blocks a portion of the wide beam. The wide beam enables sensing an analog change when pointer 904 is placed in front of mirror or lens 901. The wide beam also enables mounting the mirrors or lenses far apart from one another.

Without the wide beam, there are generally spaces between beams that go undetected, making it impossible to distinguish between a user dragging a pointer across the beams, and the user tapping on different beams. Moreover, with widely spaced narrow beams the pointer touch must be very precise in order to cross a narrow beam.

Touch Screen System Configuration No. 4

Touch screen system configurations nos. 4-14 relate to selective area touch; namely, the ability to localize pointer location detection to a sub-area of the screen. Selective area touch significantly reduces the cost of providing touch functionality for large screens, by limiting touch functionality to one or more designated areas of the screen; e.g., to one corner of the screen. In distinction, resistive and capacitive touch screen films cannot cover only a sub-area of the screen. In addition, resistive and capacitive touch screen technologies perform poorly when signal lines are long, as is the case for large screens where the signal lines extend the entire length or width of the screen, even if the touch location is confined to one corner of the screen.

Figure 31:
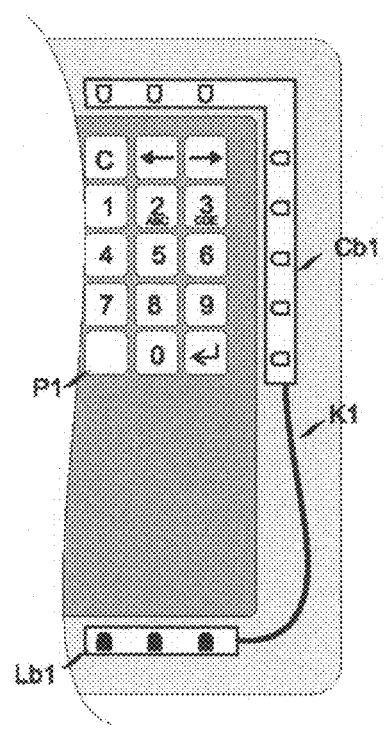
FIGS. 31-34 are simplified illustrations of touch screen systems with selective area touch, in accordance with an embodiment of the present invention.

Reference is made to FIG. 31, which is a simplified illustration of a touch screen system with selective area touch, in accordance with an embodiment of the present invention. Shown in FIG. 31 are three LEDs mounted on a printed circuit board (PCB) Lb1, and eight PDs mounted on a PCB Cb1. PCBs Lb1 and Cb1 are connected by a cable K1 to enable control via a single integrated circuit (not shown). The PDs are arranged three along the top, for detecting light blocked by a pointer near the surface of the screen; and five arranged along the side, for detecting light reflected by the pointer.

The configuration shown in FIG. 31 supports selective area touch, whereby touch screen functionality is enabled on only a portion of the screen. Selective area touch is advantageous inter alia for large screens, for which it would be costly and power consuming to provide touch functionality for the entire screen, due to the large number of LEDs and PDs required to surround the screen. By providing only a small number of LEDs and PDs along portions of the screen edges, the cost is reduced. Moreover, by positioning the PDs close to one another, high precision touch functionality is achieved in the touch sensitive area of the screen.

Shown in FIG. 31 are button icons P1 aligned with the PD arrangement; namely, three columns of buttons aligned with the three PDs along the top edge of the screen, and five rows of buttons aligned with the five PDs along the right edge of the screen. Such alignment enables accurate detection of which one of the buttons P1 is being touched by a user.

Touch Screen System Configuration No. 5

Figure 32:
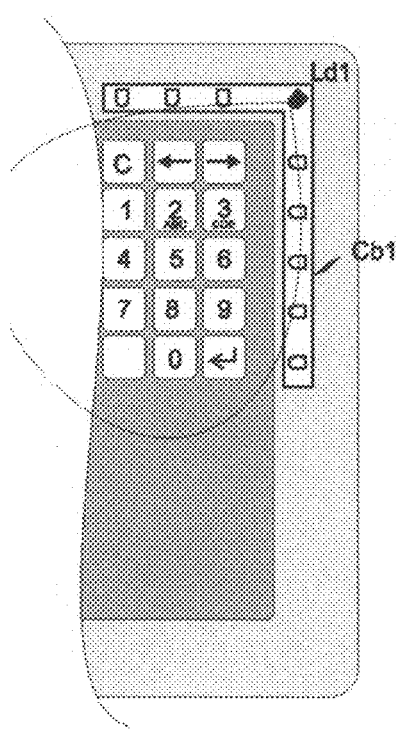

Reference is made to FIG. 32, which is a simplified illustration of another touch screen system with selective area touch, in accordance with an embodiment of the present invention. Shown in FIG. 32 is a single LED Ld1 and eight PDs mounted on a PCB Cb1. The PDs read light reflected from Ld1; i.e., light emitted by Ld1 that is reflected by a pointer (not shown) close to or touching the screen.

Touch Screen System Configuration No. 6

Figure 33:
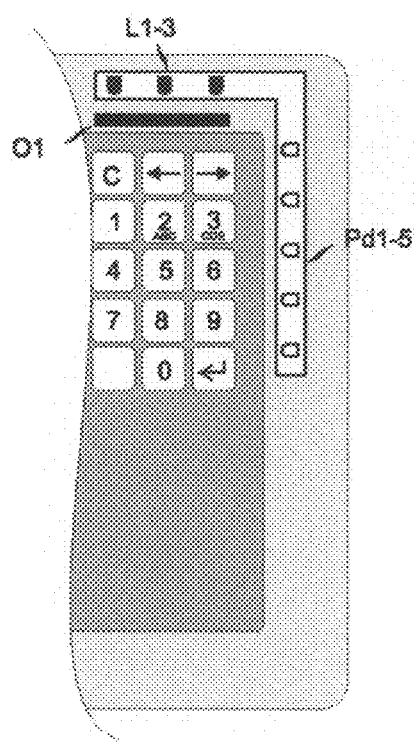

Reference is made to FIG. 33, which is a simplified illustration of another touch screen system with selective area touch, in accordance with an embodiment of the present invention. Shown in FIG. 33 are three LEDs L1, L2 and L3 and five PDs Pd1, Pd2, Pd3, Pd4 and Pd5 mounted on a PCB. Also shown in FIG. 33 is an optical element O1 which directs light emitted from the LEDs along a plane substantially parallel to and near the screen surface. The PDs read light reflected from the LEDs; i.e., light emitted by the LEDs that is reflected by a pointer (not shown) close to or touching the screen.

The LEDs are activated separately. If reflected light is detected at a PD, a column coordinate is determined based on the currently activated LED, and a row coordinate is determined based on the PD that detected the reflected light. E.g., if a pointer touches the button marked "1", the second from top PD detects reflected light when the leftmost LED is activated. Similarly, if a pointer touches the button marked "2", the second from top PD detects reflected light when the middle LED is activated. It will thus be appreciated by those skilled in the art that the two-dimensional location of a pointer touch is determined using a single row of LEDs, activated serially, and using a single column of PDs activated in parallel.

Touch Screen System Configuration No. 7

Figure 34:
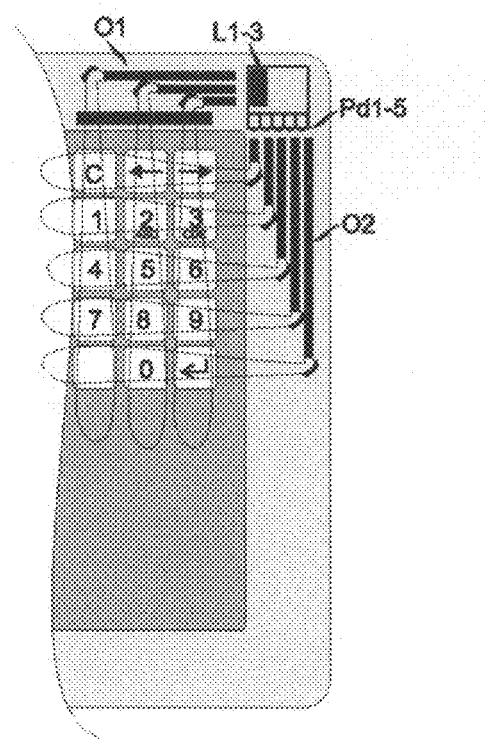

Reference is made to FIG. 34, which is a simplified illustration of another touch screen system with selective touch area, in accordance with an embodiment of the present invention. Shown in FIG. 34 are three LEDs L1, L2 and L3 and five PDs Pd1, Pd2, Pd3, Pd4 and Pd5, mounted close together on a small PCB. The PDs read light reflected from the LEDs. A first optical element O1 directs the light emitted from each LED over a corresponding column of the screen, and substantially parallel to the screen. A second optical element O2 directs the reflected light to the PDs. The system of FIG. 34 operates similar to the system of FIG. 33; however, optical elements O1 and O2 enable use of a small PCB to house all of the LEDs and PDs. Optical element O1 ensures that light from each LED is directed over a designed area of the screen. Optical element O2 ensures that light reflected by a pointer is directed from the designated area of the screen to the PDs.

Touch Screen System Configuration No. 8

Figure 35:
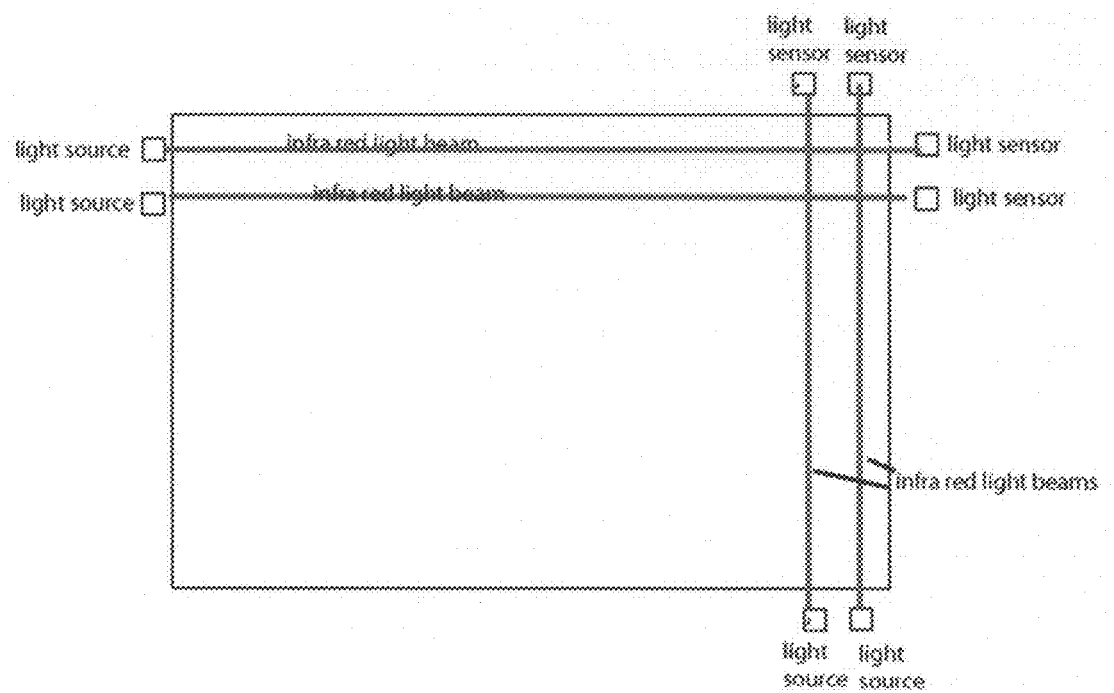
FIG. 35 is a simplified illustration of a touch screen with four LEDs and 4 PDs surrounding the screen, in accordance with an embodiment of the present invention.

Reference is made to FIG. 35, which is a simplified illustration of a touch screen with four LEDs and 4 PDs surrounding the screen, in accordance with an embodiment of the present invention. The touch screen shown in FIG. 35 is generally a large screen; e.g., a 42" television display.

Figure 36:
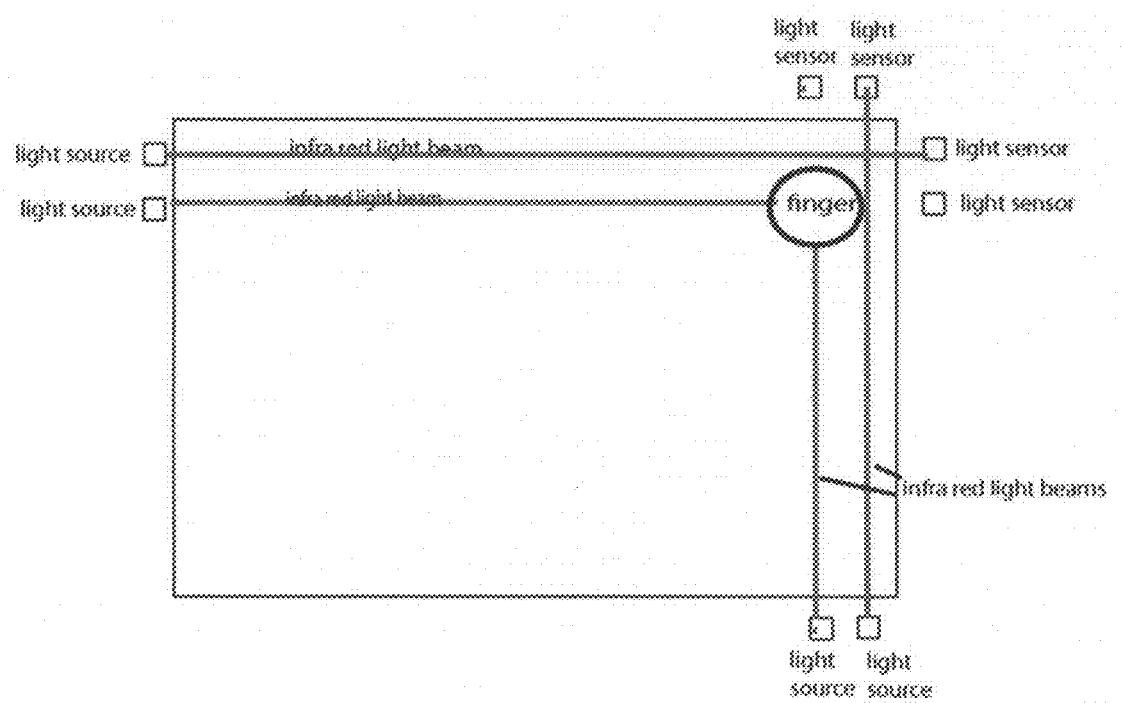
FIG. 36 is a simplified illustration of a finger blocking two of the light beams of FIG. 35, in accordance with an embodiment of the present invention.

Reference is also made to FIG. 36, which is a simplified illustration of a finger blocking two of the light beams of FIG. 36, in accordance with an embodiment of the present invention. The light blocked by the finger is detected by respective PDs, and indicates the location of the finger. A user interface displays icons or buttons on the screen at positions aligned with the positions of the LEDs and the PDs, where placement of a pointer can be detected.

Touch Screen System Configuration No. 9

In accordance with an embodiment of the present invention, more LEDs and PDs than those shown in FIGS. 35 and 36 are employed, positioned closer together. E.g., instead of two LEDs per each of the two edges as in FIGS. 35 and 36, 10 LEDs are placed along each of the two edges, spaced 5 mm apart from one another, concentrated in one portion of each edge. A corresponding number of PDs are positioned in a similar dense arrangement in portions of the other edges. The light beams emitted by the LEDs thus form a dense matrix over a sub-area of the screen.

Such an arrangement of LEDs and PDs enables accurate precision detection of touches and gestures in the touch sensitive sub-area of the screen. As shown in FIGS. 35 and 36, the photodiodes are preferably positioned close to the touch sensitive sub-area of the screen. Such an arrangement improves accuracy of pointer touch location detection, since each touch is close to the PD that senses its location.

Touch Screen System Configuration No. 10

Figure 37:
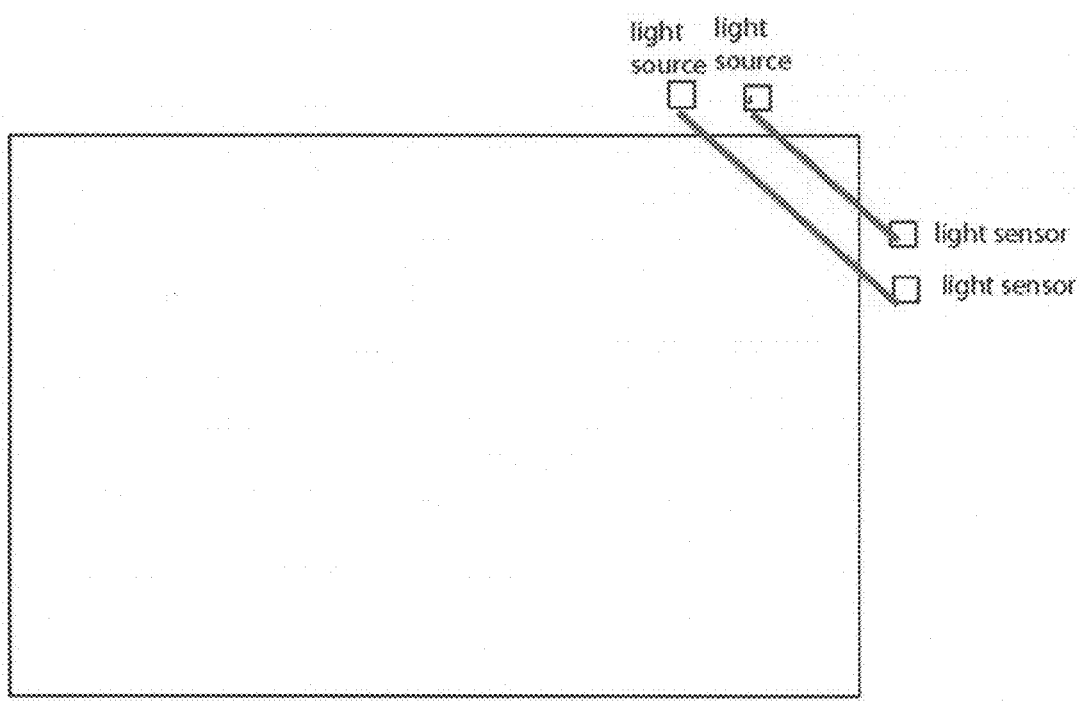
FIG. 37 is a simplified illustration of a touch screen with light beams that are focused diagonally relative to the screen edges, in accordance with an embodiment of the present invention.

Reference is made to FIG. 37, which is a simplified illustration of a touch screen with light beams that are focused diagonally relative to the screen edges, in accordance with an embodiment of the present invention.

Figure 38:
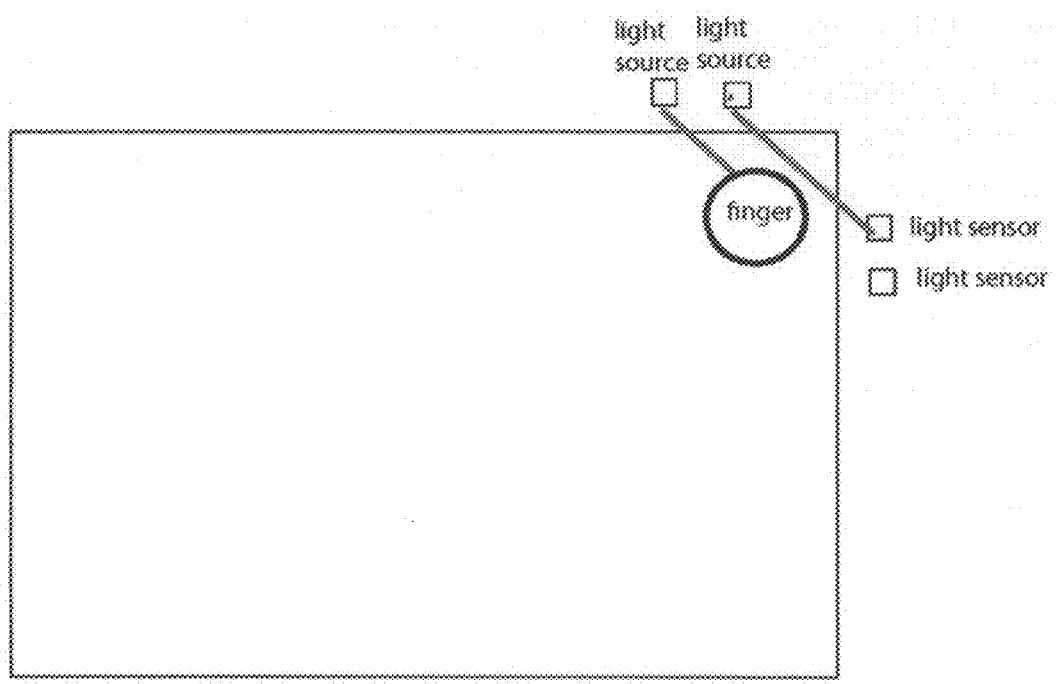
FIG. 38 is a simplified illustration of a finger blocking one of the light beams of FIG. 37, in accordance with an embodiment of the present invention.

Reference is also made to FIG. 38, which is a simplified illustration of a finger blocking one of the light beams of FIG. 37, in accordance with an embodiment of the present invention. FIGS. 37 and 38 show that location of a pointer touching the screen can be determined by a single light beam that is blocked. Such a configuration is of particular advantage when only a few buttons are needed to operate a user interface of a device.

Touch Screen System Configuration No. 11

Figure 39:
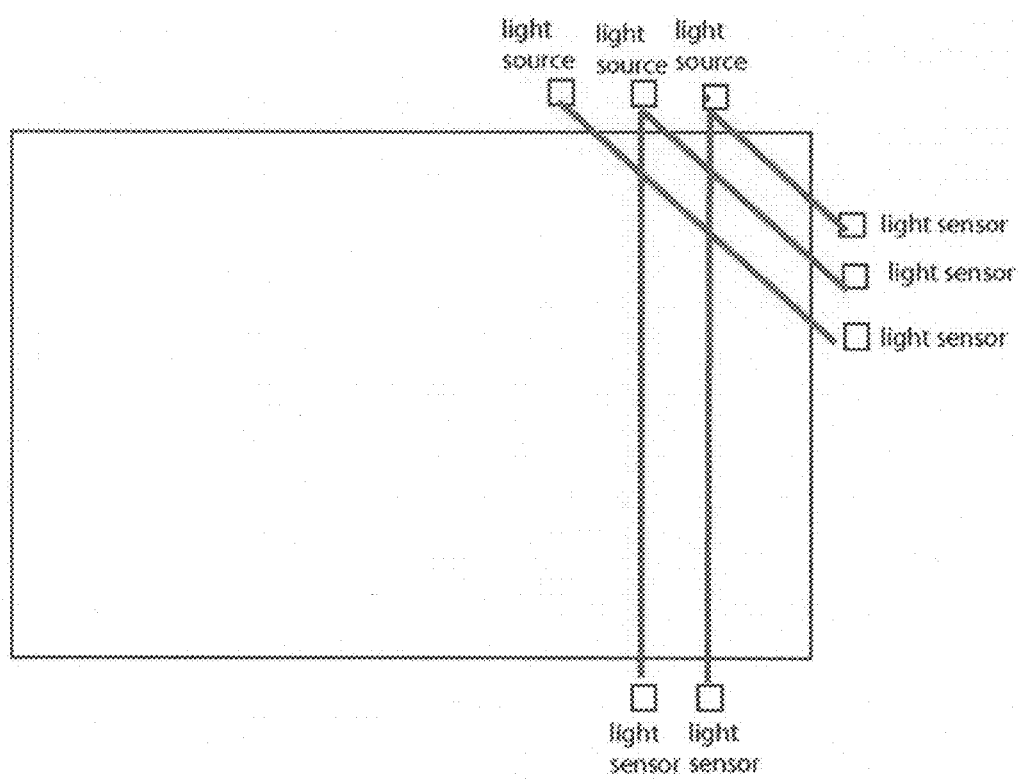
FIG. 39 is a simplified illustration of a touch screen that uses light beams projected in two non-orthotomic directions (i.e., the beams do not intersect at right angles) across a portion of the screen surface, in accordance with an embodiment of the present invention.

Reference is made to FIG. 39, which is a simplified illustration of a touch screen that uses light beams projected in two non-orthotomic directions (i.e., the beams do not intersect at right angles) across a portion of the screen surface, in accordance with an embodiment of the present invention. FIG. 39 also shows that light from a single LED can be sensed by sensors positioned along different screen edges, by guiding the lights beams in multiple directions.

Such a configuration provides multiple screen coordinates that can be distinguished based on a combination of PDs that detect blocked light. E.g., each point of intersection between two beams is uniquely identified by two PDs that detect blocked light. Moreover, if only a single PD detects missing light, it can be inferred that the pointer has been placed along the blocked light beam away from the area where the beams intersect. Thus additional buttons or icons can be placed on the screen anywhere along the path of a beam and away from the area where the beams intersect. When only a single beam is detected as being blocked, the user interface may activate a function corresponding to the additional icon or button associated with the single beam, as it infers that a pointer is touching it.

Touch Screen System Configuration No. 12

Figure 40:
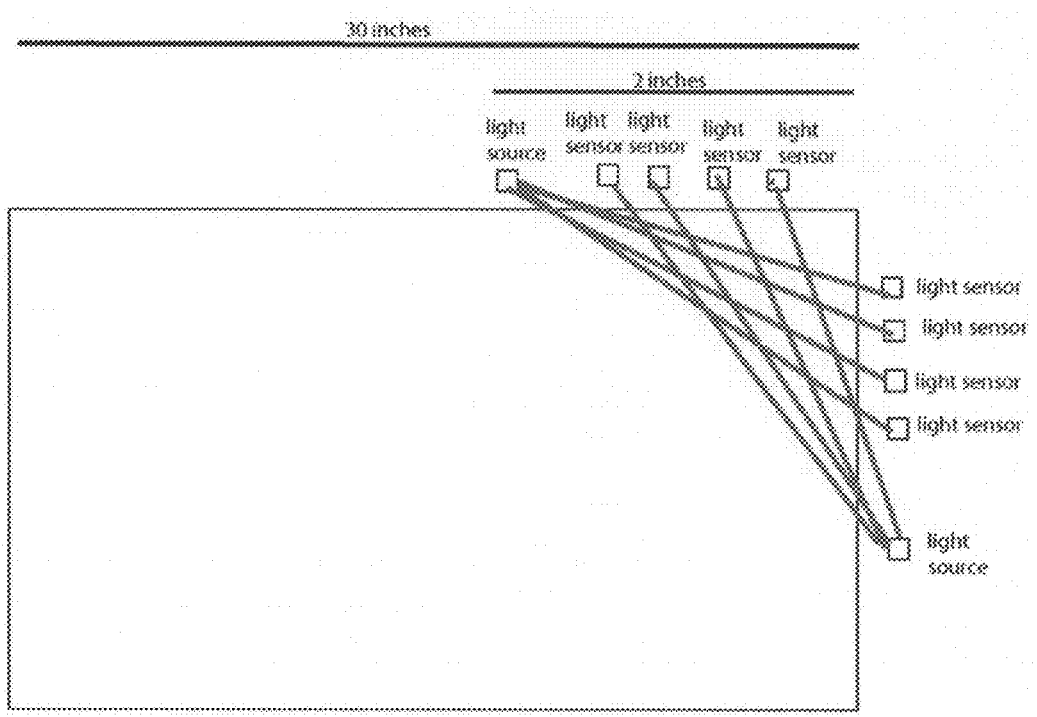
FIG. 40 is a simplified illustration of a touch screen wherein along each of two adjacent screen edges a single LED and multiple PDs are arranged, in accordance with an embodiment of the present invention.

Reference is made to FIG. 40, which is a simplified illustration of a touch screen wherein along each of two adjacent screen edges a single LED and multiple PDs are arranged, in accordance with an embodiment of the present invention. A lens (not shown) directs light from each LED on one edge to each of the PDs on the other edge. In this configuration, the light beams are shorter than the dimensions of the screen. As shown in FIG. 40, nodes are generated by intersecting light beams. The location of a pointer touching a node is detected by a combination of photodiodes that detect blocked light.

Touch Screen System Configuration No. 13

According to an embodiment of the present invention, instead of one LED emitting light beams to multiple PDs, a plurality of LEDs positioned along a portion of a first screen edge emit light beams to a like plurality of PDs along a section of a second adjacent screen edge. Furthermore, a plurality of LEDs positioned along a section of the second edge emit light beams to a like plurality of PDs along a section of the first screen edge. Along the first and second edges, the LEDs and PDs are interlaced as PD LED PD LED PD LED .... The light beam emitted from an LED on one edge is directed by one or more lenses to one or more PDs along the adjacent edge. The plurality of light beams emitted by an LED, directed by a lens, and received by a PD, thus form a crisscross pattern over a sub-area of the screen, thereby enabling accurate detection of pointer touch locations and pointer gestures.

Touch Screen System Configuration No. 14

Touch screen configuration no. 14 is particularly useful for devices with large screens, including inter alia notebook computers, GPS navigators, electronic games and toys, digital photo frames, monitors, TVs and e-books, where high image fidelity and low cost are important. No overlay covers the display. The number of LEDs and PDs is kept to a minimum necessary to detect the user inputs that are required, such as text and number input.

For electronic games, digital photo frames, monitors, TVs and e-books, picture quality is a very important factor. Specifically, such devices require full clarity, making an overlay undesirable. Such devices also require pure and real colors, a wide viewing angle, a high contrast ratio and a high brightness. Picture quality depends to some extent on the cost and quality of the LCD screen. High quality LCDs are expensive, but provide the best picture quality.

Conventional touch screen systems, such as resistive and capacitive based systems, have several drawbacks. They require additional glass or plastic layers over the LCD glass, which causes a reduction of picture quality. They have undesirable reflections from internal layers of the screen, reduced contrast ratio, altered colors, reduced viewing angle and increased backlight requirements.

Moreover, the cost of a device such as a digital photo frame is dominated primarily by the LCD and by the application processor and its memory. Resistive and capacitive overlays of conventional touch screens can double the cost of the device.

The touch screen systems of the present invention overcome all of these drawbacks. Touch screen systems of the present invention use a small bezel around the display screen, as a lens to project an invisible light field across the display surface. The bezel is generally comprised of an infrared-transparent plastic. For some devices, such as inter alia digital photo frames, a bezel is desirable since it resembles a conventional photo frame.

Below the bezel, LEDs and photo receptors are arranged on opposite sides of the screen. A controller pulses the LEDs to create invisible light fields across the display surface. When a pointer touches the screen, it obstructs the light field. The blocked light is detected by the photo receptors, and used to determine the location of the touch. Additional signal processing is used to identify a multi-touch, a pointer contour, and high speed sweeps and other gestures.

The touch screen systems of the present invention have a fast sampling rate, and are able to detect high speed movements on the screen to accurately trace complex finger or stylus gestures. The touch screen systems of the present invention can detect multiple simultaneous pointer touches, can measure the area of each touch, and track each pointer's motion and velocity.

Figure 41:
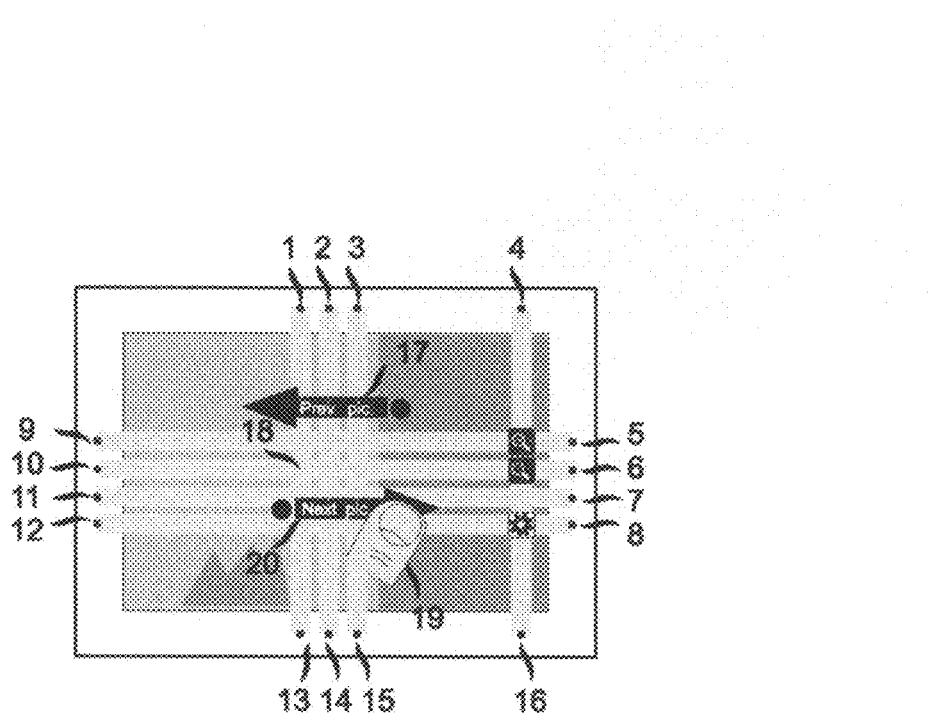
FIG. 41 is a simplified illustration of a touch screen system with eight LEDs positioned along two adjacent edges of a display area, and eight PDs positioned along the opposite edges of the display area, in accordance with an embodiment of the present invention.

Reference is made to FIG. 41, which is a simplified illustration of a touch screen system with eight LEDs positioned along two adjacent edges of a display area, and eight PDs positioned along the opposite edges of the display area, in accordance with an embodiment of the present invention. Shown in FIG. 41 are infra-red LEDs 1-8 positioned along two adjacent edges of a display area, and infra-red photo detectors 9-16 positioned along opposite edges of the display area. Each LED at one edge of the display area, with a corresponding photo detector at the opposite edge of the display, defines a detection line. Detection lines are horizontally or vertically oriented. When an LED is turned on, the corresponding photo detector opposite the LED senses the light from the LED. This light is the expected light. However, the presence of a pointer on the detection line blocks the expected light, and is detected when at least a portion of the expected light from the LED is not detected by the photo detector.

Horizontal and vertical detection lines intersect at intersection points. Point 18 is one such intersection point. A pointer 19 may sweep over a portion of the display area, thus creating a gesture. An arrow 20 indicates a sweep gesture performed by pointer 19. The sweep gesture is detected by photo detectors 13, 14 and 15 sensing an absence of expected light from corresponding LEDs 1, 2 and 3, due to pointer 19 blocking light from the LEDs as it sweeps over the display area. Absence of light is sensed serially from left to right; i.e., as pointer 19 sweeps from left to right photo detector 13 detects an absence of expected light, then photo detector 14 detects an absence of expected light, and then photo detector 15 detects an absence of expected light. Similarly, absence of expected light is sensed serially from right to left when pointer 19 sweeps from right to left.

In general, a left-to-right sweep is detected when at least two detection lines are swept over from left to right. A left-to-right sweep activates a user interface command, such as inter alia a command to display a previous picture in a sequence of pictures displayed on a photo frame, or a command to display a previous page of an e-book.

An arrow 17 indicates a sweep gesture in the opposite direction to that of arrow 20; namely, from right to left. A right-to-left sweep activates a user interface command, such as inter alia a command to display a next picture in a sequence of pictures displayed on a photo frame, or a command to display a next page of an e-book.

A left-to-right or right-to-left sweep can be detected anywhere over the vertical detection lines; i.e., a sweep need not traverse intersection points. Similarly, an up or down sweep can be detected anywhere over the horizontal detection lines. As such, additional gesture support is provided outside the intersection points. The user interface can thus display buttons at intersection points and indicate sweeps outside of the button area. The interface can indicate a sweep by an arrow or by a dynamic video object that slides along the path of the sweep. According to an embodiment of the present invention, the user interface enables a user to toggle sweep detection on and off. In this case, a detected sweep activates a user interface command only when sweep detection is turned on.

According to another embodiment of the present invention, the user interface enables a user to select a user interface mode from a plurality of possible modes. Each user interface mode associates a different set of commands with sweep gestures. E.g., a first mode is a standard viewing mode, in which a right-to-left sweep navigates to a next picture or page, and a left-to-right sweep navigates to a previous picture or page. A second mode is a zoom mode, in which a picture or page being viewed is larger than the display, and only a portion of the picture or page is displayed. The displayed portion is referred to as the "visible window". In zoom mode, sweep gestures are used to pan the picture or page; i.e., to display different portions of the picture or page, effectively sliding the visible window over the picture or page. A right-to-left sweep may, for example, pan the picture or page to the left, to display a portion of the picture or page that was previously outside to the right of the display area, effectively sliding the visible window to the right. Similarly, a left-to-right sweep may, for example, pan the picture or page to the right, to display a portion of the picture or page that was previously outside to the left of the display area, effectively sliding the visible window to the left. A vertical sweep may, for example, pan the picture or page upwards or downwards. Diagonal sweeps may also be detected as combined horizontal and vertical sweeps, to pan the picture or page in a diagonal direction.

Figure 42:
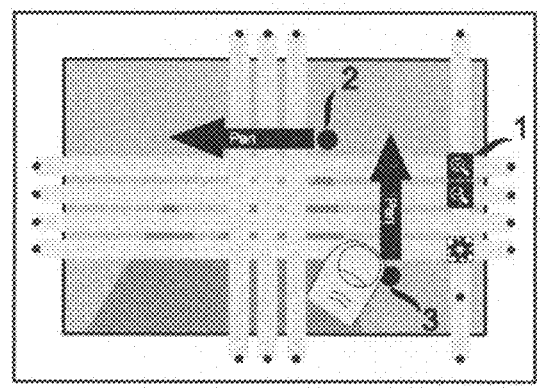
FIG. 42 is a simplified illustration of a zoom user interface mode for panning pictures or pages by using sweep gestures, in accordance with an embodiment of the present invention.

Reference is now made to FIG. 42, which is a simplified illustration of a zoom user interface mode for panning pictures or pages by using sweep gestures, in accordance with an embodiment of the present invention. When a pointer sweeps over two or more adjacent vertical detection lines from right to left, the currently displayed picture or page is panned to the left. When a pointer sweeps over two or more adjacent vertical detection lines from left to right, the currently displayed picture or page is panned to the right. When a pointer sweeps over two or more adjacent horizontal detection lines from top to bottom, the currently displayed picture or page is panned downwards. When a pointer sweeps over two or more adjacent horizontal detection lines from bottom to top, the currently displayed picture or page is panned upwards.

Shown in FIG. 42 is a zoom button 1 at a point of intersection of a horizontal and a vertical detection line. Tapping on zoom button 1 generates a user interface command, such as inter alia, toggling in and out of zoom mode, or changing the zoom factor to increase or decrease the magnification. An arrow 2 shows a right-to-left sweep gesture. An arrow 3 shows a bottom-to-top sweep gesture. The sweep gesture can be detected anywhere over the vertical and horizontal detection lines, except for the intersection points occupied by icons along the right side of the display area.

Figure 43:
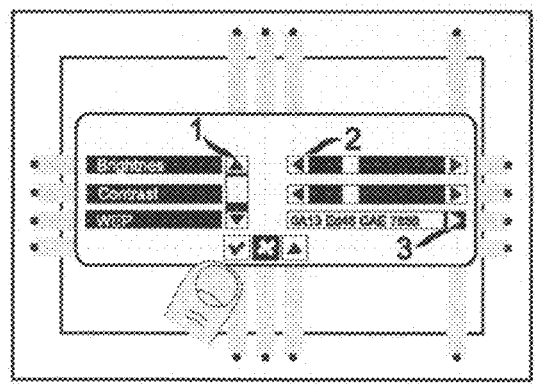
FIG. 43 is a simplified illustration of a menu user interface mode, in accordance with an embodiment of the present invention.

Reference is made to FIG. 43, which is a simplified illustration of a menu user interface mode, in accordance with an embodiment of the present invention. Three settings are shown in FIG. 43 along the left side of the screen; namely, brightness, contrast and wired equivalent privacy (WEP). A slide bar 1 indicates that additional settings are available. A tap on the up arrow shown at the top of slide bar 1 causes the three settings to change to other settings, thus navigating through a list of settings. A tap on the down arrow shown at the bottom of slide bar 1 causes the settings to navigate in the other direction through the list of settings.

A slide bar 2 indicates a current value of a corresponding setting; namely, a brightness setting, a contrast setting and a WEP character string. By tapping with a pointer on the right or left arrows of slide bar 2, a user causes the value of a setting to increment or decrement, respectively. An extended touch on the right of left arrow of slide bar 2 causes the value of a setting to increment or decrement continuously until the touch is released.

Each button in FIG. 43 is positioned at a cross point between intersecting detection lines, making it possible to identify which button is being touched by a pointer. A tap on icon 3 generates a user interface command to display an alphanumeric keypad for inputting text and numbers.

Figure 44:
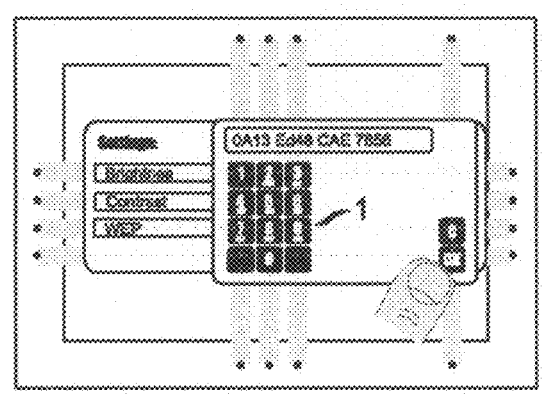
FIG. 44 is a simplified illustration of a text input user interface mode, in accordance with an embodiment of the present invention.

Reference is made to FIG. 44, which is a simplified illustration of a text input user interface mode, in accordance with an embodiment of the present invention. By using repeated taps, referred to as "mufti-tap" with the displayed keyboard, a user selects one of a plurality of characters associated with a button. As such, a full set of characters and numbers are available for input. In addition, a predictive text algorithm, such as T9, may be used to assist the user in inputting words. A button 1, shown in FIG. 44, is associated with the characters w, x, y, z and the number 9. Each button is positioned at a cross point between horizontal and vertical detection lines, thus making it possible to detect which button a pointer is touching.

Touch Screen System Configuration No. 15

Touch screen system configurations nos. 15-29 relate to reflective elements that are embedded in a glass front for a touch screen system.

Figure 45:
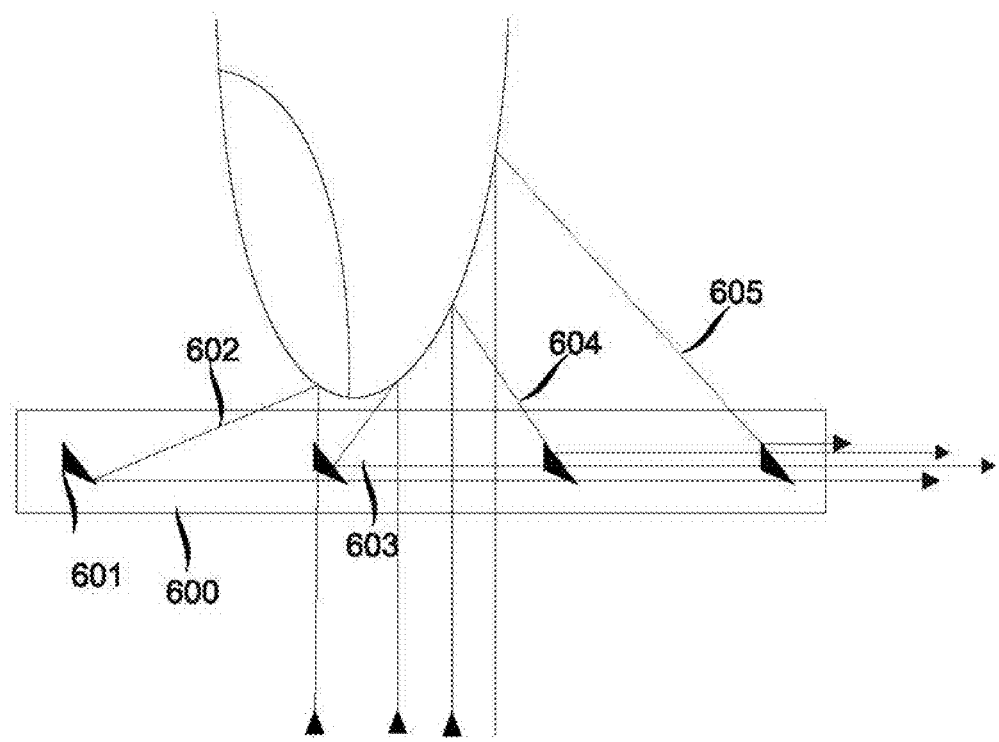
FIGS. 45 and 46 are simplified illustrations of touch screen systems with embedded reflective elements, in accordance with an embodiment of the present invention.

Reference is made to FIG. 45, which is a simplified illustration of a touch screen system with embedded reflective elements, in accordance with an embodiment of the present invention. Shown in FIG. 45 is a glass 600 with reflective elements 601 embedded therein. Light generated from under glass 600 by a backlight or an organic light emitting diode (OLED) hits a finger, and generates reflected light rays 602, 603, 604 and 605. The reflected rays are directed by reflective elements 601 through glass 600 to one or more photo detectors.

Touch Screen System Configuration No. 16

Figure 46:
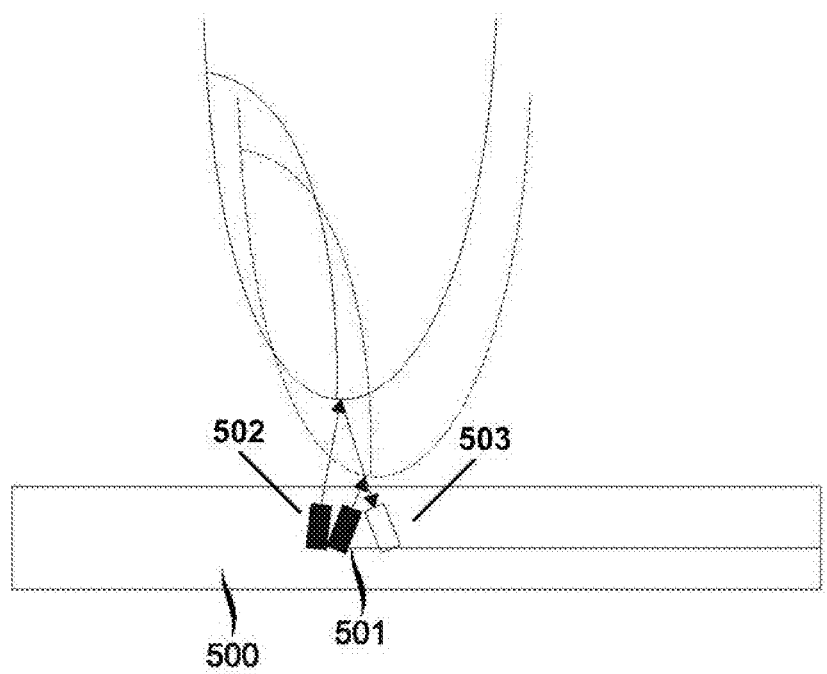

Reference is made to FIG. 46, which is a simplified illustration of another touch screen system with embedded reflective elements, in accordance with an embodiment of the present invention. Shown in FIG. 46 is a glass 500 with light emitting elements 501 and 502 embedded therein, and a photo detector 503 also embedded in glass 500 or situated beneath glass 500. Light emitting elements 501 and 502 are arranged to emit light at different angles, enabling determination of the height of a pointer over glass 500 based on the light reflected by the pointer.

The finger in FIG. 46 is shown at two heights above glass 500. Light emitting elements 501 and 502 are activated separately in order to determine which light emitter is detected by photo detector 502. Since light emitters 501 and 502 emit beams at different angles relative to glass 500, when the finger is farther from glass 500, light from light emitter 502 is detected by photo detector 503 and light from light emitter 501 is not detected; and when the finger is placed closer to glass 500, light from light emitter 501 is detected by photo detector 503, and light from light emitter 502 is not detected. Since light emitters 501 and 502 are activated separately, the location and orientation of a light emitter determines the location and height of the finger above glass 500.

In general, the number of light emitters and photo detectors used in a specific system varies depending on the required functionality, on the resolution and on cost constraints. For some systems, the light emitters and photo detectors are strategically placed so as to detect touch and proximity at designated screen locations used by user interface icons and gestures. As such, placement and orientation of the light emitters and photo detectors is based on the user interface design. A touch screen controller uses the known locations and orientations of the light emitters and photo detectors to calculate the location and height of a finger approaching the screen or of a finger touching the screen.

Touch Screen System Configuration No. 17

Figure 47:
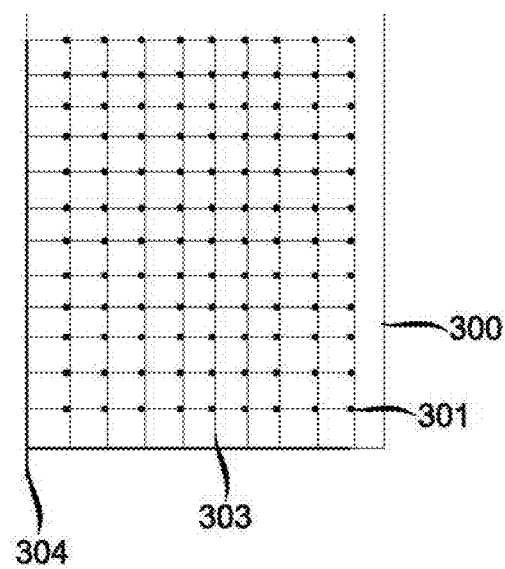
FIG. 47 is a simplified illustration of a touch screen system with embedded photo receiver elements, in accordance with an embodiment of the present invention.

Reference is made to FIG. 47, which is a simplified illustration of a touch screen system with embedded photo receiver elements, in accordance with an embodiment of the present invention. Shown in FIG. 47 are a glass 300, photo receiver elements 301, a row control line 303 for reading signals from a row of photo receiver elements 301, and a control line 304 for reading signals from all such row control lines 303. Photo receiver elements 301 are embedded into glass 300, and function to read a picture of a pointer using display light, i.e., light emitted by the display that is reflected back onto the glass 500 by one or more pointers, or using ambient light, or using a combination of display light and ambient light.

Touch Screen System Configuration No. 18

Figure 48:
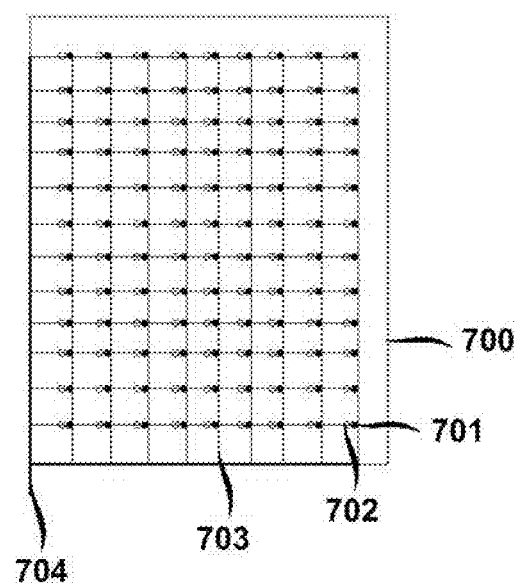
FIG. 48 is a simplified illustration of a touch screen system with embedded light sources and embedded photo receiver elements, in accordance with an embodiment of the present invention.

Reference is made to FIG. 48, which is a simplified illustration of a touch screen system with embedded light sources and embedded photo receiver elements, in accordance with an embodiment of the present invention. Shown in FIG. 48 are a glass 700, photo receiver elements 701, light sources 702, a row control line 703 for controlling a row of light sources 702 and for reading signals from a row of photo receiver elements 701, and a control line 704 for controlling all such row control lines 703 and for reading signals from all such row control lines 703.

Touch Screen System Configuration No. 19

Figure 49:
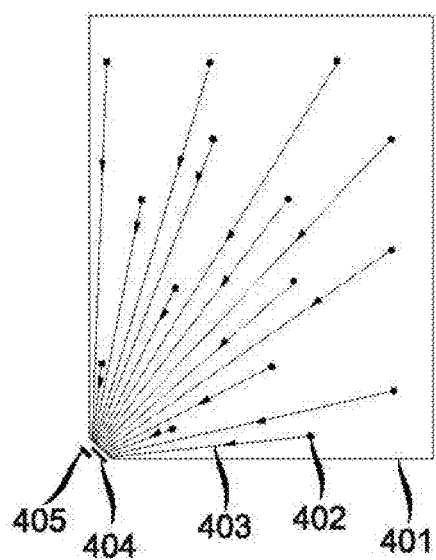
FIG. 49 is a simplified illustration of a touch screen system with a picture array that reads incoming light from spread locations, in accordance with an embodiment of the present invention.

Reference is made to FIG. 49, which is a simplified illustration of a touch screen system with a picture array that reads incoming light from spread locations, in accordance with an embodiment of the present invention. Shown in FIG. 49 is a glass 401, an area 402 with embedded reflective elements that break light into glass 401, directed light 403, a two-dimensional or three-dimensional picture array 404, and an additional light source 405. Light from each reflective element in the screen is projected to a corresponding location on picture array 404, thereby enabling detection of the location of the reflective element that is being touched, based on the location of the pixel in picture array 404 that detects the touch.

When light emitted by the screen is used to detect the location of a pointer touching the screen, the touch corresponds to an increase in detected light, since the pointer reflects projected light back onto picture array 404 via a reflective element. In distinction, when ambient light is used to detect the location of a pointer touching the screen, the touch corresponds to a decrease in detected light, as the pointer blocks ambient light from being protected onto picture array 404 via a reflective element.

Alternatively, the image at picture array 404 may be analyzed to locate contours of a pointer touching the screen. In this case, the image at picture array 404 corresponds to an image of the screen surface.

Figure 50:
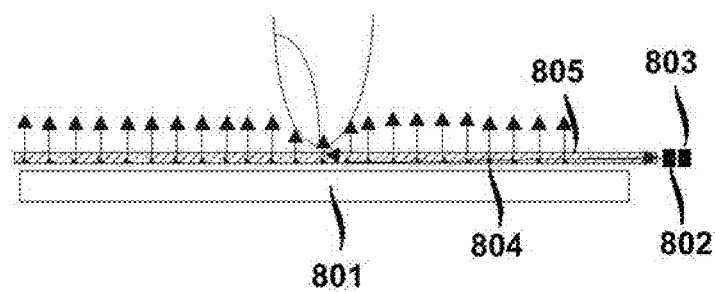
FIG. 50 is a simplified illustration of light from a pointer being reflected back into the touch screen of FIG. 49, in accordance with an embodiment of the present invention.

Reference is made to FIG. 50, which is a simplified illustration of light from a pointer being reflected back into the touch screen of FIG. 49, in accordance with an embodiment of the present invention. Shown in FIG. 50 is a display 801, a photo detector 802, an additional light source 803, embedded reflective elements 804 and a glass front 805 for the display 801.

Inside glass front 805 are embedded reflective elements that (i) redirect light arriving from light source 803 to project the light above the screen, as indicated by the arrows pointing up in FIG. 50, and (ii) direct light that is reflected by a pointer back into the screen, to photo detector 802.

Figure 51:
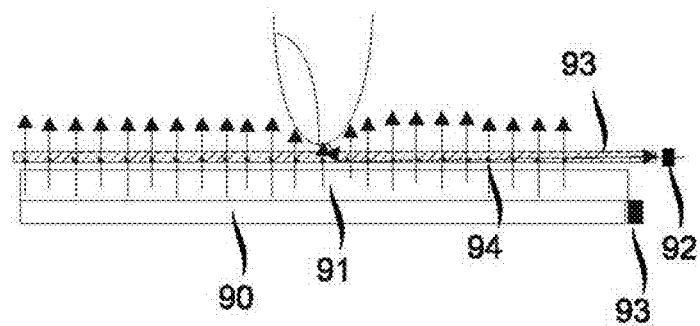
FIG. 51 is a simplified illustration of light from a display being reflected from a pointer back into the touch screen of FIG. 49, in accordance with an embodiment of the present invention.

Reference is made to FIG. 51, which is a simplified illustration of light from a display being reflected from a pointer back into the touch screen of FIG. 49, in accordance with an embodiment of the present invention. Shown in FIG. 51 is a backlight 90, a display 91, a photo detector 92, a protection glass 93 and an LCD 94. Embedded inside protection glass 93 are reflective elements that direct light reflected by a pointer back into the screen, to photo detector 92. The backlight from display 91 is modulated and synchronized with photo detector 92.

Figure 52:
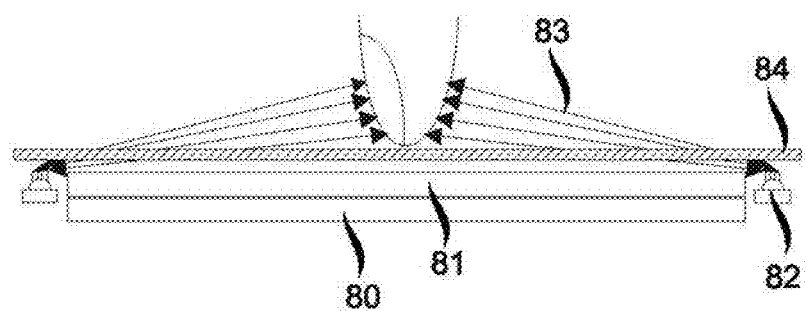
FIG. 52 is a simplified illustration of light under a glass being reflected from a pointer back into a touch screen, in accordance with an embodiment of the present invention.

Reference is made to FIG. 52, which is a simplified illustration of light under a glass being reflected from a pointer back into a touch screen, in accordance with an embodiment of the present invention. Shown in FIG. 52 is a main board 80, a display 81, a light receiver 82, light beams 83 and a protection glass 84. No reflective elements are required to be embedded in protection glass 84. Light is projected in an arc above the screen surface, and a pointer substantially reflects oncoming light beams in the opposite direction, so as to be detected by light receiver 82. Light receiver 82 is preferably a pixel array that detects a plurality of light beams. Analysis of saturated pixels indicates the location of the touch pointer.

Touch Screen System Configuration No. 20

Figure 53:
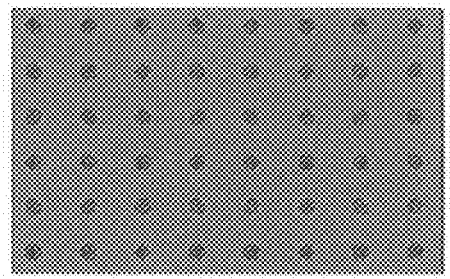
FIG. 53 is a simplified illustration of a touch screen having detection points with reflective elements embedded in the screen glass, in accordance with an embodiment of the present invention.

Reference is made to FIG. 53, which is a simplified illustration of a touch screen having detection points with reflective elements embedded in the screen glass, in accordance with an embodiment of the present invention. A screen glass has reflective elements embedded in the glass, shown in FIG. 53 as dots. The dots are shown organized in the geometry of a lattice. LEDs emitting infra-red or near infra-red light are used as light sources for the touch screen.

The LEDs emit light from the edge of the screen glass through the glass, as described hereinabove with reference to FIG. 50. The light is projected upward by the embedded reflective elements. A pointer reflects the upward projecting light back onto a reflective element, and the reflective element projects the light back onto a light sensor, or onto an image sensor with a two-dimensional pixel array.

Figure 54:
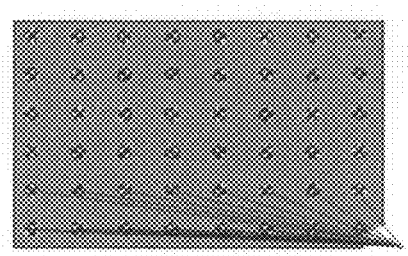
FIG. 54 is a simplified illustration of a light source positioned at a corner of the touch screen of FIG. 53, in accordance with an embodiment of the present invention.

Reference is made to FIG. 54, which is a simplified illustration of a light source positioned at a corner of the touch screen of FIG. 53, in accordance with an embodiment of the present invention. In this embodiment, all of the emitted light beams are generated from the corner of the touch screen, with small angle variations between adjacent beams. As the distance between reflective elements and the light source increases, the angle between light beams directed at neighboring reflective elements decreases. As such, in large screens, such as 13" or 42" screens, the angle between light beams directed at neighboring reflective elements located at the far end of the screen is very small.

Preferably, a two-dimensional or three-dimensional picture array, similar to picture array 404 of FIG. 49, is used here as well. Light from each reflective element in the screen is projected to a corresponding location on the picture array, thus enabling determination of the location of the reflective element being touched based on the location of the pixel in the picture array that detects the touch.

In an alternative embodiment, the light source positioned at the corner of the touch screen is configured to emit successive beams of light individually. As such, only one light beam aimed at one reflective element is generated at any given time. When a pointer reflects the light back onto a light sensor (not shown), the touch screen determines the location of the pointer as corresponding to the location of the single reflective element at which the light beam is aimed.

Touch Screen System Configuration No. 21

Figure 55:
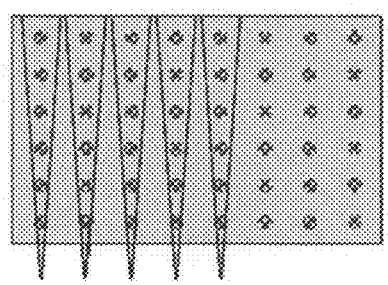
FIGS. 55 and 56 are simplified illustrations of light sources positioned along an edge of the touch screen of FIG. 53, in accordance with an embodiment of the present invention.
Figure 56:
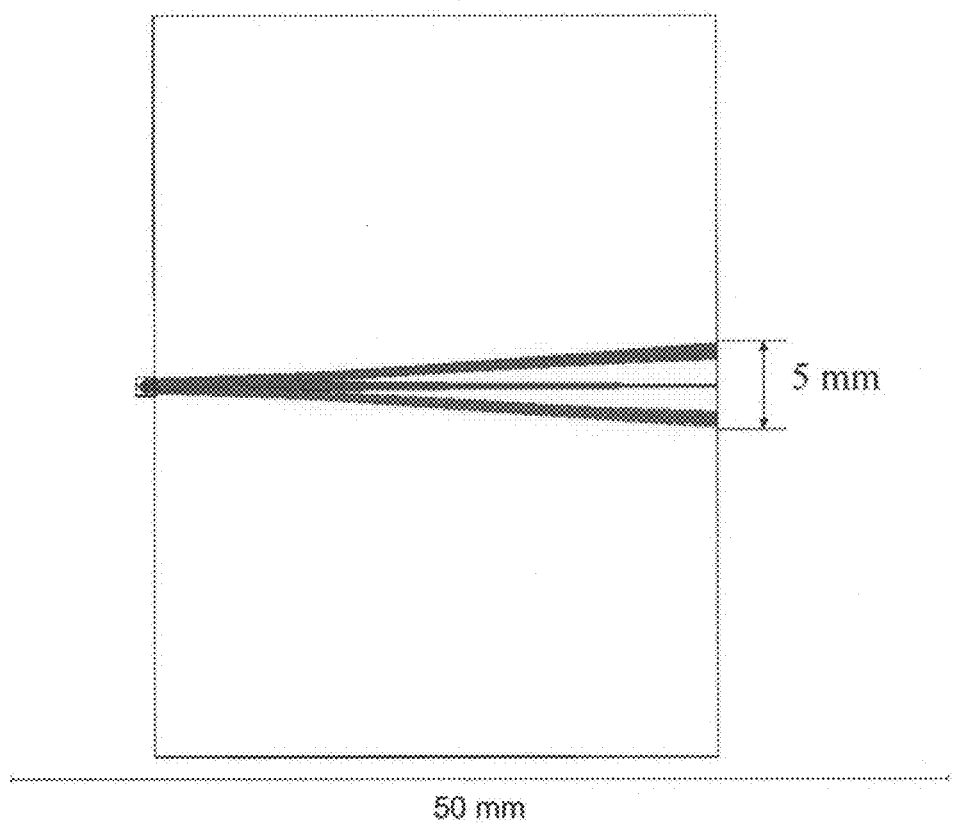

Reference is made to FIGS. 55 and 56, which are simplified illustrations of light sources positioned along an edge of the touch screen of FIG. 53, in accordance with an embodiment of the present invention. Preferably, as shown in FIG. 55, the touch screen system is arranged so that the light beams emitted by the light sources do not overlap; i.e., they generate non-overlapping cones. As such, there is an upper bound on the angle of each cone, which depends upon the width of the touch screen. E.g., if the light sources are arranged along the long screen edge spaced a distance d apart, and if the width of the touch screen is w, then the maximum angle is $$2 \cdot \tan^{-1}\left(\frac{d}{2w}\right) \approx \frac{d}{w}$$

(in radians). As such, if the light sources are spaced 5 mm apart, as in FIG. 56, then for a touch screen width of 30 mm the maximum angle is approximately 10°, and for a touch screen width of 110 mm the maximum angle is approximately 2.5°.

Figure 57:
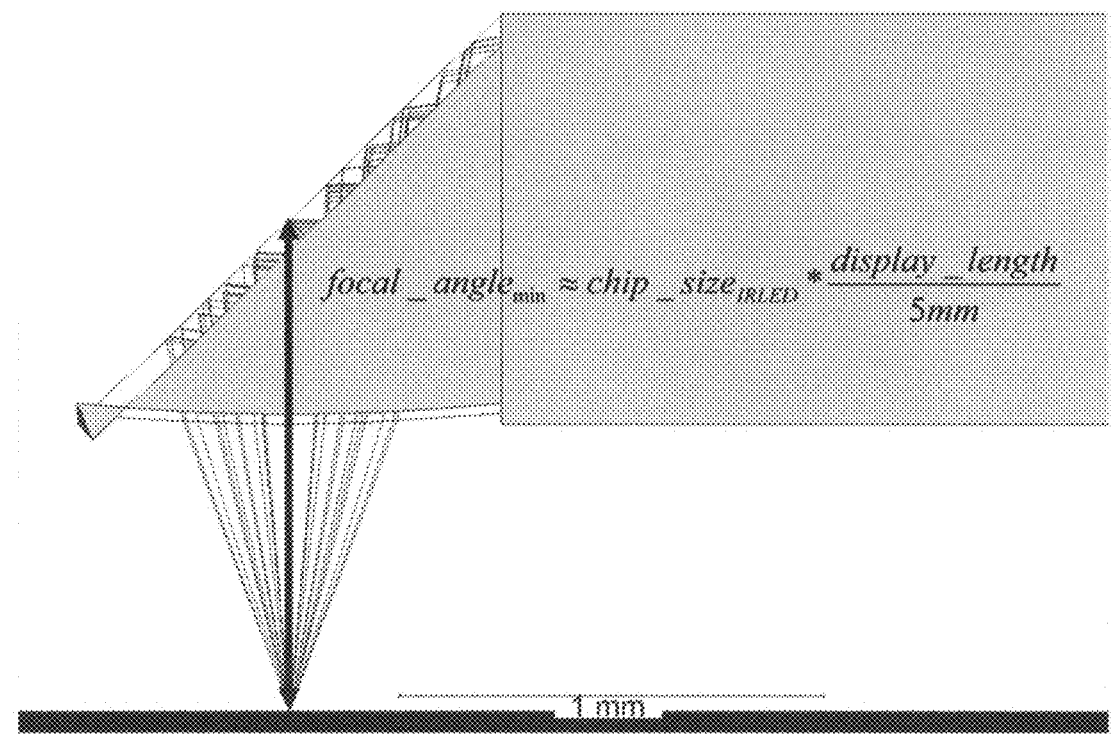
FIG. 57 is a simplified illustration of an arrangement of light sources projecting a cone of light through a first lens, and onto a second lens that projects the light across the screen, in accordance with an embodiment of the present invention.
Figure 58:
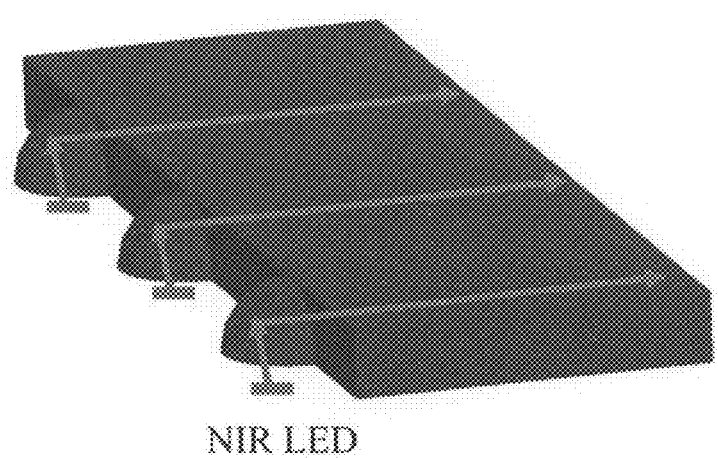
FIG. 58 is a simplified illustration of an arrangement of three light sources of FIG. 57, in accordance with an embodiment of the present invention.

Reference is made to FIG. 57, which is a simplified illustration of an arrangement of light sources projecting a cone of light through a first lens, and onto a second reflective lens that projects the light across the screen, in accordance with an embodiment of the present invention. Reference is also made to FIG. 58, which is a simplified illustration of an arrangement of three light sources of FIG. 57, in accordance with an embodiment of the present invention.

FIG. 57 shows one light source. A corresponding arrangement of lenses and reflective elements is placed at the opposite edge of the screen to direct light beams arriving over the screen onto a light sensor pixel array. As shown in FIG. 57, the reflective elements are oriented at the same angle, and the first lens is configured to break the light cone into separate beams such that each beam, when reflected by a reflective element, is directed over and substantially parallel to the screen surface.

In an alternative embodiment, small reflective elements are embedded in the reflective lens, oriented at a plurality of angles such that each reflective element reflects a corresponding light beam over and substantially parallel to the screen surface.

The reflected beams shown in FIGS. 57 and 58 are wide beams. Each wide beam covers a three-dimensional volume above the screen; namely, a two-dimensional swath on the screen surface and up to a specific height above the screen surface. The three-dimensional volume is traversed by the wide light beam. A pointer blocking a portion of the wide light beams is identified when the light sensor detects the blocked light. The amount of blocked light is used to determine the three-dimensional location of the pointer relative to x-, y- and z-axes.

As such, different amounts of light are detected for the following two cases, enabling discrimination between them: (i) a pointer hovering above the screen that blocks a portion of the light beam that is above the screen surface but that is not close to the screen surface; and (ii) a pointer touching the screen that blocks the light beam above the screen surface and also close to the screen surface. Similarly, different amounts of light are detected for the following two cases, enabling discrimination between them: (iii) a pointer touching the screen at the edge of a wide light beam; and (iv) a pointer touching the screen in the center of a wide light beam. Again, different amounts of light are detected in these two cases.

In an embodiment of the present invention, the pattern of detected light at neighboring light detectors is used to determine whether a pointer is touching the screen, or hovering above the screen. In another embodiment of the present invention, a time-series pattern of detected light is used to determine whether the pointer is moving across the screen horizontally, or approaching the screen vertically. In another embodiment of the present invention, a time-series pattern of detected light at neighboring light detectors is used to determine whether the pointer is moving across the screen horizontally or approaching the screen vertically.

In the case of a light sensor pixel array, the locations of the pixels that detect the blocked light are used to determine the location of the pointer.

Figure 59:
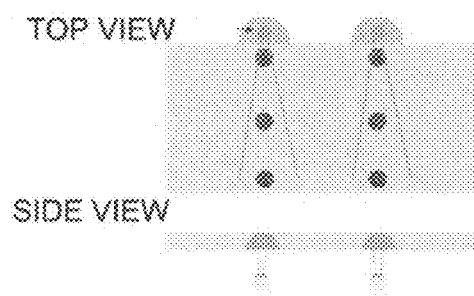
FIG. 59 is a simplified illustration of light sources from the arrangement of FIG. 55 with top-emitting LEDs, in accordance with an embodiment of the present invention.

Reference is made to FIG. 59, which is a simplified illustration of light sources from the arrangement of FIG. 55 with top-emitting LEDs, in accordance with an embodiment of the present invention. A PCB is positioned alongside the glass screen, and the LEDs are mounted on the PCB either on the side of the glass side or underneath the glass screen. An optical element, such as an elliptical mirror, is used to control the angles of the light cones. Shown in FIG. 59 are top and side views of two top-emitting LEDs and a reflector along an edge of the glass screen.

The arrangements of FIGS. 57 and 58 may be modified to project the light cones of FIG. 59, in which case the reflective elements direct the light onto a three-dimensional cone instead of a rectangular parallelepiped over the screen surface.

Touch Screen System Configuration No. 22

Figure 60:
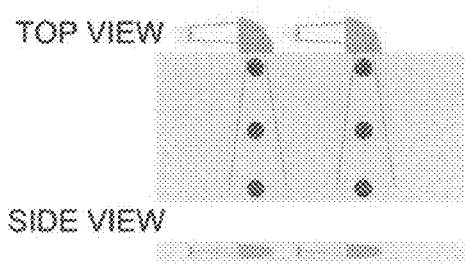
FIG. 60 is a simplified illustration of light sources from the arrangement of FIG. 55 with side-emitting LEDs, in accordance with an embodiment of the present invention.

Reference is made to FIG. 60, which is a simplified illustration of light sources from the arrangement of FIG. 55 with side-emitting LEDs, in accordance with an embodiment of the present invention. Shown in FIG. 60 are top and side views of two side-emitting LEDs and a reflector along an edge of the glass screen.

Touch Screen System Configuration No. 23

Figure 61:
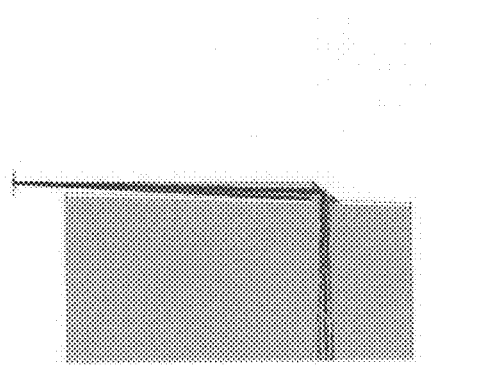
FIG. 61 is a simplified illustration of light guides that direct light to a desired location in a glass screen of a touch screen system, in accordance with an embodiment of the present invention.

Reference is made to FIG. 61, which is a simplified illustration of light guides that direct light to a desired destination in a glass screen of a touch screen system, in accordance with an embodiment of the present invention. As shown in FIG. 61, filamentary light guides direct light from along a side of the glass screen to a desired destination.

Touch Screen System Configuration No. 24

Figure 62:
FIG. 62 is a simplified illustration of a touch screen that serves as a light conductor, for guiding light emitted by an LED, in accordance with an embodiment of the present invention.

Reference is made to FIG. 62, which is a simplified illustration of a touch screen that serves as a light conductor, for guiding light emitted by an LED, in accordance with an embodiment of the present invention. FIG. 62 is a side view of a touch screen that acts as a light guide.

Figure 63:
FIG. 63 is a simplified illustration of the touch screen of FIG. 62 with microstructures embedded in the glass, in accordance with an embodiment of the present invention.

Reference is made to FIG. 63, which is a simplified illustration of the touch screen of FIG. 62 with microstructures embedded in the glass, in accordance with an embodiment of the present invention. FIG. 63 shows that microstructures embedded in the bottom of the touch screen leak portions of light through the top surface of the touch screen. Light reflected by a pointer touching the screen is led back into the light guide to a photo detector.

Touch Screen System Configuration No. 25

Figure 64:
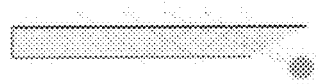
FIG. 64 is a simplified illustration of a touch screen that guides light over the surface of the touch screen, in accordance with an embodiment of the present invention.

Reference is made to FIG. 64, which is a simplified illustration of a touch screen that guides light over the surface of the touch screen, in accordance with an embodiment of the present invention. As shown in FIG. 64, light is led in along a parallel plane plate, and exits over the surface of the touch screen. Alternatively, a wedge-shaped plate may be used instead of a parallel plane plate.

Touch Screen System Configuration No. 26

Figure 65:
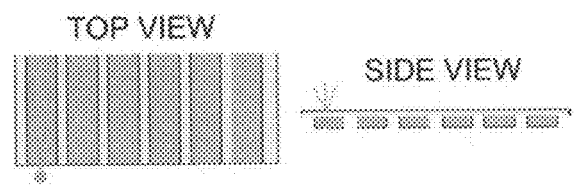
FIG. 65 is a simplified illustration of a touch screen with fibers integrated into the screen, in accordance with an embodiment of the present invention.

Reference is made to FIG. 65, which is a simplified illustration of a touch screen with fibers integrated into the screen, in accordance with an embodiment of the present invention. Small fibers are used to collect light from a light source and guide the light to a desired destination. The fibers may be round or square fibers, and may be arranged as a fan or as a lattice. Shown in FIG. 65 are top and side views of fibers arranged as a lattice. For some screens, the lattice arrangement is preferable, since a fan arrangement, in combination with the pixel structure of the display, may generate an undesired Moiré pattern.

The fibers may be inserted into the touch screen. Alternatively, the touch screen can be designed to be comprised of fibers.

Touch Screen System Configuration No. 27

Figure 66:
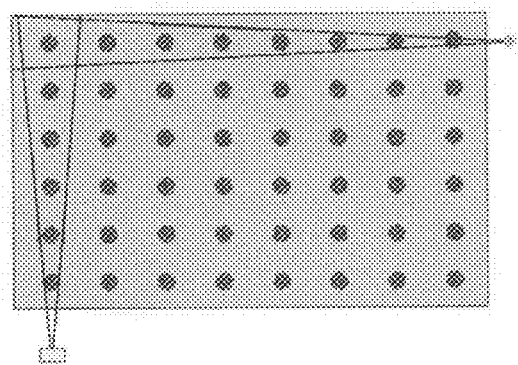
FIGS. 66-68 are simplified illustrations of a photo detector for the touch screen system of FIG. 53, which is mounted vertical to a light source, in accordance with an embodiment of the present invention.
Figure 67:
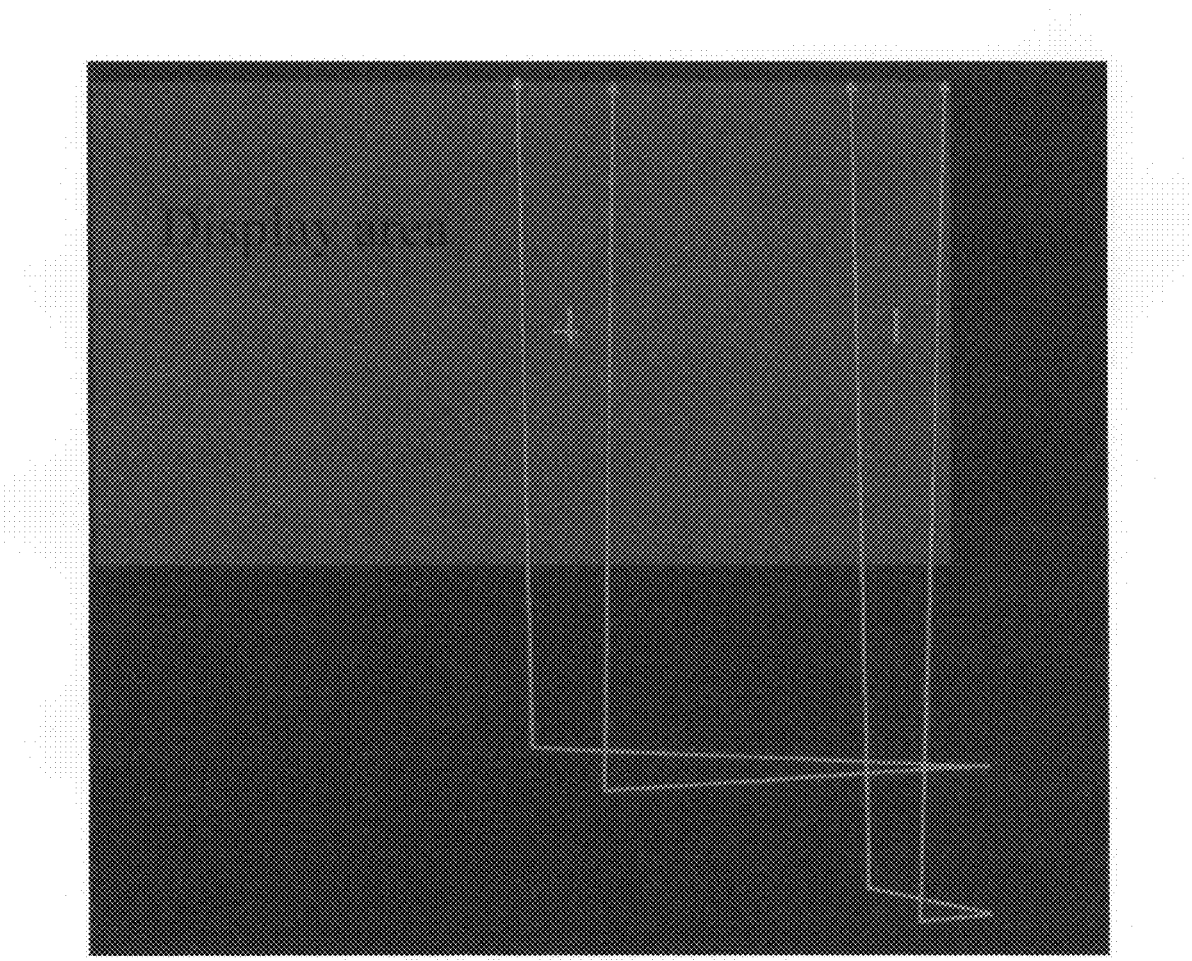
Figure 68:
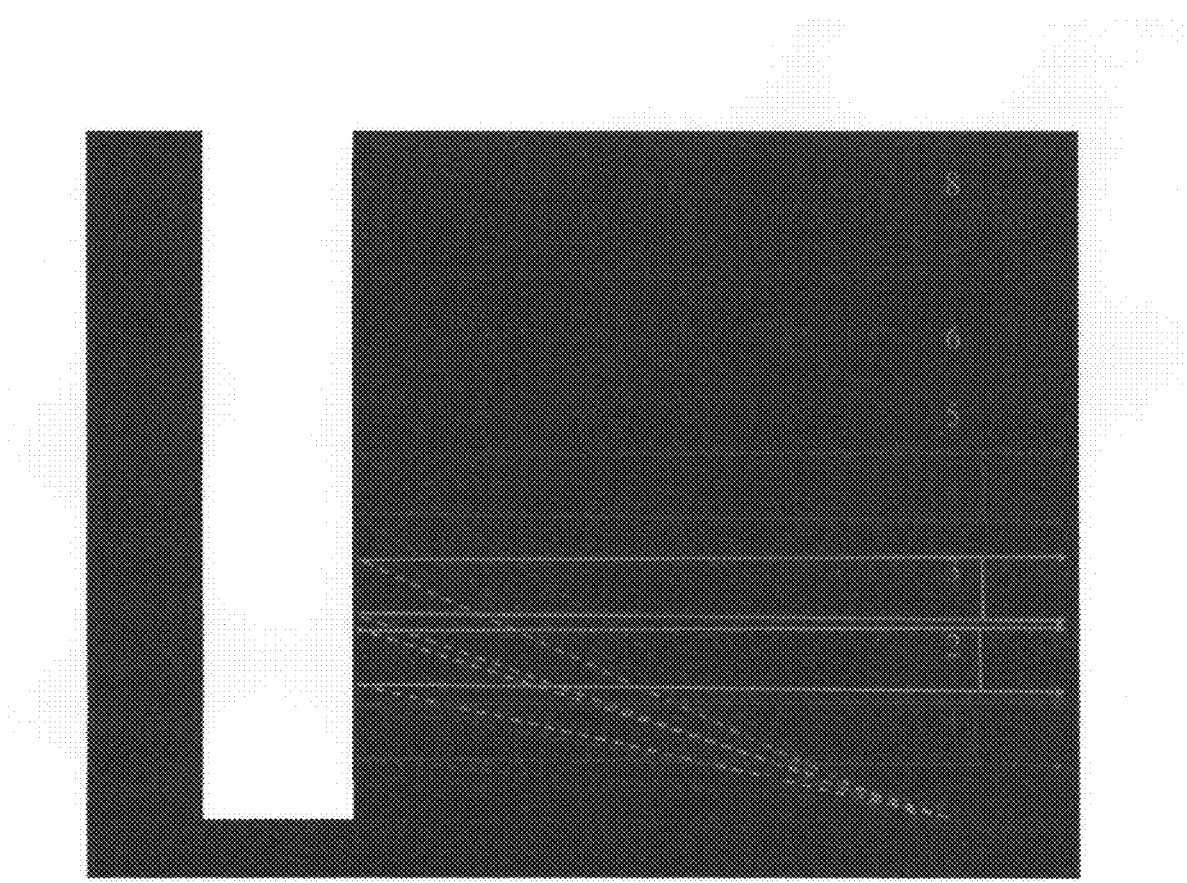

Reference is made to FIGS. 66-68, which are simplified illustrations of a photo detector for the touch screen system of FIG. 53, which is mounted vertical to a light source, in accordance with an embodiment of the present invention. The photo detector may be inter alia a photo diode, a light sensor or a camera. As shown in FIG. 66, a photo detector is mounted perpendicular to the directions of the light emitted by the light source. Such arrangement minimizes leakage. Since the amount of light reaching the photo detector is generally less than the amount of light emitted by the light source, photo detectors are preferably positioned along the longer edge of the screen, and light sources are preferably arranged along the shorter edge. Moreover, each photo detector preferably captures light from a single column of embedded reflective elements. Correspondingly, the angle viewed by the photo detector depends on the length of the screen. If the photo detectors are spaced a distance d apart along the shorter edge and if the longer edge is of length x, then the maximum angle viewed by a photo detector is $$\tan^{-1}\left(\frac{d}{x}\right) \approx \frac{d}{x}$$

(in radians). E.g., if the photo detectors are spaced 5 mm apart, then for a touch screen length of 40 mm the maximum viewing angle is approximately 7°, and for a touch screen length of 145 mm the maximum viewing angle is approximately 2°. FIG. 67 shows a touch screen with a simple light guide geometry, and FIG. 68 shows a touch screen with dual layer lighting.

It is noted that having the light beams travel a longer distance before being reflected over the screen surface enables projecting a wide, substantially parallel, light beam across the screen surface. If instead the light were to travel only a short distance before being projected over the screen surface, the light beam would be shaped as a cone with a narrow end at its source. Similarly, it is of advantage to have the wide light beam traverse a longer distance after it traverses the screen, in order that the full wide beam be concentrated with minimal leakage onto a single photo detector.

Figure 69:
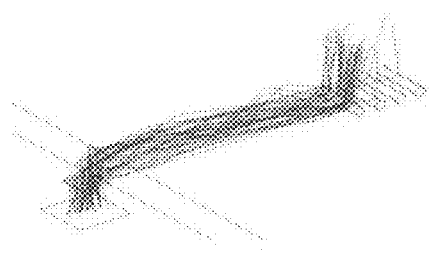
FIG. 69 is a simplified illustration of reflected light being re-directed by a reflective element embedded in a touch screen and directed towards a photo detector, in accordance with an embodiment of the present invention.

Reference is made to FIG. 69, which is a simplified illustration of reflected light being re-directed by a reflective element embedded in a touch screen and directed towards a photo detector, in accordance with an embodiment of the present invention. As shown in FIG. 69, light reflected from a pointer is guided back into the screen. The light stops at one of the reflective elements embedded in the screen, and is detected by a photo detector below the screen.

Figure 70:
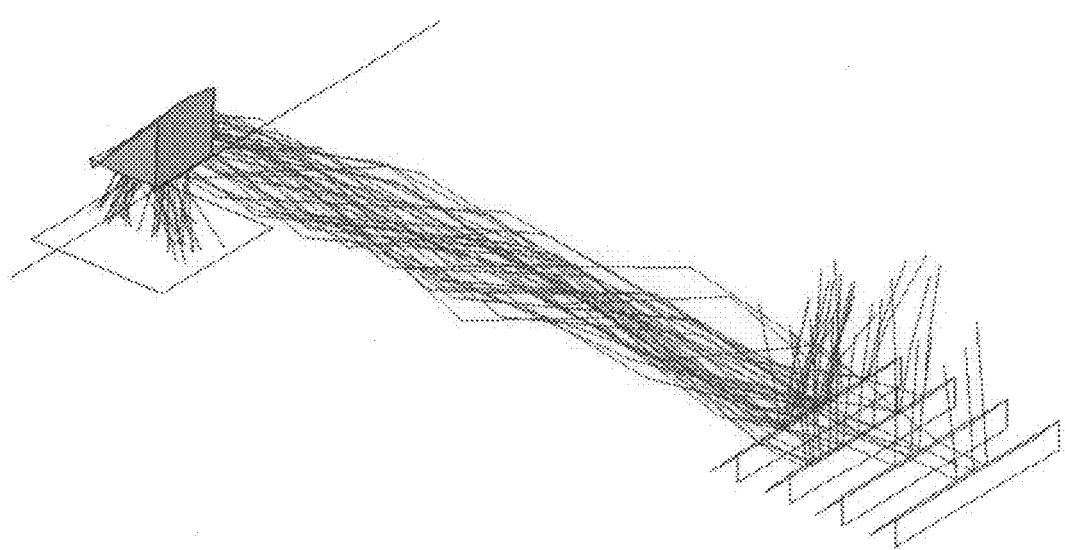
FIG. 70 is a simplified illustration of light that is reflected onto multiple areas of a touch screen and directed towards a photo detector, in accordance with an embodiment of the present invention.

Reference is made to FIG. 70, which is a simplified illustration of light that is reflected onto multiple areas of a touch screen and directed towards a photo detector, in accordance with an embodiment of the present invention. As shown in FIG. 70, light reflected onto multiple areas on the screen surface by a pointer is reflected by reflective elements embedded in the screen and directed to a photo detector outside of the screen surface. Thus, light reflected by a pointer is reflected back to a photo detector.

For a lattice spacing of 10 mm between the reflective elements and the photo detector, approximately 0.6% of the light is detected by the photo detector, and for a lattice spacing of 15 mm between the reflective elements and the photo detector, approximately 0.4% of the light is detected by the photo detector. In general, the amount of light detected by the photo detector depends on the size of the photo detector and the optic elements used.

Touch Screen System Configuration No. 28

Configuration no. 28 relates to a camera chip that is used as a photo detector of a touch screen. The image of the touch screen captured by the camera is used to infer the location of a pointer that touches the touch screen, or approaches the touch screen.

Figure 71:
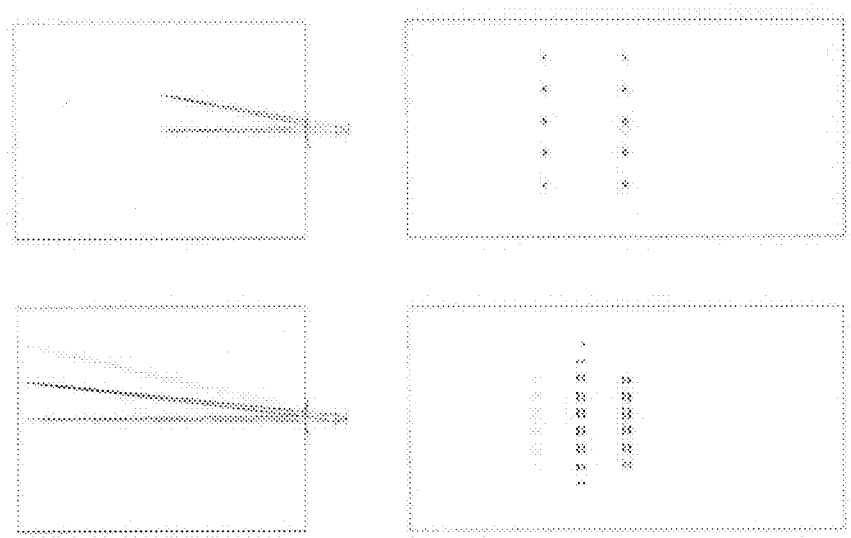
FIG. 71 is a simplified diagram of the touch screen system of FIG. 53 with a camera that functions as a photo detector, in accordance with an embodiment of the present invention.

Reference is made to FIG. 71, which is a simplified diagram of the touch screen system of FIG. 53 with a camera that functions as a photo detector, in accordance with an embodiment of the present invention. To obtain an optimal image on the camera sensor, the camera is oriented at an angle with respect to an edge of the touch screen, and arranged so as to collect light at a wide angle. Generally the surface of the touch screen at which the light exits should be approximately concentric with the camera lens.

In order to minimize lateral angle, it is preferable to mount the camera at a corner of the touch screen. Alternatively, two or more cameras may be used.

When a pointer touches the screen, or approaches near the screen, a pattern, such as one of the patterns in FIG. 71, from the reflective elements embedded in the screen is projected to the camera chip. The light pattern on the camera sensor provides information regarding the distance between the camera and the pointer.

The two left portions of FIG. 71 show the touch screen with reflected light at two different distances from the camera lens. The two right portions of FIG. 71 show the corresponding patterns on the camera sensor. As shown in FIG. 71, a larger distance between the camera and the pointer corresponds to a larger number of sub-patterns on the camera sensor.

Figure 72:
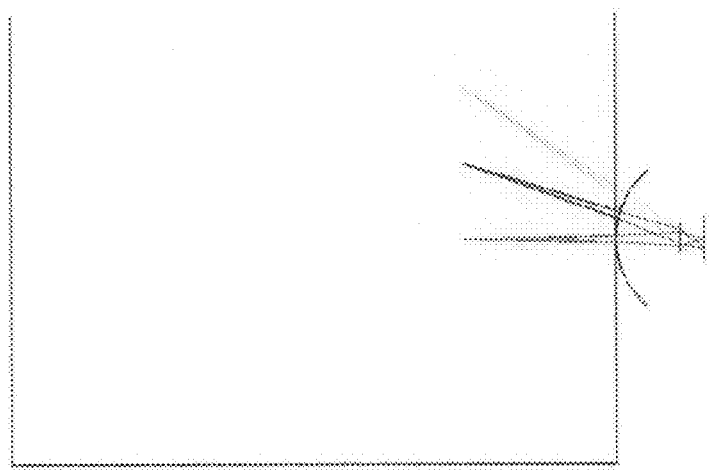
FIGS. 72-79 are simplified illustrations of a camera lens capturing reflected light from the touch screen of FIG. 53, with the camera at various distances away from a pointer that is touching the screen, and the corresponding images captured by the camera, in accordance with an embodiment of the present invention.

Reference is made to FIG. 72, which is a simplified illustration of a camera lens capturing reflected light from the touch screen of FIG. 53, with the camera 10 mm away from a pointer that is touching the screen, in accordance with an embodiment of the present invention.

Figure 73:

Reference is also made to FIG. 73, which is an image captured by the camera of FIG. 72, from three reflective elements spaced 5 mm apart and located 10 mm from the screen edge, in accordance with an embodiment of the present invention.

Figure 74:
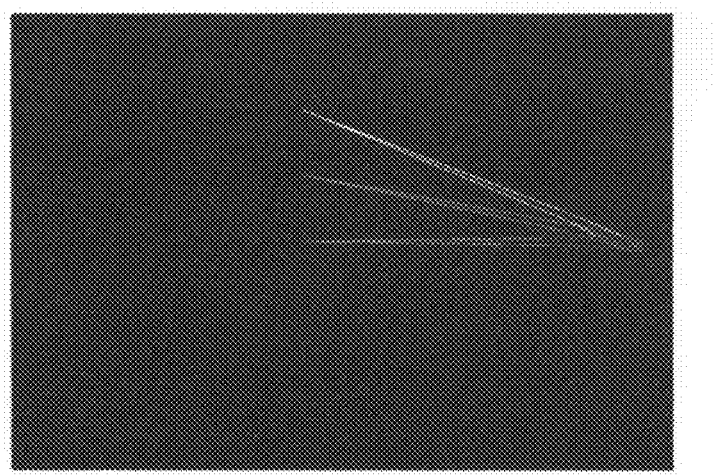

Reference is made to FIG. 74, which is a simplified illustration of a camera lens capturing reflected light from the touch screen of FIG. 53, with the camera 20 mm away from a pointer that is touching the screen, in accordance with an embodiment of the present invention.

Figure 75:
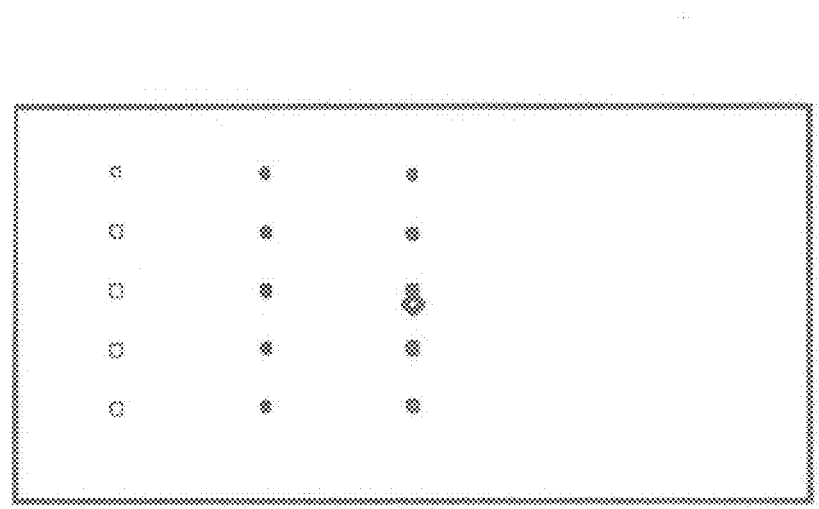

Reference is also made to FIG. 75, which is an image captured by the camera of FIG. 74, from three reflective elements spaced 5 mm apart and located 20 mm from the screen edge, in accordance with an embodiment of the present invention.

Figure 76:
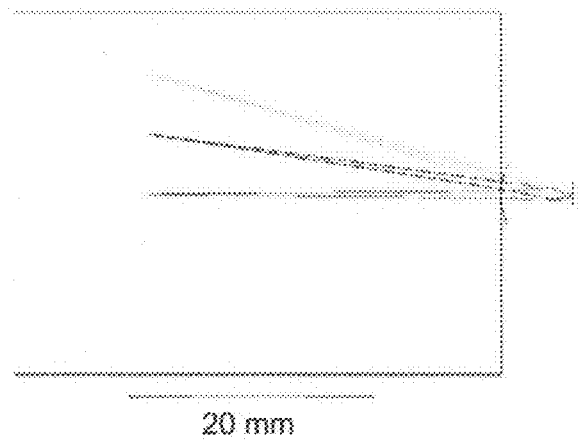

Reference is made to FIG. 76, which is a simplified illustration of a camera lens capturing reflected light from the touch screen of FIG. 53, with the camera 30 mm away from a pointer that is touching the screen, in accordance with an embodiment of the present invention.

Figure 77:
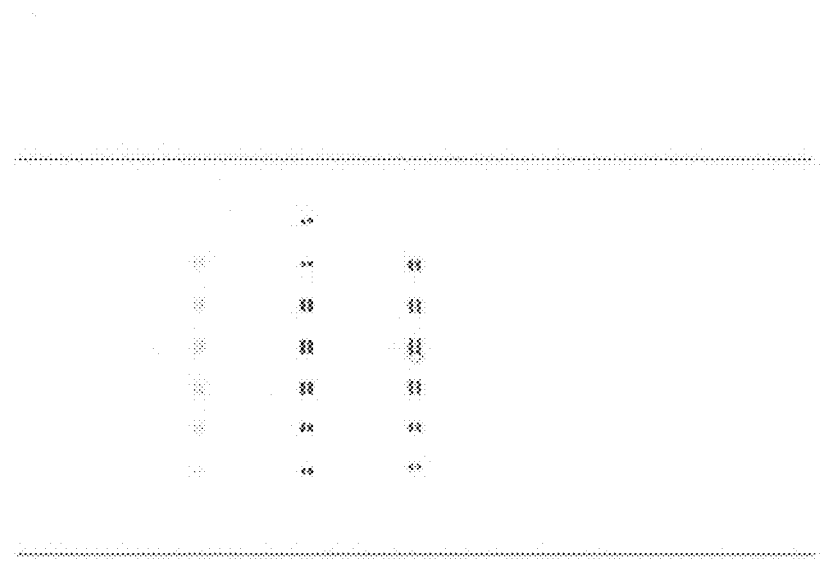

Reference is also made to FIG. 77, which is an image captured by the camera of FIG. 76, from three reflective elements spaced 5 mm apart and located 30 mm from the screen edge, in accordance with an embodiment of the present invention.

Figure 78:
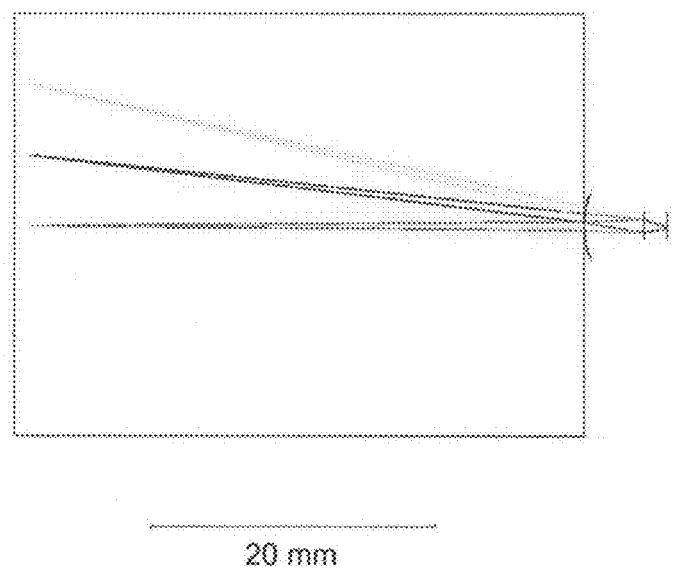

Reference is made to FIG. 78, which is a simplified illustration of a camera lens capturing reflected light from the touch screen of FIG. 53, with the camera 39 mm away from a pointer that is touching the screen, in accordance with an embodiment of the present invention.

Figure 79:
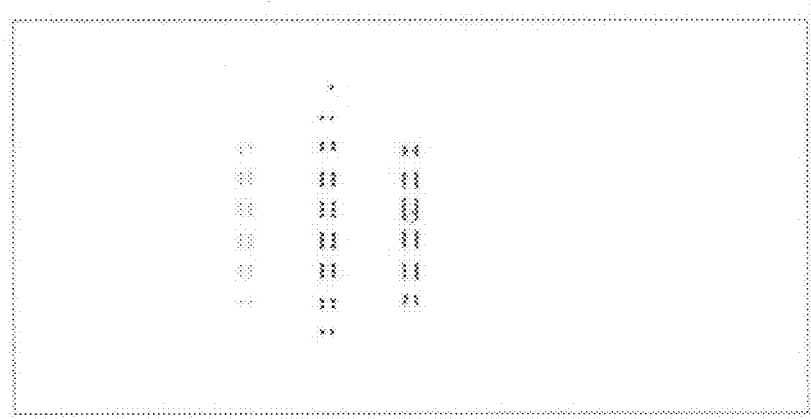

Reference is also made to FIG. 79, which is an image captured by the camera of FIG. 78, from three reflective elements spaced 5 mm apart and located 39 mm from the screen edge, in accordance with an embodiment of the present invention. By comparing the respective captured images in FIGS. 73, 75, 77 and 79, it will be appreciated that the number of sub-patterns in the images corresponds to the distance between the pointer and the camera lens.

Figure 80:
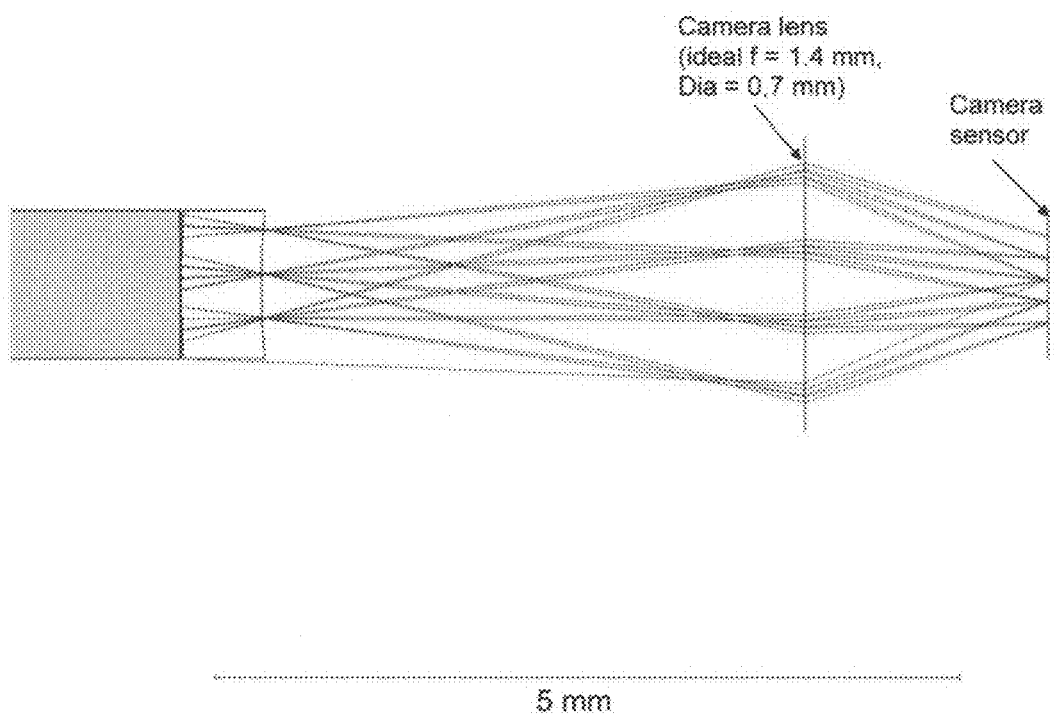
FIG. 80 is a simplified diagram of a side view showing the sub-patterns in the camera sensor generated from the embedded reflective elements, in accordance with an embodiment of the present invention.

Reference is made to FIG. 80, which is a simplified diagram of a side view showing the sub-patterns in the camera sensor generated from the embedded reflective elements, in accordance with an embodiment of the present invention. In the configuration of FIGS. 72, 74, 76 and 78, a light source, along an edge of the display screen that is 1 mm thick, is 20 mm away from the camera lens. For such configuration, five sub-patterns are generated on the camera sensor; namely a central sub-pattern corresponding to an image directly in the center, and two sub-patterns corresponding to reflected images on each side of the central sub-pattern. The sub-patterns correspond to focuses of light from different depths of field; i.e., from different distances at different positions along the beam direction. Shorter focus distances generate fewer but larger sub-patterns, and longer focus distances generate more but smaller sub-patterns. As such, longer focus distances are preferable, as it is easier for a system to count the number of elements than to measure the size of an element.

Figure 81:
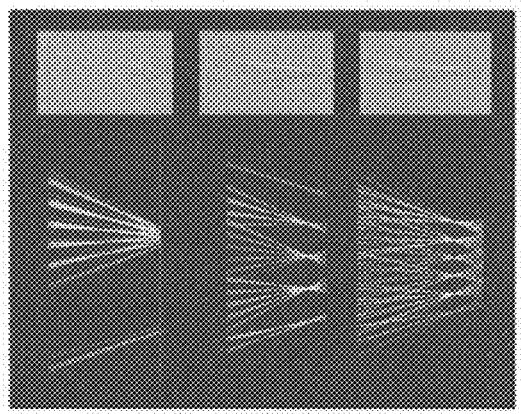
FIGS. 81-87 are images of light beams reflected from three different pointer touch locations, in accordance with an embodiment of the present invention.
Figure 82:
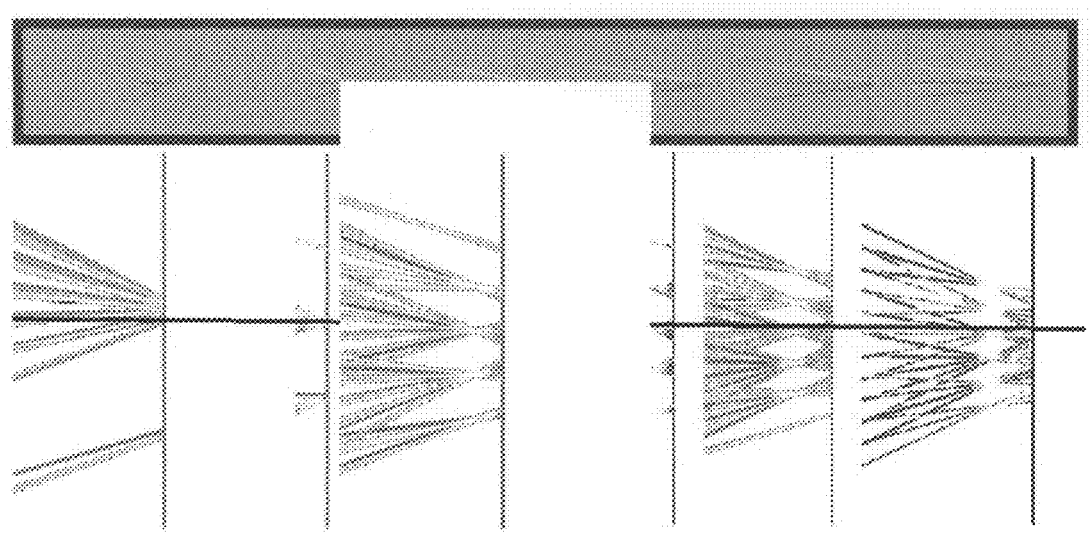
Figure 83:
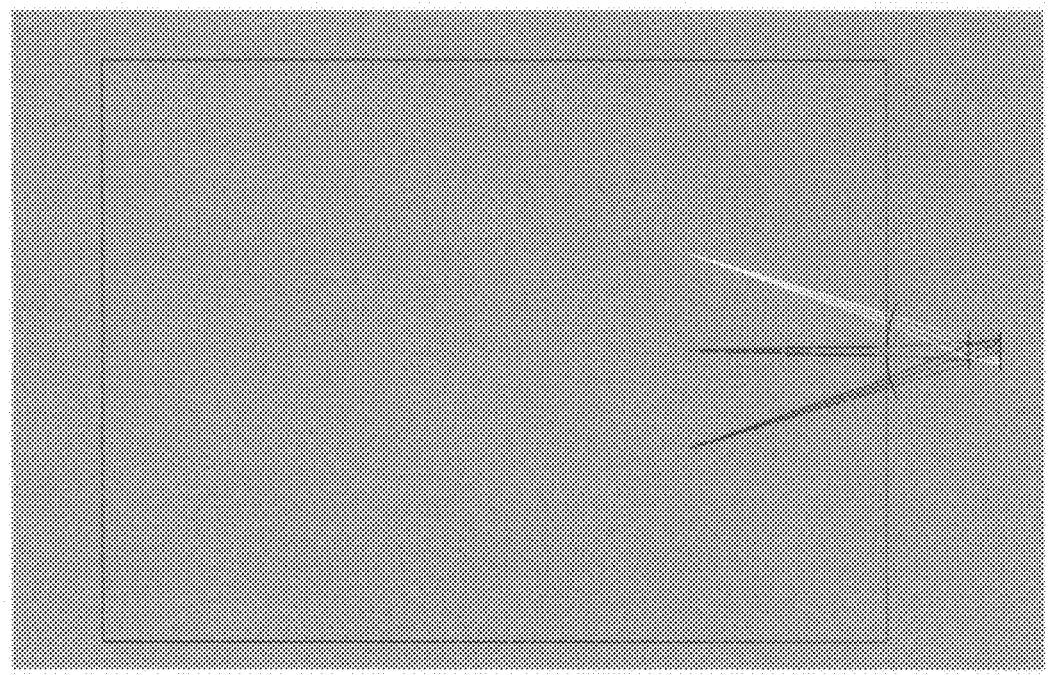
Figure 84:
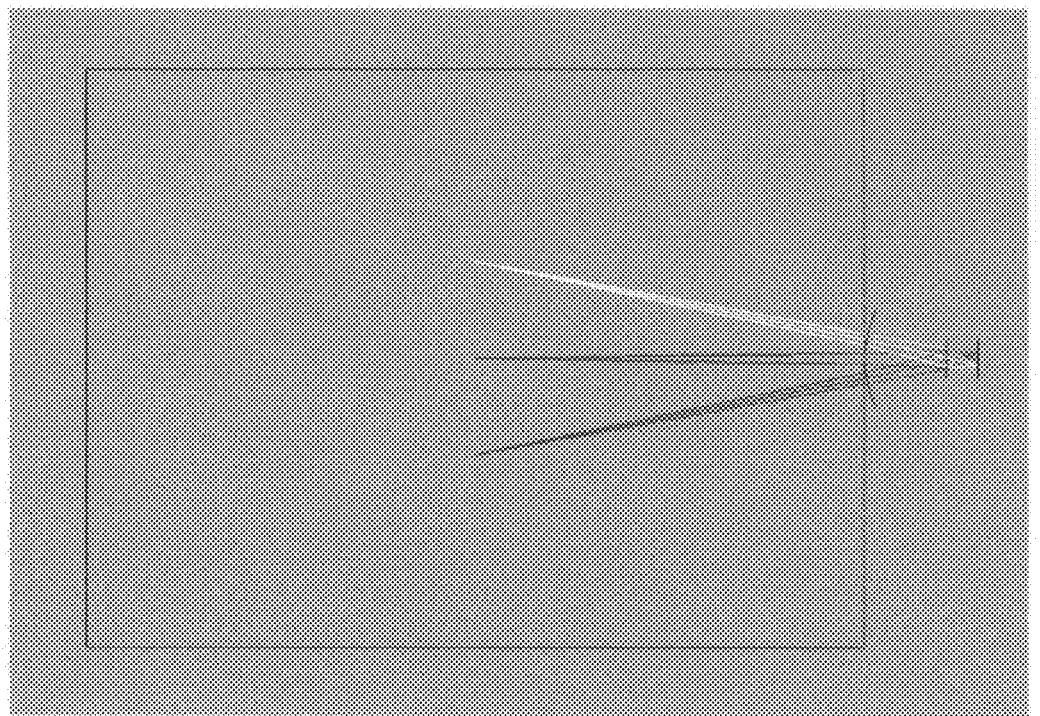
Figure 85:
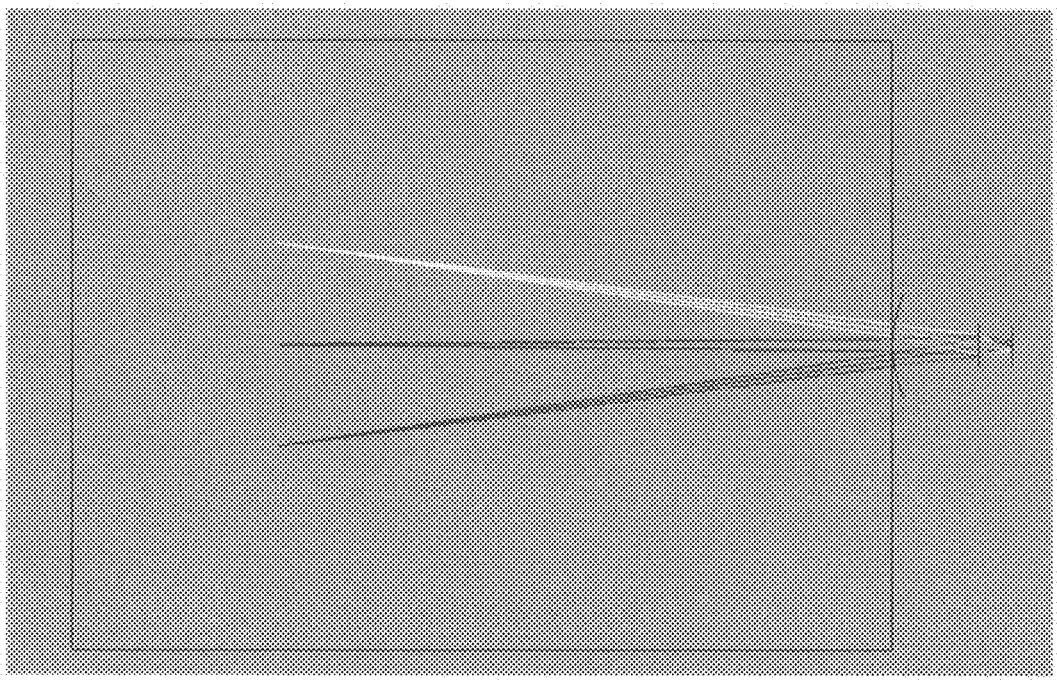
Figure 86:
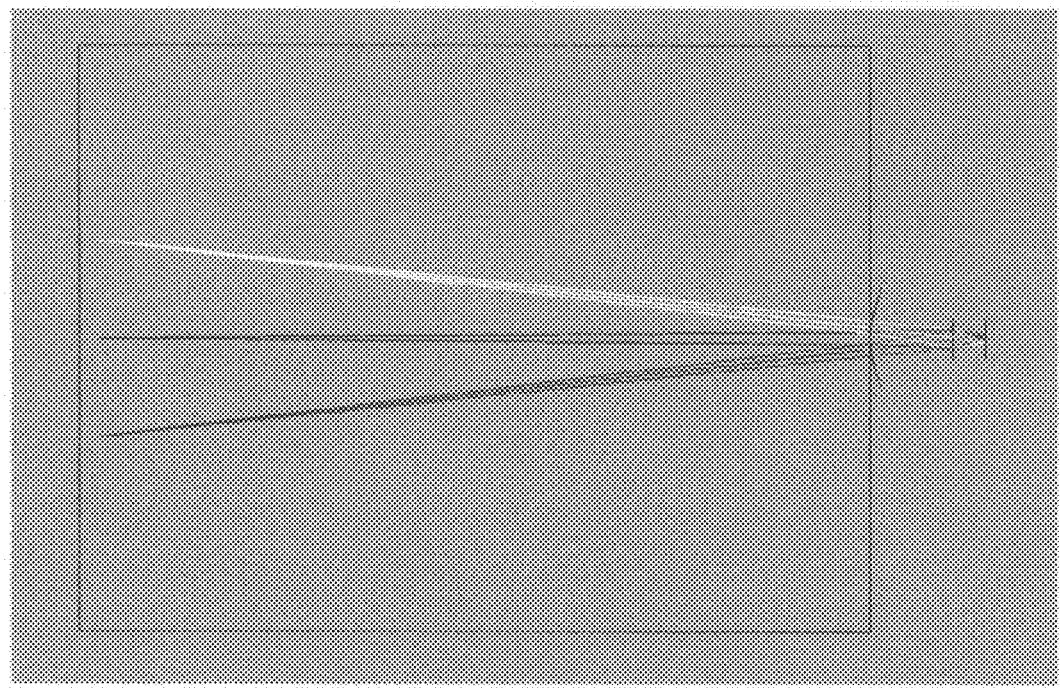
Figure 87:
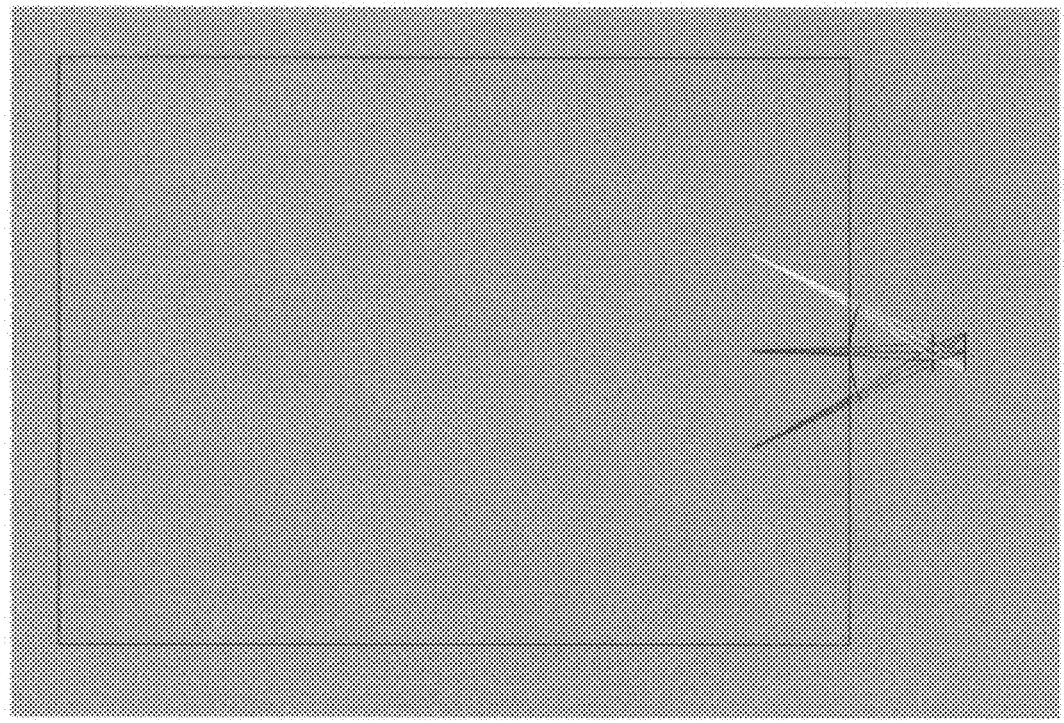

Reference is made to FIGS. 81-87, which are images of light beams reflected from three different pointer touch locations, in accordance with an embodiment of the present invention. The three top portions of FIG. 81 show the actual camera sensor images, and the three bottom portions of FIG. 81 show the corresponding optics between the camera lens and the camera sensor. The rightmost portion shows six sub-patterns in the image on the camera sensor, corresponding to a pointer touch location that is far from the camera lens.

Touch Screen System Configuration No. 29

Configuration no. 29 relates to a light sensor that is used as a photo detector of a touch screen. The advantage of a light sensor over a camera is a larger sensor area that may be used for light detection. The LEDs and light sensors may be frequency modulated in order to improve detection sensitivity.

Figure 88:
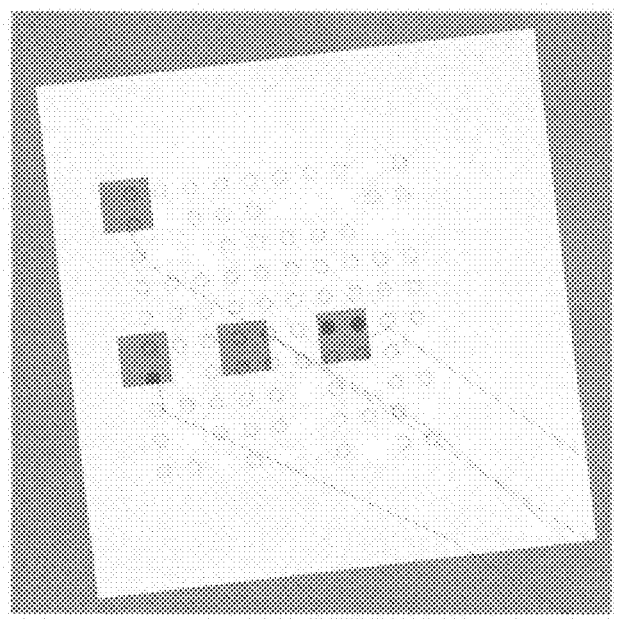
FIGS. 88-90 are simplified illustrations of a simulation of light at multiple points on a touch screen, at which reflective elements are embedded, in accordance with an embodiment of the present invention.
Figure 89:
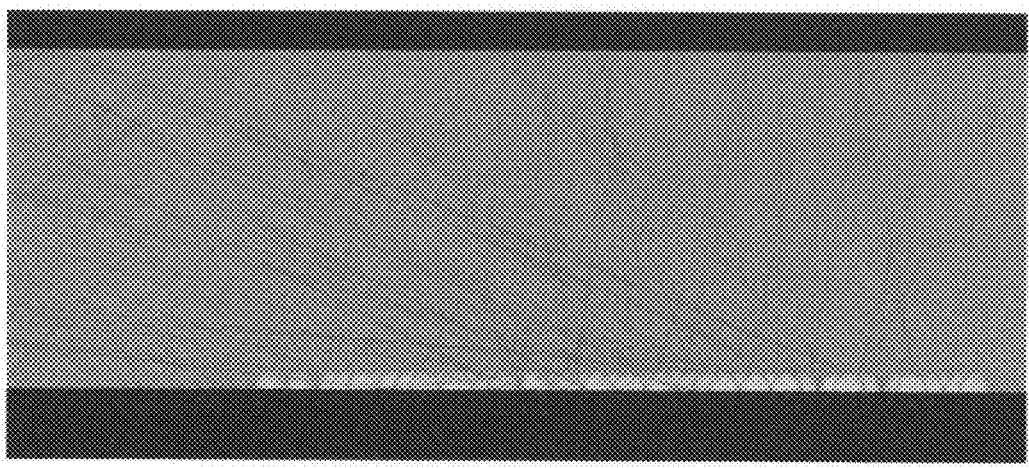
Figure 90:
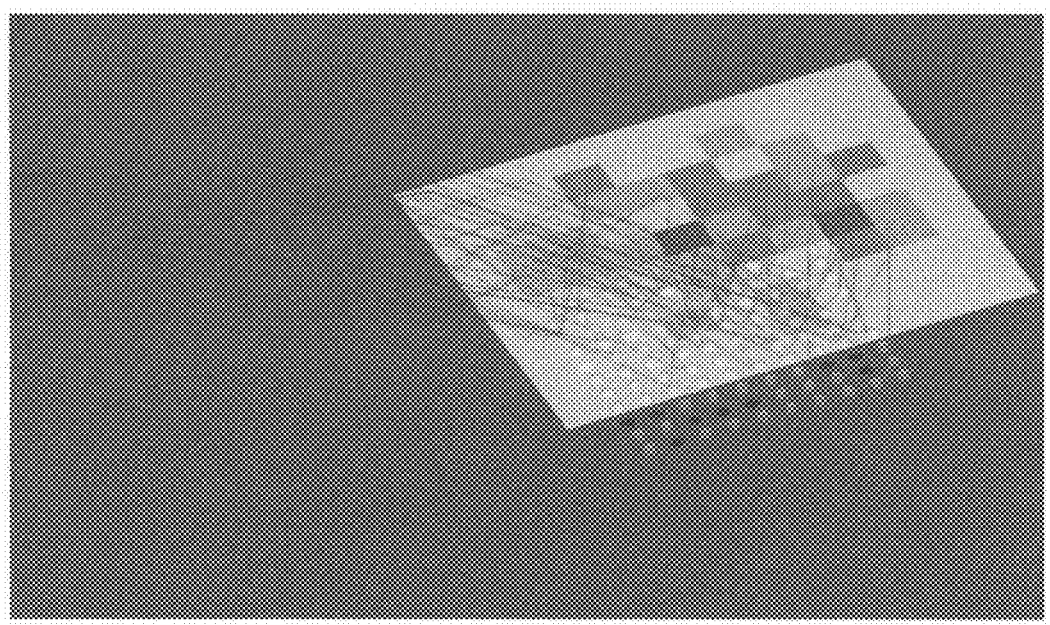

Reference is made to FIGS. 88-90, which are simplified illustrations of a simulation of light at multiple points on a touch screen, at which reflective elements are embedded, in accordance with an embodiment of the present invention. Shown in FIG. 88 are circular dots on the touch screen, representing embedded reflective elements. As shown in FIG. 89, the circular dots have a relative fill factor of 20%, and the pixel dimensions for the touch screen are approximately 3 mm×3 mm.

Figure 91:
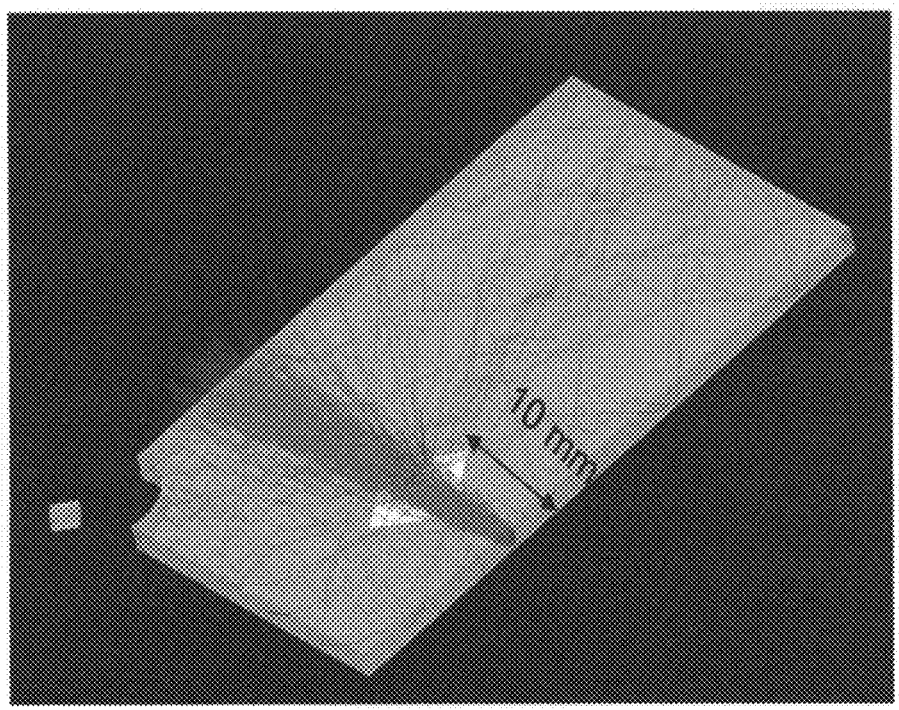
FIGS. 91 and 92 are simplified illustrations of light emitted from an LED lighting up a fingertip of 4 mm×4 mm, for the touch screen of FIG. 88, in accordance with an embodiment of the present invention.
Figure 92:
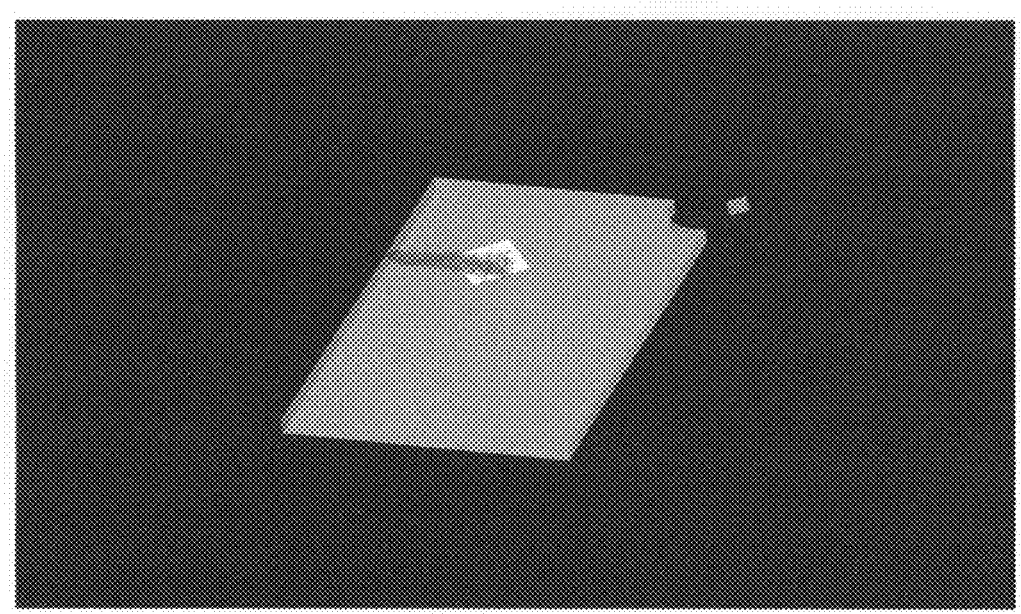

Reference is made to FIGS. 91 and 92, which are simplified illustrations of light emitted from an LED lighting up a fingertip of 4 mm×4 mm, for the touch screen of FIG. 88, in accordance with an embodiment of the present invention. The distance between the LED and the area occupied by the reflective elements is approximately 10 mm. Approximately 3% of the incoming light from the LED lights up the fingertip. The darker lines in FIG. 91 represent light that escapes from the glass, and the lighter lines represent light inside the glass. FIG. 91 shows light escaping from the glass surface at a dot location that is 10 mm away from the LED, indicated by a white diamond.

FIG. 92 shows only those light beams that reach the dot location. The small box shown at the upper right corner of FIG. 92 represents a camera that captures the reflected light.

Reference is made to FIGS. 93-95, which are images of test results captured by a camera for the touch screen of FIG. 88, in accordance with an embodiment of the present invention. The tests used a large screen display of dimensions 30 mm×40 mm and 1 mm thickness. The tests used simple light guides, of 5 mm thickness. The tests are based on a camera lens with focal length f=1.4 mm and a diameter of 0.7 mm. The tests were simulated from three points on the touch screen at different distances from the camera lens.

The images shown in FIGS. 93-95 were captured using a mobile phone camera. FIG. 93 shows an ambient state, where no pointer is touching the screen, and FIG. 94 shows a state where a pointer is touching the screen. FIG. 95 shows the results when the image of FIG. 93 is subtracted from the image of FIG. 94, and the difference is scaled up by a factor of 10.

The distance of the pointer from the camera lens may be determined from the number of sub-patterns in the captured images and their positions. The positions of the sub-patterns determine the direction from which the light arrives.

Touch Screen System Configuration No. 30

Configurations nos. 30 and 31 relate to a mufti-layer touch screen, with separate layers used to emit light and to detect light.

To minimize leakage, two or more layers of screen surface are employed, in order to separate layers used to emit light from layers used to detect light. Preferably a facetted or curved grating is used to direct the light across the plane of the touch screen. The reflector for the touch screen may be shaped as a cylinder, or otherwise shaped.

Figure 96:
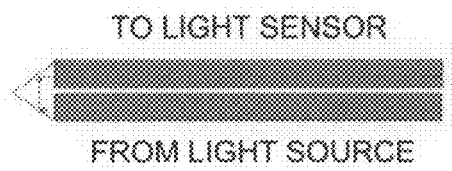
FIG. 96 is a simplified diagram of a dual layer touch screen where the bottom layer transmits light emitted from an LED and the top layer transmits reflected light, in accordance with an embodiment of the present invention.

Reference is made to FIG. 96, which is a simplified diagram of a dual layer touch screen where the bottom layer transmits light emitted from an LED and the top layer transmits reflected light, in accordance with an embodiment of the present invention. To reduce space along the sides of the touch screen, it is preferable to focus the light beams narrowly, to direct the light beams along different layers of the touch screen, and to avoid a cluster of light sources in a single group. Instead, the light sources should be distributed.

Figure 97:
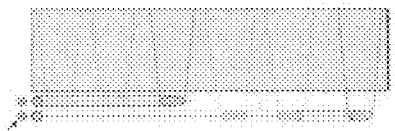
FIG. 97 is a simplified diagram of a mufti-layer touch screen with filamentary light guides, in accordance with an embodiment of the present invention.

Reference is made to FIG. 97, which is a simplified diagram of a mufti-layer touch screen with filamentary light guides, in accordance with an embodiment of the present invention. FIG. 97 shows light cut through filamentary light guides, arranged in multiple layers, to reduce space. The touch screen of FIG. 97 is assembled in several stages, with filamentary light guides running both horizontally and vertically, in order to accommodate an appropriate number of light beams. Optical fibers may be attached to the screen in order to reduce space.

By emitting the light beams at different times, the signal-to-noise ratio is increased, and the detection accuracy is made more precise. By regularly sampling the dark, ambient light signal, detection sensitivity is enhanced. Specifically, the signal-to-noise ratio is increased by subtracting the dark, ambient light signal from the active signal. Preferably, this subtraction is implemented in the analog domain instead of the digital domain, since subtraction of images in the digital domain generally requires high resolution.

Figure 98:
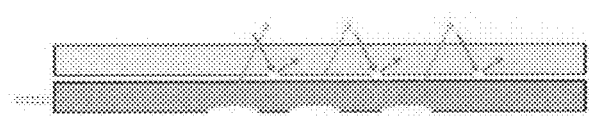
FIG. 98 is a simplified diagram of light beams guided through different layers of a mufti-layer touch screen, in accordance with an embodiment of the present invention.

Reference is made to FIG. 98, which is a simplified diagram of light beams guided through different layers of a mufti-layer touch screen, in accordance with an embodiment of the present invention. In order to prevent stray light from being incident, and to prevent reflected light from being transmitted in a wrong direction, the light beams are guided through different layers of the touch screen.

Touch Screen System Configuration No. 31

Figure 99:
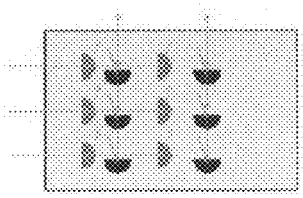
FIG. 99 is a simplified diagram of a mufti-layer touch screen with embedded reflective elements oriented in different directions, in accordance with an embodiment of the present invention.

Reference is made to FIG. 99, which is a simplified diagram of a mufti-layer touch screen with embedded reflective elements oriented in different directions, in accordance with an embodiment of the present invention. As shown in FIG. 99, incident and reflected light is stopped at reflective elements embedded in the touch screen and oriented in different directions. Use of embedded reflective elements in two different directions serves to minimize leakage between light emitters and light detectors, prevents stray light from being incident, and prevents reflected light from being transmitted in a wrong direction.

The present invention has broad application to electronic devices with touch sensitive screens, including small-size, mid-size and large-size screens. Such devices include inter alia computers, home entertainment systems, car entertainment systems, security systems, PDAs, cell phones, electronic games and toys, digital photo frames, digital musical instruments, e-book readers, TVs and GPS navigators.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A touch screen system comprising:
a display screen;
a circuit board comprising circuitry for controlled selective activation of electronic components connected thereto;
a plurality of first photo diodes connected to said circuit board, for detecting amounts of light at a first exit side of said display screen;
a plurality of second photo diodes connected to said circuit board, for detecting amounts of light at a second exit side of said display screen, the second exit side being opposite the first exit side;
a plurality of near-infrared LEDs connected to said circuit board, for emitting light at an entrance side of said display screen, the entrance side being adjacent to the first and second exit sides,
wherein an object that touches or hovers above said display screen reflects light emitted by said near-infrared LEDs towards said first and second exit sides, the amount of light detected at each photo diode corresponding to a distance between the object and that photo diode, and wherein said circuitry determines whether the object is nearer to the first exit side or the second exit side based on comparison of amounts of light detected by said first photo diodes and by said second photo diodes, when the light emitted by said near-infrared LEDs is reflected by the object.

2. The touch screen system of claim 1 further comprising at least one optical element for guiding light emitted by said near-infrared LEDs over said display screen.

3. The touch screen system of claim 1, further comprising a plurality of third photo diodes connected to said circuit board, for detecting amounts of light at a third exit side of said display screen, the third exit side being opposite the entrance side, wherein said circuitry calculates the position of the object based on the amounts of light detected by said first, second and third photo diodes, when the light emitted by said near-infrared LEDs is reflected by the object towards the first and second exit sides, and blocked by the object from reaching the third exit side.

* * * * *